United States Patent
Tannenbaum et al.

(10) Patent No.: US 11,570,034 B2
(45) Date of Patent: *Jan. 31, 2023

(54) CLUSTER COMPUTING

(71) Applicant: Advanced Cluster Systems, Inc., Newport Beach, CA (US)

(72) Inventors: Zvi Tannenbaum, Palo Alto, CA (US); Dean E. Dauger, Huntington Beach, CA (US)

(73) Assignee: Advanced Cluster Systems, Inc., Newport Beach, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/374,789

(22) Filed: Jul. 13, 2021

(65) Prior Publication Data

US 2021/0344551 A1    Nov. 4, 2021

Related U.S. Application Data

(63) Continuation of application No. 16/449,084, filed on Jun. 21, 2019, now Pat. No. 11,128,519, which is a (Continued)

(51) Int. Cl.
*H04L 12/24* (2006.01)
*G06F 9/50* (2006.01)
(Continued)

(52) U.S. Cl.
CPC ........... *H04L 41/04* (2013.01); *G06F 9/5072* (2013.01); *G06F 9/54* (2013.01); *G06F 15/76* (2013.01)

(58) Field of Classification Search
USPC ....................................................... 709/223
See application file for complete search history.

(56) References Cited

U.S. PATENT DOCUMENTS 5,423,046 A    6/1995    Nunnelley et al.
5,881,315 A    3/1999    Cohen
(Continued)

FOREIGN PATENT DOCUMENTS

EP    1 368 948    12/2003
EP    1 501 013    1/2005
(Continued)

OTHER PUBLICATIONS

Affidavit of Elizabeth Rosenberg, dated Sep. 1, 2020 in 7 pages.
(Continued)

*Primary Examiner* — Hermon Asres
(74) *Attorney, Agent, or Firm* — Knobbe, Martens, Olson & Bear, LLP

(57) ABSTRACT

In some embodiments, a computer cluster system comprises a plurality of nodes and a software package comprising a user interface and a kernel for interpreting program code instructions. In certain embodiments, a cluster node module is configured to communicate with the kernel and other cluster node modules. The cluster node module can accept instructions from the user interface and can interpret at least some of the instructions such that several cluster node modules in communication with one another and with a kernel can act as a computer cluster.

30 Claims, 5 Drawing Sheets

Related U.S. Application Data continuation of application No. 14/181,112, filed on Feb. 14, 2014, now Pat. No. 10,333,768, which is a continuation of application No. 13/423,063, filed on Mar. 16, 2012, now Pat. No. 8,676,877, which is a continuation of application No. 12/040,519, filed on Feb. 29, 2008, now Pat. No. 8,140,612, which is a continuation-in-part of application No. 11/744,461, filed on May 4, 2007, now Pat. No. 8,082,289.

(60) Provisional application No. 60/850,908, filed on Oct. 11, 2006, provisional application No. 60/813,738, filed on Jun. 13, 2006.

(51) Int. Cl.
*G06F 9/54* (2006.01)
*G06F 15/76* (2006.01)
*H04L 41/04* (2022.01)

(56) References Cited

U.S. PATENT DOCUMENTS

| | | | |
|---|---|---|---|
| 5,930,768 A | 7/1999 | Hooban | |
| 6,006,259 A | 12/1999 | Adelman et al. | |
| 6,067,609 A | 5/2000 | Meeker et al. | |
| 6,074,427 A | 6/2000 | Fought et al. | |
| 6,108,699 A | 8/2000 | Moiin | |
| 6,195,680 B1 | 2/2001 | Goldszmidt et al. | |
| 6,202,080 B1 | 3/2001 | Lu et al. | |
| 6,546,403 B1 | 4/2003 | Carlson, Jr. et al. | |
| 6,578,068 B1 | 6/2003 | Bowman-Amuah | |
| 6,604,134 B2 | 8/2003 | Haury | |
| 6,691,216 B2 | 2/2004 | Kelly et al. | |
| 6,751,698 B1 | 6/2004 | Deneroff et al. | |
| 6,782,537 B1 | 8/2004 | Blackmore et al. | |
| 6,968,335 B2 | 11/2005 | Bayliss et al. | |
| 6,968,359 B1* | 11/2005 | Miller | G06F 9/5061 |
| | | | 709/205 |
| 7,015,915 B1 | 3/2006 | Diard | |
| 7,031,944 B2 | 4/2006 | Tanioka | |
| 7,093,004 B2 | 8/2006 | Bernardin et al. | |
| 7,136,924 B2 | 11/2006 | Dauger | |
| 7,139,882 B2 | 11/2006 | Suzuoki et al. | |
| 7,162,590 B2 | 1/2007 | Pruvost et al. | |
| 7,174,381 B2 | 2/2007 | Gulko et al. | |
| 7,177,874 B2 | 2/2007 | Jardin | |
| 7,249,357 B2 | 7/2007 | Landman et al. | |
| 7,275,123 B2 | 9/2007 | Duncan et al. | |
| 7,289,125 B2 | 10/2007 | Diard et al. | |
| 7,315,877 B2 | 1/2008 | Bhanot et al. | |
| 7,334,232 B2 | 2/2008 | Jacobs et al. | |
| 7,437,460 B2 | 10/2008 | Chidambaran et al. | |
| 7,469,309 B1 | 12/2008 | Duncan et al. | |
| 7,472,193 B2 | 12/2008 | Dauger | |
| 7,502,915 B2 | 3/2009 | Jacob et al. | |
| 7,519,652 B2 | 4/2009 | Page et al. | |
| 7,533,141 B2 | 5/2009 | Nadgir et al. | |
| 7,533,168 B1 | 5/2009 | Pabla et al. | |
| 7,533,389 B2 | 5/2009 | Verbeke et al. | |
| 7,542,981 B2 | 6/2009 | Choy et al. | |
| 7,554,949 B2 | 6/2009 | Chen | |
| 7,562,174 B2 | 7/2009 | Danilak | |
| 7,568,131 B2 | 7/2009 | Vertes | |
| 7,627,744 B2 | 12/2009 | Maher et al. | |
| 7,634,530 B2 | 12/2009 | Dean et al. | |
| 7,644,130 B2 | 1/2010 | Magro et al. | |
| 7,663,633 B1 | 2/2010 | Diamond et al. | |
| 7,694,158 B2 | 4/2010 | Melpignano et al. | |
| 7,698,390 B1 | 4/2010 | Harkness et al. | |
| 7,716,323 B2 | 5/2010 | Gole et al. | |
| 7,757,236 B1 | 7/2010 | Singh | |
| 7,788,314 B2 | 8/2010 | Holt | |
| 7,814,462 B2 | 10/2010 | Husbands et al. | |
| 7,835,022 B2 | 11/2010 | Matsumoto | |
| 7,861,060 B1 | 12/2010 | Nickoils et al. | |
| 7,937,455 B2 | 5/2011 | Saha et al. | |
| 7,996,592 B2 | 8/2011 | Kim et al. | |
| 8,074,224 B1 | 12/2011 | Nordquist et al. | |
| 8,082,289 B2 | 12/2011 | Tannenbaum et al. | |
| 8,117,288 B2 | 2/2012 | Bhanot et al. | |
| 8,140,612 B2 | 3/2012 | Tannenbaum et al. | |
| 8,321,849 B2 | 11/2012 | Nickoils et al. | |
| 8,402,080 B2 | 3/2013 | Tannenbaum et al. | |
| 8,402,083 B2 | 3/2013 | Tannenbaum et al. | |
| 8,539,207 B1 | 9/2013 | LeGrand | |
| 8,601,101 B1* | 12/2013 | Singh | H04L 69/40 |
| | | | 709/223 |
| 8,676,877 B2 | 3/2014 | Tannenbaum et al. | |
| 8,849,889 B1 | 9/2014 | Tannenbaum et al. | |
| 8,941,668 B2 | 1/2015 | Diamond | |
| 9,405,564 B2 | 8/2016 | Muellers et al. | |
| 10,333,768 B2 | 6/2019 | Tannenbaum et al. | |
| 11,128,519 B2 | 9/2021 | Tannenbaum et al. | |
| 2002/0013832 A1 | 1/2002 | Hubbard | |
| 2002/0049859 A1 | 4/2002 | Bruckert et al. | |
| 2003/0005068 A1 | 1/2003 | Nickel et al. | |
| 2003/0005266 A1 | 1/2003 | Akkary et al. | |
| 2003/0051062 A1 | 3/2003 | Circenis | |
| 2003/0135621 A1 | 7/2003 | Romagnoli | |
| 2003/0195931 A1 | 10/2003 | Dauger | |
| 2003/0195938 A1* | 10/2003 | Howard | G06F 9/5044 |
| | | | 709/208 |
| 2004/0015968 A1 | 1/2004 | Neiman et al. | |
| 2004/0098359 A1 | 5/2004 | Bayliss et al. | |
| 2004/0098447 A1 | 5/2004 | Verbeke et al. | |
| 2004/0110209 A1 | 6/2004 | Yokota et al. | |
| 2004/0157203 A1 | 8/2004 | Dunk | |
| 2004/0195572 A1 | 10/2004 | Kato et al. | |
| 2004/0252710 A1 | 12/2004 | Jeter, Jr. et al. | |
| 2004/0254984 A1 | 12/2004 | Dinker | |
| 2005/0015460 A1 | 1/2005 | Goyle et al. | |
| 2005/0021751 A1* | 1/2005 | Block | G06F 9/54 |
| | | | 709/225 |
| 2005/0038852 A1 | 2/2005 | Howard | |
| 2005/0060237 A1 | 3/2005 | Barsness et al. | |
| 2005/0076105 A1 | 4/2005 | Keohane et al. | |
| 2005/0097300 A1 | 5/2005 | Gildea et al. | |
| 2005/0108394 A1 | 5/2005 | Braun et al. | |
| 2005/0154789 A1 | 7/2005 | Fellenstein et al. | |
| 2005/0180095 A1 | 8/2005 | Ellis | |
| 2005/0188088 A1 | 8/2005 | Fellenstein et al. | |
| 2005/0235055 A1 | 10/2005 | Davidson | |
| 2005/0251644 A1 | 11/2005 | Maher et al. | |
| 2006/0026601 A1 | 2/2006 | Solt | |
| 2006/0053216 A1 | 3/2006 | Deokar et al. | |
| 2006/0059473 A1 | 3/2006 | Moler | |
| 2006/0106931 A1 | 5/2006 | Richou | |
| 2007/0044099 A1 | 2/2007 | Rajput | |
| 2007/0073705 A1* | 3/2007 | Gray | G06F 9/451 |
| 2007/0094532 A1* | 4/2007 | Sengupta | G06F 11/3632 |
| | | | 714/5.1 |
| 2007/0124363 A1 | 5/2007 | Lurie et al. | |
| 2008/0250347 A1 | 10/2008 | Gray et al. | |
| 2008/0281997 A1 | 11/2008 | Archer et al. | |
| 2020/0153677 A1 | 5/2020 | Tannenbaum et al. | |
| 2021/0344552 A1 | 11/2021 | Tannenbaum et al. | |

FOREIGN PATENT DOCUMENTS

| | | |
|---|---|---|
| JP | 08-087473 | 2/1996 |
| JP | 11-126196 | 5/1999 |
| JP | 11-328134 | 11/1999 |
| JP | 2001-229145 | 8/2001 |
| JP | 2002-117010 | 4/2002 |
| JP | 2004-061359 | 2/2004 |
| JP | 2004-247405 | 9/2004 |
| JP | 2005-071333 | 3/2005 |
| JP | 2005-063033 | 10/2005 |

(56) References Cited

FOREIGN PATENT DOCUMENTS

| | | |
|---|---|---|
| WO | WO 2004/086270 | 10/2004 |
| WO | WO 2006/050404 | 5/2006 |

OTHER PUBLICATIONS

Agarwal et al., "A High Performance Parallel Algorithm for 1-D FFT", Proceedings, Supercomputing '94, Washington, D.C., Nov. 14-18, 1994, pp. 34-40.
Annaratone et al., "The Warp Computer: Architecture, Implementation, and Performance", Dept. of Computer Science, The Robotics Institute, Carnegie Mellon University, Pittsburgh, PA, Jul. 1987, pp. 31.
Bósa et al., "Task Logging, Rescheduling and Peer Checking in Distributed Maple", RISC-Linz, Johannes Kepler University, Linz, Austria. Technical Report No. 02-10, Mar. 18, 2002, pp. 24.
Carns et al., "An Evaluation of Message Passing Implementations on Beowulf Workstations", Aerospace Conference, Mar. 6-13, 1999, IEEE 1999, vol. 5, pp. 41-54.
Chu et al., "FFT Algorithms and their Adaptation to Parallel Processing", Linear Algebra and its Applications, vol. 284, 1998, pp. 95-124.
Cramer, et al., "The Development and Integration of a Distributed 3D FFT for a Cluster of Workstations", Proceedings of the 4th Annual Liux Showcase & Conference, Atlanta, GA, Oct. 10-14, 2000, pp. 1-9.
Dally et al., "Merrimac: Supercomputing with Streams", SC'03, Nov. 15-21, 2003, Phoenix, AZ, pp. 8.
Dauger et al., "'Plug-and-Play' Cluster Computing using Mac OS X", Proceedings. 2003 IEEE International Conference on Cluster Computing, Dec. 1-4, 2003, published Jan. 2004, pp. 6.
Dauger et al., "Plug-and-Play Cluster Computing: High-Performance Computing for the Mainstream", IEEE Computing in Science and Engineering, Mar./Apr. 2005, pp. 27-33.
Declaration of Henry Tufo, Ph.D., under 37 C.F.R. § 1.68 in Support of Petition for Inter Partes Review of U.S. Pat. No. 8,082,289, dated Sep. 18, 2020 in 160 pages.
Declaration of Sylvia Hall-Ellis Ph.D., for Inter Partes Review of U.S. Pat. No. 8,082,289, dated Sep. 18, 2020 in 138 pages.
Declaration of Wolfgang Schreiner, Ph.D., for Inter Partes Review of U.S. Pat. No. 8,082,289, dated Sep. 7, 2020 in 84 pages.
"Distributed Maple", https://web.archive.org/web/20040216100904/http:/www.risc.uni-linz.ac.at/software/distmaple/ as archived Feb. 16, 2004 in 1 page.
"Distributed Maple Papers", https://web.archive.org/web/20040304035455/http://www.risc.uni-linz.ac.at/software/distmaple/index_1.html as archived Mar. 4, 2004 in 3 pages.
Erez, Mattan, "Merrimac—High-Performance and Highly-Efficient Scientific Computing with Streams", A Dissertation Submitted to the Department of Electrical Engineering and the Committee on Graduate Studies of Stanford University in Partial Fulfillment of the Requirements for the Degree of Doctor of Philosophy, May 2007, pp. 229.
Fan et al., "GPU Cluster for High Performance Computing", SC '04: Proceedings of the 2004 ACM/IEEE Conference on Supercomputing : Nov. 6-12, 2004, Pittsburgh, PA, USA, pp. 12.
Frigo et al., "FFTW User's Manual", Version 2.1.5, Mar. 16, 2003, pp. 74.
"grid*Mathematica* 1.1: Grid Computing Gets a Speed Boost from *Mathematica* 5", The Mathematica Journal, vol. 9, No. 2, Aug. 25, 2003, in 1 page. <https://web.archive.org/web/20040618053429/https://www.mathematica-journal.com/issue/v9i2/newproducts/gridmathematica.html>.
Hamscher et al., "Evaluation of Job-Scheduling Strategies for Grid Computing", GRID 2000, 2000, pp. 191-202.
Haynos, Matt, "Perspectives on Grid: Grid Ccomputing—Next-Generation Distributed Computing", IBM Developer Works, Jan. 27, 2004 in 7 pages, http://www-106.ibm.com/developerworks/library/gr-heritage.
Heal et al., "Maple V: Learning Guide", Springer, Waterloo Maple Inc., 1996, 1998, pp. 300.
Hillis, W. Daniel, "Richard Feynman and The Connection Machine", for Physics Today, originally published 1989, http://longnow.org/essays/richard-feynman-connection-machine/, printed Oct. 1, 2019, pp. 8.
"Install", File, Distributed Maple Application Software, Jun. 16, 2000, pp. 5.
"Install", File, Distributed Maple, Mar. 28, 2003, pp. 4.
Source Code, "Berlekamp Distinct Degree Factorization", Distributed Maple Application Software from the "distsoft" directory, v. 1.1, Jul. 26, 2001, pp. 58.
Source Code, "CASA NeighbGraph", Distributed Maple Application Software from the "distsoft" directory, v. 1.6, Jan. 9, 2001, pp. 47.
Source Code, "Maple Interface to Java Scheduler", Distributed Maple, dist.maple5, v 1.63, Mar. 28, 2003, pp. 28.
Jain et al., "Data Clustering: A Review", ACM Computing Surveys, Sep. 1999, vol. 31, No. 3, pp. 264-323.
Kepner et al., "Parallel Matlab: The Next Generation", MIT Lincoln Laboratory, Lexington, MA, Aug. 20, 2004, pp. 2.
Kim et al., "Introduction to Parallel Programming and pMatlab v2.0", MIT Lincoln Laboratory, Lexington, MA, 2011, pp. 30.
Kofler, Michael, "Maple: An Introduction and Reference", Addison-Wesley, 1997, pp. 545.
Konishi, et al., "Performance Evaluation of Parallel Computing Tool for MATLAB on PC Grid Environment," IPSJ SIG Technical Reports, Aug. 5, 2005, vol. 2005, No. 84, pp. 9.
Maeder, Roman, "Mathematica: Parallel Computing Toolkit—Unleash the Power of Parallel Computing", Wolfram Research, Jan. 2005, pp. 95.
Matsumura, et al. "Construction of Distributed Computing System for Large-Scale Matrices Intended or Reduction of Communication Blocks", Aug. 5, 1998, vol. 98, No. 18, pp. 9.
"MPI: A Message-Passing Interface Standard", Message Passing Interface Forum, Jun. 12, 1995, pp. 239.
Pau et al., "Distributed Mathematica—User and Reference Manual", Jul. 5, 2000, pp. 18.
"Pingpong MPI Benchmark—SEM vs 'grid'", Dauger Research, Inc., Jan. 2009, 1 page, http://daugerresearch.com/pooch/mathmatica/.
"Readme File", Distributed Maple Application Software, Jul. 26, 2001, pp. 3.
"Readme File", Distributed Maple 1.1.15, Mar. 28, 2003, pp. 5.
Reference Manual, Transputer, Inmos, IMS, Jan. 1987, pp. 162.
Schreiner et al., "Distributed Maple: Parallel Computer Algebra in Networked Environments", Journal of Symbolic Computation, Mar. 2003, vol. 35, No. 3, pp. 305-347.
Schreiner, Wolfgang, "Distributed Maple—User and Reference Manual (V 1.1.12)", Research Institute for Symbolic Computation (RISC-Linz), Johannes Kepler University, A-4040 Linz, Austria, Jul. 6, 2001, pp. 1-37.
Sherwani et al., "Libra: A Computational Economy-Based Job Scheduling System for Clusters", Software-Practice and Experience, 2004, vol. 34, pp. 573-590.
Tatebe et al., "Efficient Implementation of MPI Using Remote Memory Write," Transactions of Information Processing Society of Japan, May 1999, vol. 40, No. 5, pp. 14.
Tepeneu et al., "MathGridLink—A Bridge Between Mathematica and 'the Grid'", Department of Computer Science, Graduate School of Systems and Information Engineering, University of Tsukuba, 2003, pp. 4.
U.S. Appl. No. 60/799,474, filed May 10, 2006, titled "Graphical Interface for Monitoring Status of a Concurrent Computing Process", in 45 pages.
U.S. Appl. No. 60/813,738, filed Jun. 13, 2006, titled "Pooch/Mathmatica Interface", in 6 pages.
U.S. Appl. No. 60/850,908, filed Oct. 11, 2006, titled "Poochmpi Toolkit for Mathematica", in 25 pages.
"Wolfram grid*Mathematica*™", <http://www.wolfram.com/products/gridmathematica/> as printed Oct. 3, 2007 in 2 pages.
Wolfram, Stephen, "The Mathematica Book", 5th Edition, Wolfram Research, Inc., 2003, pp. 1486.

(56) References Cited

OTHER PUBLICATIONS

Nvidia Power of Attorney, Oct. 5, 2020, pp. 2.
Ex. 2001—Singh Declaration, Feb. 9, 2021, pp. 42.
Ex. 2002—Singh CV, pp. 4.
Ex. 2007—Bhansali Declaration, Feb. 9, 2021, pp. 5.
Ex. 2008—Bancroft Declaration, Feb. 9, 2021, pp. 13.
Ex. 2009—SEM Poster, 2009, pp. 1.
Ex. 2011—SEM Manual, pp. 20.
Ex. 2012—SEM White Paper, 2007, pp. 20.
Ex. 2013—SET White Paper, pp. 7.
Ex. 2014—SET Manual, pp. 67.
Ex. 2015—SET Presentation, Dec. 2011, pp. 54.
Ex. 2016—SET Datasheet, pp. 4.
Ex. 2017—Parallel Bars the Economist, Jun. 4, 2011, pp. 9.
Ex. 2018—SET Presentation, HPC for the Missing Middle!, Dec. 2011, pp. 4.
Ex. 2019—DOE Review of Plasma Visualization Project, 2015, pp. 5.
Ex. 2020—SET Data Sheet given to Jones, pp. 4.
Ex. 2021—DOE Review of Expanded Validation Project, 2015, pp. 5.
Ex. 2022—DOE Review of SET Windows Implementation, 2015, pp. 5.
Ex. 2023—SEM an Independent Report, 2008, pp. 2.
Ex. 2024—Multicore Parallelism presentation, Feb. 2011, pp. 2.
Ex. 2025—DOE SET Windows Project Narrative, pp. 2.
Ex. 2026—DOE Topics, pp. 11.
Ex. 2027—Dauger Declaration, Feb. 9, 2021, pp. 30.
Ex. 2028—Nexus Claim Chart—SEM—768 Patent, pp. 13.
Ex. 2029—Nexus Claim Chart—SET—768 Patent, pp. 17.
Exhibit 1002—File History of U.S. Pat. No. 10,333,768 B2, pp. 627.
Exhibit 1005—Declaration of Henry Tufo, Oct. 2, 2020, pp. 132.
Exhibit 1006—Declaration of Wolfgang Schreiner, Oct. 1, 2020, pp. 85.
Exhibit 1007—Declaration of Sylvia Hall-Ellis, Oct. 5, 2020, pp. 109.
Exhibit 1019—SUN Debuts UltraSPARC IV (2003), pp. 2.
Exhibit 1020—AMD to Unveil Dual-Core PC Chips (2005), May 31, 2005, pp. 1.
Ex. 2030—Dauger Declaration, Feb. 9, 2021, pp. 31.
Ex. 2031—Nexus Claim Chart—SEM—768 Patent, pp. 13.
Ex. 2032—Nexus Claim Chart—SET—768 Patent, pp. 40.
Exhibit 1105—Declaration of Henry Tufo, Oct. 9, 2020, pp. 147.
Exhibit 1106—Declaration of Wolfgang Schreiner, Oct. 1, 2020, pp. 85.
Exhibit 1107—Declaration of Sylvia Hall-Ellis, Oct. 9, 2020, pp. 255.
Exhibit 1134—Maple 5—PC Magazine (1992).
Exhibit 1135—Maple V Looks Better with Improved Graphics—PC Magazine.
Exhibit 1136—Nayak, A Library based compiler to execute MATLAB Programs.
Ex. 2001—Singh Declaration, Feb. 9, 2021, pp. 41.
Ex. 2033—Dauger Declaration, Feb. 10, 2021, pp. 30.
Ex. 2034—Nexus Claim Chart—SEM—612 Patent, pp. 11.
Ex. 2035—Nexus Claim Chart—SET—612 Patent, pp. 14.
Exhibit 1002—File History of U.S. Pat. No. 8,140,612 B2.
Exhibit 1005—Declaration of Henry Tufo, Oct. 16, 2020, pp. 127.
Exhibit 1006—Declaration of Wolfgang Schreiner, Oct. 1, 2020, pp. 86.
Exhibit 1007—Declaration of Sylvia Hall-Ellis, Oct. 16, 2020, pp. 178.
Exhibit 1019—Deitel—Operating Systems, 2004, pp. 1270 (2parts).
Exhibit 1020—Chen et al., TH-MPI_ OS Kernel Integrated Fault Tolerant MPI (2001), pp. 75-82.
Exhibit 1026—Jin et al., LiMIC_ Support for High-Performance MPI Intra-Node Communication on Linux, 2005, pp. 184-191.
Ex. 2001—Singh Declaration, Feb. 17, 2021, pp. 40.
Ex. 2036—Dauger Declaration, Feb. 15, 2021, pp. 30.
Ex. 2037—Nexus Claim Chart—SEM—877 Patent, pp. 33.
Ex. 2038—Nexus Claim Chart—SET—877 Patent, pp. 50.
Exhibit 1002—File History of U.S. Pat. No. 8,676,877 B2.
Exhibit 1005—Declaration of Henry Tufo, Oct. 23, 2020, pp. 130.
Exhibit 1007—Declaration of Sylvia Hall-Ellis, Oct. 23, 2020, pp. 186.
Extended European Search Report received in European Application No. 17207443.7, dated Aug. 8, 2018, in 9 pages.
International Search Report and Written Opinion received in PCT Application No. PCT/US2006/037275, dated Sep. 24, 2007 in 5 pages.
International Search Report and Written Opinion received in PCT Application No. PCT/US2007/070585, dated Sep. 11, 2008 in 5 pages.
"128 Xserve G5 Cluster Achieves 1 21 TeraFlop", Jan. 14, 2005, https://www.hpcwire.com/2005/01/14/128-xserve-g5-cluster-achieves-1-21-teraflop/, pp. 2. [NVIDIA-ACS-0239003—NVIDIA-ACS-0239004].
Advanced Cluster Systems, LLC, "Math Supercomputer-in-A-Box", 2007, pp. 1. [NVIDIA-ACS-0237306].
Bekker, Scott, "HPC Edition of Windows Server 2003 on Top for 2005", ENT News, Jun. 23, 200, pp. 3. [NVIDIA-ACS-0238316—NVIDIA-ACS-0238320].
Bekker, Scott, "Microsoft Enterprise Product Roadmap for 2005", Redmond Channel Partner, January 10, 2005, pp. 14. https://rcpmag.com/articles/2005/01/10/microsoft-enterprise-product-roadmap-for-2005.aspx [NVIDIA-ACS-0239391—NVIDIA-ACS-0239404].
Bekker, Scott, "Muglia Updates Windows Server Roadmap", MCP Mag, Dec. 10, 2004, pp. 5, https://mcpmag.com.articles/2004/12/10/muglia-updates-windows-server-roadmap.aspx [NVIDIA-ACS-0239405—NVIDIA-ACS-0239409].
Bernardin, Laurent, "Maple on the Intel Paragon", Oct. 15, 1996, pp. 7, https://www.research-collection.ethz.oh/handle/20.500.11850/68829 [NVIDIA-ACS-0172328—NVIDIA-ACS-0172334].
CCS Sample RIS Scripts, 2003, pp. 55. [NVIDIA-ACS-0237326—NVIDIA-ACS-0237380].
Choy, Long Yin, "MATLAB*P 2.0: Interactive Supercomputing Made Practical", Thesis, MIT, Sep. 2002, pp. 67. [NVIDIA-ACS-0233448—NVIDIA-ACS-0233514].
Choy, Long Yin, "Chapter 1", Draft, MIT, Sep. 2002, pp. 10. [NVIDIA-ACS-0233432—NVIDIA-ACS-0233447].
Chinchilla et al., "Parallel N-Body Simulation using GPUs", Technical Report TR04-032, Dec. 2004, pp. 8. [NVIDIA-ACS-0165482—NVIDIA-ACS-0165489].
"Computer Cluster Jobs Aids", Windows Server 2003 Deployment kit, 2003, pp. 80. [NVIDIA-ACS-0238212—NVIDIA-ACS-0238291].
"Compute Cluster Server: Getting Started", 2006, pp. 1. [NVIDIA-ACS-0238300].
"Computer Cluster Server Glossary", Dec. 5, 2005, pp. 6. [NVIDIA-ACS-0238292—NVIDIA-ACS-0238297].
"Computer Cluster Server Setup Command-Line Interface Reference", Jun. 6, 2006, pp. 2. [NVIDIA-ACS-0238298—NVIDIA-ACS-0238299].
"Compute Cluster Server: Technical Reference", 2007, pp. 2. [NVIDIA-ACS-0238301—NVIDIA-ACS-0238302].
Cotronis et al., "Recent Advances in Parallel Virtual Machine and Message Passing Interface", 8th European PVM/MPI Users' Group Meeting. Santorini/Thera, Greece, Sep. 2001. Proceedings, pp. 456, [NVIDIA-ACS-0170449—NVIDIA-ACS-0170904]. (in 2 parts).
Crownie et al., "A Standard Interface for Debugger Access to Message Queue Information in MPI", Conference Paper, September 1999, pp. 9. [NVIDIA-ACS-0232908—NVIDIA-ACS-0232916].
Dauger, Dean, "DR's Pooch Cluster Software for MAC OS X v10.4 'Tiger '", https://www.prweb.com/releases/2005/04/prweb234831.htm, Apr. 29, 2005, pp. 3. [NVIDIA-ACS-0239021—NVIDIA-ACS-0239023].
Dauger, Dean, "Pooch Application", Pooch Quick Start, Parallel Operation and Control Heuristic Application, Version 1.2.1. 2002, pp. 61. [DR_NVIDIA_000006—DR_NVIDIA_000068].
Dauger, Dean, "Pooch Application", Pooch Quick Start, Parallel Operation and Control Heurisitc Application, Version 1.4, 2004, pp. 82. [DR_NVIDIA_000160—DR_NVIDIA_000241].

(56) References Cited

OTHER PUBLICATIONS

Dauger, Dean, "Pooch Application ", Parallel Operation and Control heuristic Application, Version 1.3.5, 2003, pp. 67. [DR_NVIDIA_000400—DR_NVIDIA_000466].
Dauger, Dean, "The Launch Den Mother and Launch Puppy", Advanced Information, 2000, pp. 10. [DR_NVIDIA_000006—DR_NVIDIA_000068].
Dauger, Dean, "The Launch Den Mother and Launch Puppy", Read Me, 1999, pp. 10. [DR_NVIDIA_000703—DR_NVIDIA_000712].
Duager et al., "Numerically-Intensive 'Plug-and-Play' Parallel Computing", Proceedings. 2001 IEEE Cluster, pp. 8. [ACS_NVIDIA_005621—ACS_NVIDIA_005628].
Dauger, Dean E. "Plug-and-Play Cluster Computing Brings HPC to the Mainstream", 2007, pp. 1. [NVIDIA-ACS-0239454].
Dauger et al., "'Plug-and-Play' Cluster Computing: High-Performance Computing for the Mainsteam", Computing in Science & Engineering, Jan./Feb. 2005, pp. 22-28. [ACS_NVIDIA_005607—ACS_NVIDIA_005613].
Dauger et al., "'Plug-and-Play' Cluster Computing: HPC Designed for the Mainstream Scientist", ICCS 2005, pp. 7. [ACS_NVIDIA_005614—ACS_NVIDIA_005620] & [NVIDIA-ACS-0170905—NVIDIA-ACS-0170911].
Dauger Research, Computing in Science & Engineering, Excerpt, Mar./Apr. 2005, pp. 2. [ACS_NVIDIA_005634—ACS_NVIDIA_005635].
Dauger Research, "Keeping America Strong Award", 2005, pp. 3. [NVIDIA-ACS-0239455—NVIDIA-ACS-0239457].
Dauger Research, "Paralell Zoology", Dauger Research Vault, 2006, pp. 7. [NVIDIA-ACS-0239455—NVIDIA-ACS-0239457].
Dauger Research, "Paralellization", Dauger Research Vault, 2006, pp. 3. [NVIDIA-ACS-0237209—NVIDIA-ACS-0237211].
Dauger Research, "Parallelization—Parallel Adder", Dauger Research Vault, 2006, pp. 7. [NVIDIA-ACS-0237154—NVIDIA-ACS-0237160].
Dauger Research, "Parallelization—Parallel Circle Pi", Dauger Research Vault, 2006, pp. 13. [NVIDIA-ACS-0237161—NVIDIA-ACS-0237173].
Dauger Research, "Parallelization—Parallel Knock", Dauger Research Vault, 2006, pp. 4. [NVIDIA-ACS-0237174—NVIDIA-ACS-0237177].
Dauger Research, "Parallelization—Parallel Life", Dauger Research vault, 2006, pp. 14. [NVIDIA-ACS-0239455—NVIDIA-ACS-0239457].
Dauger Research, "Parallelization—Parallel Pascal's Triangle", Dauger Research Vault, 2006, pp. 10. [NVIDIA-ACS-0237192—NVIDIA-ACS-0237201].
Dauger Research, "Pooch Application: Parallel Operation and Control Heusitic Application", Dauger Research Vault, Apr. 26, 2001, pp. 1. [NVIDIA-ACS-0239122].
Dauger Research, "Pooch Quick Start", Pooch Application, Parallel Operation and Control Heuristic Application, Version 1.3, 2002, pp. 65. [NVIDIA-ACS-0239123—NVIDIA-ACS-0239187].
Dauger Research, "Pooch Quick Start", Pooch Application, Parallel Operation and Control Heuristic Application, Version 1.4, 2004, pp. 82. [NVIDIA-ACS-0239188—NVIDIA-ACS-0239269].
Dauger Research, "Pooch Quick Start", Pooch Application, Parallel Operation and Control Heuristic Application, Version 1.5, 2004, pp. 98. [NVIDIA-ACS-0239270—NVIDIA-ACS-0239367].
Dauger Research, "Plug-and-Play" Clustering, Build your cluster in minutes!, Apple HPC Seminar Series, 2002, pp. 66.[ACS_NVIDIA_001238—ACS_NVIDIA_001303].
Dauger Research, "Pooch Selected for Omneta Supercomputer", Paris, France. Apple Expo, Sep. 21, 2005, pp. 1. [NVIDIA-ACS-0239020].
Dauger Research, "Pooch, Build Your Personal Computing Cluster in minutes!", 2004, pp. 4. [DR_NVIDIA_000002—DR_NVIDIA_000005].
Dauger Research, "Pooch", Supercomputer-Style Cluster Computing Support for Mathematica, 2006, pp. 4. [NVIDIA-ACS-0237307—NVIDIA-ACS-0237310].
Dauger Research, "The PoochMPI Toolkit", High-Performance Computing with Mathematica, Wolfram Technology Conference 2006, Champaign, IL, pp. 45. [NVIDIA-ACS-0237217—NVIDIA-ACS-0237261] (In 3 parts).
Dauger Research, "Visualizing Message Passing with MacMPI", Dauger Research Vault, 2008, pp. 5. [NVIDIA-ACS-0237212—NVIDIA-ACS-0237216].
Dauger Research, "What's New", SET and SET/Scilab debut at Supercomputing 2012, 2012. pp. 25. [NVIDIA-ACS-0239456—NVIDIA-ACS-0239482].
Declaration of Wolfgang Schreiner, Ph.D., for Inter Partes Review of U.S. Pat. No. 10,333,768, dated Oct. 1, 2020 in 85 pages. [NVIDIA-ACS-0170912—NVIDIA-ACS-0170996].
Decyk, Vikto K., "Advanced PIC Techniques: Parallelization and Object-Oriented Programming", Proceedings of ISSS-7, Mar. 26-31, 2005, pp. 3. [NVIDIA-ACS-0170997—NVIDIA-ACS-0170999].
Decyk et al., "AppleSeed: A Parallel Maintosh Cluster for Numerically Intensive Computing", Jan. 2001, pp. 8. [ACS_NVIDIA_005692—ACS_NVIDIA_005699].
Decyk et al., "AppleSeed: A Parallel Macintosh Cluster for Numerically Intensive Computing", Jan. 2001, pp. 6. [ACS_NVIDIA_005700—ACS_NVIDIA_005705].
Decyk et al., "AppleSeed: A Parallel Macintosh Cluster for Scientific Computing", 2003, pp. 16. [ACS_NVIDIA_005638—ACS_NVIDIA_005653].
Decyk et al., "How to Build an AppleSeed: A Parallel Macintosh Cluster for Numerically Intensive Computing", Jan. 2001, pp. 11. [ACS_NVIDIA_005680—ACS_NVIDIA_005690].
Decyk et al., "Supercomputing for the Masses: A Parallel Macintosh Cluster", 2002, pp. 10-22. [NVIDIA-ACS-0171000—NVIDIA-ACS-0171012].
"Deploying and Managing Microsoft Windows Compute Cluster Server 2003", Microsoft, Jun. 6, 2006, pp. 10. [NVIDIA-ACS-0238305—NVIDIA-ACS-0238314].
Edelman et al., "Interactive Supercomputing's Star-P Platform: Parallel MATLAB and MPI Homework Classroom Study on high Level Language Productivity", 2006, pp. 2. [NVIDIA-ACS-0239024—NVIDIA-ACS-0239025].
Evers, Joris, "Windows Server for Supercomputers Delayed", Network World, Apr. 6, 2005, pp. 2. htttps://www.computerworld.com/article/2556337/windows-server-for-supercomputers-delayed.html [NVIDIA-ACS-01239410—NVIDIA-ACS-0239411].
Ferron, Jay, "Microsoft Compute Cluster Server Partner Training", Windows Compute Cluster Server 2003, 2005, pp. 161. [NVIDIA-ACS-01237381—NVIDIA-ACS-0237541].
Fried, Ina, "Gates Touts Microsoft's Supercomputing Move", ZD Net, Nov. 15, 2005, pp. 3. [NVIDIA-ACS-0239412—NVIDIA-ACS-0239414].
Frigo et al., "The Fastest Fourier Transfor in the West", Technical Report, MIT, Sep. 11, 1997, pp. 20. [NVIDIA-ACS-0165490—NVIDIA-ACS-0165509].
"Getting Started with Compute Cluster 2003", Chapter 2, Desiging Unattented Installations, Jun. 2006, pp. 72. https://download.microsoft.com/downloads/e/2/e2bfb017-8525-4991-bbd5-7d7081f3d225.
"Getting Started with Star-P Taking Your First Test Drive", Interactive Supercomputing, Inc., 2006, pp. 32. [NVIDIA-ACS-0233516—NVIDIA-ACS-0233547].
"gridMathematica 2: Grid Mathematica Extras", Wolfram Research, Nov. 9, 2006, in 1 page. https://web.archive.org/web/20061109144357/http://www/wolfram.com/products/gridmathematica/extras.html [NVIDIA-ACS-0239822].
Gruber et al., "Choosing an Automated Installation Method", Chapter 1, Microsoft Windows Server 2003 Deployment Kit, Automating and Customizing Installations, 2003, pp. 18. [NVIDIA-ACS-0238572—NVIDIA-ACS-0238589].
Gruber et al., "Introduction", Microsoft Windows Server 2003 Deployment Kit, Automating and Customizing Installations, 2003, pp. 8. [NVIDIA-ACS-038590—NVIDIA-ACS-0238597].
Hemsoth, Nicole, "Startup Aims to Bring Parallel Applications to the Masses", HPC Wire, Nov. 16, 2011, pp. 4. [NVIDIA-ACS-0165918—NVIDIA-ACS-0165921].

(56) References Cited

OTHER PUBLICATIONS

HPC Wire, "Advanced Cluster System Unveils Software that Parellelizes Sequential Apps", Nov. 1, 2011, pp. 1. [NVIDIA-ACS-0239483].

Husbands, Parry, "Interactive Supercomputing", Thesis, MIT, Feb. 1990, pp. 97. http://dspace.mit.edu/bitsteak/handle/1721.1/79973/42430246-MIT.pdf;sequence=2 [NVIDIA-ACS-0233548—NVIDIA-ACS-0233644].

Husbands, Parry, "Interactive Supercomputing with MITMatlab", Aug. 2001, pp. 10. https://math.mit.edu/~edelman/publications/interactive_supercomputing.pdf [NVIDIA-ACS-0239026—NVIDIA-ACS-0239035].

Johnston, Stuart J., "Gates: Microsoft Ships Beta 2 of HPC Cluster Version of Windows", MCP Msg, Nov. 16, 2005, pp. 2. [NVIDIA-ACS-0239415—NVIDIA-ACS-00239416].

Kahnet, Leander, "That's a whole Lot of Power, Mac", Wired, Jan. 29, 2002, pp. 9. [NVIDIA-ACS-0239372—NVIDIA-ACS-0239380].

Kepner et al., "MatlabMPI", Jan. 3, 2003, pp. 12. https://arxiv.org/pdf/astro-ph/0305090.pdf [NVIDIA-ACS-0239036—NVIDIA-ACS-00239047].

Khot et al., "A Parallel Data Mining Toolbox Using MatlabMPI", August 2004, pp. 44. [NVIDIA-ACS-0239048—NVIDIA-ACS-0239091].

Krishnann et al., "Windows Compute Cluster Server and Deskside Clusters: An Overview", Microsoft WinHEC 2006, pp. 30 [NVIDIA-ACS-0239417—NVIDIA-ACS-0239446].

Lai, Eric "Microsoft Offers Bete 2 of Compute Cluster Server 2003", Computerworld, Nov. 15, 2005, pp. 4. https://www/computerworld.com/article/2559328/microsoft-offers-beta-2-of-compute-cluster-server-2003.html [NVIDIA-ACS-0239447—NVIDIA-ACS-0239450].

Lantz, Eric, "Introduction to Windows 2003 Compute Cluster Edition", Datacenter Fabric Workshop Windows IB, Aug. 22, 2005, pp. 28. [NVIDIA-ACS-0238622—NVIDIA-ACS-0238649].

Martens, China, "Platform Steps Up Partnership with Microsoft", InfoWorld, Nov. 15, 2005, pp. 3. https://www.infoworld.com/article/2673914/platform-steps-up-partnership-with-microsoft.html [NVIDIA-ACS-0239457—NVIDIA-ACS-0239453].

Microsoft, "Acceleratiiong Scientific Discovery with Microsoft Windows Compute Cluster Server 2003", 2003, pp. 10. http://download.microsoft.com/download/8/6/1/86149563-03ec-427e-80f1-d683bd715b2b/Bio%20Team%20and%20Life%20Sciences%20Solution%20Brief.pdf [NVIDIA-ACS-0237316—NVIDIA-ACS-0237325].

"Microsoft Aims to Enter Supercomputer Market", Reuters, Nov. 15, 2005, pp. 364. [NVIDIA-ACS-0239623—NVIDIA-ACS-0239986] (In 4 parts).

Microsoft, "Bill Gates Shares Microsoft's Vision for Technical Computing", Nov. 15, 2005, pp. 5. https://news.microsoft.com/2005/11/15/bill-gates-shares-microsofts-vision-for-technical-computing/ [NVIDIA-ACS-0237311—NVIDIA-ACS-0237315].

Microsoft "Cluster Components and Interconnects", Microsoft Windows 2000, Jan. 5, 2001, pp. 3. [NVIDIA-ACS-0237553—NVIDIA-ACS-0237555].

Microsoft, "Increasing the Value of Simulation While Shrinkinf the Costs", Microsoft Windows Compute Cluster Server 2003 Partner Solution Brief, Mar. 2007, pp. 6. [NVIDIA-ACS-0237556—NVIDIA-ACS-0237561].

Microsoft, "On-Demand Supercomputing Multiples the Possibilities", Microsoft Windows Compute Cluster Server 2003 Partner Solution Brief, Apr. 2007, pp. 7. [NVIDIA-ACS-0237542—NVIDIA-ACS-0237548].

Microsoft, "Microsoft Releases Windows Compute Cluster Server 2003, Brining High Performance Computing to the Mainstream", Microsoft.com, Jun. 9, 2006, pp. 6. [NVIDIA-ACS-0238395—NVIDIA-ACS-0238400].

Microsoft, "Parallel Programming Software", Microsoft.com, Jan. 26, 2001, pp. 4. [NVIDIA-ACS-0238406—NVIDIA-ACS-0238409].

Microsoft, "Technical Computing Tools Combined with Clusters Computing Deliver high-Performance Solutions", Microsoft Windows Compute Cluster Server 2003 Partner Solution Brief, May 2007, pp. 6. [NVIDIA-ACS-0238598—NVIDIA-ACS-0238603].

Microsoft, "Windows Compute Cluster Server 2003", Overview, Sep. 2005, pp. 12. [NVIDIA-ACS-00238610—NVIDIA-ACS-0238621].

Microsoft, "Windows Server 2003 Deployment Kit, Automating and Customizing Installations", Oct. 19, 2005, pp. 3. [NVIDIA-ACS-0238315—NVIDIA-ACS-0238317].

"Micorsoft Windows Server 2003 Deployment kit, Automating and Customizing Installations, A Resource Kit Publication", 2003, pp. 359. [NVIDIA-ACS-0237567—NVIDIA-ACS-0237925].

"Micosoft Windows Server 2003 Deployment Kit, Automating and Customizing Installations, A Resource Kit Publicaton", 2003, pp. 286. [NVIDIA-ACS-0237926—NVIDIA-ACS-0238211].

Moore, Charles Apple Ends DIY Repairs, Does Mac mini Kill the Used Mac Market!, USB Drive Kit Matches Mac mini, and More, May 13, 2005, pp. 15. https://lowendmac.com/newsrev/05/0513.html [NVIDIA-ACS-0239005—NVIDIA-ACS-0239019].

Nayak, Anshuman, "Design and Characterization of MATLAB Functions on a Distributed and Hereogeneous Syste,", Center for Parallel and Distributed Computing, Technical Report No. DPDC-TR-9912*021, Dec. 1999, pp. 98. [NVIDIA-ACS-0234790—NVIDIA-ACS-0234887*].

"Omneta Technology: Pooch", Omneta PLC, Oct. 30, 2005, pp. 1. [NVIDIA-ACS-0239121].

Partial MPI Library based on the program-to-Program Communications ToolBoc in the Macintosh OS, Nov. 8, 2000, pp. 65. [NVIDIA-ACS-0172347—NVIDIA-ACS-0172411].

Pelkán, Josef, "Interconnect Efficiency of Tyan P5C T-630 with Microsoft Compute Cluster Server 2003", pp. 1-5. [NVIDIA-ACS-0237562—NVIDIA-ACS-0237566].

"QuickSilver Software Architecture", Software, Data Sheet, Nov. 2005, pp. 4. [NVIDIA-ACS-0236410—NVIDIA-ACS-0238413].

SC 05, Seattle, WA, 2005, Press Releases, "Microsoft Chairman and Chief Softwware Architect Bill Gates to Deliver Keynote at SC|05 Conference", Jul. 25, 2005, pp. 2. [NVIDIA-ACS-0239987—NVIDIA-ACS-0239968].

SC 05, Seattle, WA, 2005, Technical Papers, Nov. 12-18, 2005, pp. 5. [NVIDIA-ACS-0239989—NVIDIA-ACS-0239993].

SC 05, Seattle, WA, 2005, Tutorials, Nov. 12-18, 2005, pp. 3. [NVIDIA-ACS-0239994—NVIDIA-ACS-0239996].

SC 09, Portland, OR, 2009, Conference Program, Nov. 14-20, 2009, pp. 158. [NVIDIA-ACS-0238414—NVIDIA-ACS-0238571](in 4 parts).

Schreiner et al., "Distributed Maple: Lessons Learned on Parallel Computer Algebra in Distributed Enviornments", Presentation, 2003, pp. 47. [NVIDIA-ACS-0237089—NVIDIA-ACS-0237135].

Schreiner, Wolfgang, "Manager-Workr Parallelism versus Dataflow in a distributed Computer Algebra System" Research Institute for Symbolic Computation (RISC-Linz), Johannes Kepler University. A-4040 Linz, Austria, 2001, pp. 15. [NVIDIA-ACS-0237074—NVIDIA-ACS-0237088].

Schreiner, Wolfgang, "Manager-Worker Parallelism versus Dataflow in Distributed Maple", Research Institute for Symbolic Computation (RISC-Linz), Johannes Kepler University, A-4040 Linz, Austria, Dec. 13, 2000, pp. 23. [NVIDIA-ACS-0237051—NVIDIA-ACS-0237073].

Deidel, Brent, "Sample Software", May 24, 2000, pp. 2. https://web.archive.org/web/20050220000225/http://www.serv.net/~bseidel/AppleSeed/Software.html [NVIDIA-ACS-0240006—NVIDIA-ACS-0240007].

Silberschatz et al., "Applied Operating System Concepts", First Edition, Joh Wiley & Sons, Inc., 2000, pp. 841. ([NVIDIA-ACS-0172412—NVIDIA-ACS-0173252] (in 2 parts).

Sonnevelf, Nick, "Star-P/MATLAB Installation Notes", Jan. 18, 2007, pp. 8. [NVIDIA-ACS-0233675—NVIDIA-ACS-0233682].

Sonneveld, Nick, "Star-P Client Installation", Jan. 18, 2007, pp. 30. [NVIDIA-ACS-0233645—NVIDIA-ACS-0233673].

Supercomputing 2005—Floor Map, Level 4, Exhibit Halls, pp. 1. [NVIDIA-ACS-029997].

(56) References Cited

OTHER PUBLICATIONS

Supercomputing 2005—Exhibitor Freight Move in Schedule, Level 4, Exhibit Halls, pp. 2. [NVIDIA-ACS-0239998—NVIDIA-ACS-0239999].
"The Power of Distributed Computing in Cancer Research", Supercomputing 2005 Keynote Demonstration, 2005, pp. 2. [NVIDIA-ACS-0238402—NVIDIA-ACS-0238403].
"Topics", Cornell University, Cornell Theory Center, 2005, pp. 2. [NVIDIA-ACS-0238303—NVIDIA-ACS-0238304].
"Update to Pooch Software Enhances the Cluster Experience", PRWeb, https://www.prweb.com/releases/2006/01prweb330475.htm, Jan. 10, 2006. pp. 4. [NVIDIA-ACS-0239368—NVIDIA-ACS-0239371].
Windows in Financial Services, "Microsoft's Leadership in Distributed Enterprise Computing Builds Case for HPC", as archived Nov. 13, 2004, pp. 2. [NVIDIA-ACS-0238404—NVIDIA-ACS-0238405].
"Windows Server 2003 Deployment Kit: Automating and Customizing Installations", 2003, pp. 349. [NVIDIA-ACS-0238652—NVIDIA-ACS-0238998].
Wolfram Library Archive, "High-Performance Computing with Mathematica. The PoochMPI Toolkit", library.wolfram.com/infocenter/Conferences/6455, pp. 2. [NVIDIA-ACS-00237262—NVIDIA-ACS-0237263].
Wolfram Library Archive, "Microsoft Windows Compute Cluster Server 2003 Partner Solution Brief", library.wolfram.com/infocenter/TechNotes/6723. pp. 1. [NVIDIA-ACS-0238401].
Wolfram Library Archive, Search Results as Printed Aug. 14, 2021 in 3 pages. [NVIDIA-ACS-0239000—NVIDIA-ACS-0239002].
"Wolfram Research Offers Support for Microsoft Windows Compute Cluster Server 2003", Jun. 9, 2006, pp. 1. [NVIDIA-ACS-0238999].
Wolfram, Stephen, "The Mathematica Book", 5th Edition, Wolfram Research, Inc., 2003. pp. 1301. [NVIDIA-ACS-0235750—NVIDIA-ACS-0237050] (In 6 parts).
Wolfram Science Conference, "NKS 2006", Jun. 16-18, 2006, pp. 2. [NVIDIA-ACS-02394854—NVIDIA-ACS-0239486].
Wolfram Technology Conference, "Accelerating Mathematica: Vectors for All", Presentations by Simon McIntosh-Smith, ClearSpeed Technology, Oct. 12, 2006, pp. 27. [NVIDIA-ACS-0239586—NVIDIA-ACS-0239612].
Ex. 2031—Nexus Claim Chart—SE—768 Patent, pp. 29. [NVIDIA-ACS-0237264—NVIDIA-ACS-0237292].
Defendant NVIDIA Corporation's Invalidity Contentions in Case No. 1:19-cv-2032-CF, *Advanced Cluster Systems, Inc.,* v. *NVIDIA Corporation* as dated Oct. 5, 2019 in 215 pages.
Exhibit A-1-PVMaple System, U.S. Pat. No. 10,333,768, as listed in Defendant NVIDIA Corporation's Invalidity Contentions in Case No. 1:19-cv-2032-CFC, *Advanced Cluster Systems, Inc.,* v. *NVIDIA Corporation* as dated Oct. 5, 2019 in 211 pages.
Exhibit A-2—Distributed Maple System, U.S. Pat. No. 10,333,768, as listed in Defendant NVIDIA Corporation's Invalidity Contentions in Case No. 1:19-cv-2032-CFC, *Advanced Cluster Systems, Inc.,* v. *NVIDIA Corporation* as dated Oct. 5, 2019 in 171 pages.
Exhibit A-3—Matlab*P System, U.S. Pat. No. 10,333,768, as listed in Defendant NVIDIA Corporation's Invalidity Contentions in Case No. 1:19-cv-2032-CFC, *Advanced Cluster Systems, Inc.,* v. *NVIDIA Corporation* as dated Oct. 5, 2019 in 246 pages.
Exhibit A-4—FFTW, U.S. Pat. No. 10,333,768, as listed in Defendant NVIDIA Corporation's Invalidity Contentions in Case No. 1:19-cv-2032-CFC, *Advanced Cluster Systems, Inc.,* v. *NVIDIA Corporation* as dated Oct. 5, 2019 in 467 pages.
Exhibit AA-5—Intel Paragon Maple Syste,, U.S. Pat. No. 10,333,768, as listed in Defendant NVIDIA Corporation's Invalidity Contentions in Case No. 1:19-cv-2032-CFC, *Advanced Cluster Systems, Inc.,* v. *NVIDIA Corporation* as dated Oct. 5, 2019 in 137 pages.
Exhibit A-6—Stony Brook, U.S. Pat. No. 10,333,768, as listed in Defendant NVIDIA Corporation's Invalidity Contentions in Case No. 1:19-cv-2032-CFC, *Advanced Cluster Systems, Inc.,* v. *NVIDIA Corporation* as dated Oct. 5, 2019 in 268 pages.
Exhibit A-7—AppleSeed Pooch Syste,, U.S. Pat. No. 10,333,768, as listed in Defendant NVIDIA Corporation's Invalidity Contentions in Case No. 1:19-cv-2032-CFC, *Advanced Cluster Systems, Inc.,* v. *NVIDIA Corporation* as dated Oct. 5, 2019 in 127 pages.
Exhibit A-9—PVMaple References, U.S. Pat. No. 10,333,768, as listed in Defendant NVIDIA Corporation's Invalidity Contentions in Case No. 1:19-cv-2032-CFC, *Advanced Cluster Systems, Inc.,* v. *NVIDIA Corporation* as dated Oct. 5, 2019 in 211 pages.
Exhibit A-10—Distributed Maple References, U.S. Pat. No. 10,333,768, as listed in Defendant NVIDIA Corporation's Invalidity Contentions in Case No. 1:19-cv-2032-CFC, *Advanced Cluster Systems, Inc.,* v. *NVIDIA Corporation* as dated Oct. 5, 2019 in 170 pages.
Exhibit A-11—Matlab *P References, U.S. Pat. No. 10,333,768, as listed in Defendant NVIDIA Corporation's Invalidity Contentions in Case No. 1:19-cv-2032-CFC, *Advanced Cluster Systems, Inc.,* v. *NVIDIA Corporation* as dated Oct. 5, 2019 in 242 pages.
Exhibit A-12—FFTW References, U.S. Pat. No. 10,333,768, as listed in Defendant NVIDIA Corporation's Invalidity Contentions in Case No. 1:19-cv-2032-CFC, *Advanced Cluster Systems, Inc.,* v. *NVIDIA Corporation* as dated Oct. 5, 2019 in 467 pages.
Exhibit A-13—Intel Paragon Maple References, U.S. Pat. No. 10,333,768, as listed in Defendant NVIDIA Corporation's Invalidity Contentions in Case No. 1:19-cv-2032-CFC, *Advanced Cluster Systems, Inc.,* v. *NVIDIA Corporation* as dated Oct. 5, 2019 in 137 pages.
Exhibit A-14—Stony Brock Reference, U.S. Pat. No. 10,333,768, as listed in Defendant NVIDIA Corporation's Invalidity Contentions in Case No. 1:19-cv-2032-CFC, *Advanced Cluster Systems, Inc.,* v. *NVIDIA Corporation* as dated Oct. 5, 2019 in 268 pages.
Exhibit A-15—AppleSeed Pooch References, U.S. Pat. No. 10,333,768, as listed in Defendant NVIDIA Corporation's Invalidity Contentions in Case No. 1:19-cv-2032-CFC, *Advanced Cluster Systems, Inc.,* v. *NVIDIA Corporation* as dated Oct. 5, 2019 in 127 pages.
Exhibit B-1—PVMaple System, U.S. Pat. No. 8,082,289, as listed in Defendant NVIDIA Corporation's Invalidity Contentions in Case No. 1:19-cv-2032-CFC, *Advanced Cluster Systems, Inc.,* v. *NVIDIA Corporation* as dated Oct. 5, 2019 in 167 pages.
Exhibit B-2—Distributed Maple System, U.S. Pat. No. 8,082,289, as listed in Defendant NVIDIA Corporation's Invalidity Contentions in Case No. 1:19-cv-2032-CFC, *Advanced Cluster Systems, Inc.,* v. *NVIDIA Corporation* as dated Oct. 5, 2019 in 90 pages.
Exhibit B-3—Matlab*P System, U.S. Pat. No. 8,082,289, as listed in Defendant NVIDIA Corporation's Invalidity Contentions in Case No. 1:19-cv-2032-CFC, *Advanced Cluster Systems, Inc.,* v. *NVIDIA Corporation* as dated Oct. 5, 2019 in 296 pages.
Exhibit B-4—FFTW, U.S. Pat. No. 8,082,289, as listed in Defendant NVIDIA Corporation's Invalidity Contentions in Case No. 1:19-cv-2032-CFC, *Advanced Cluster Systems, Inc.,* v. *NVIDIA Corporation* as dated Oct. 5, 2019 in 178 pages.
Exhibit B-5—Intel Paragon Maple System, U.S. Pat. No. 8,082,289, as listed in Defendant NVIDIA Corporation's Invalidity Contentions in Case No. 1:19-cv-2032-CFC, *Advanced Cluster Systems, Inc.,* v. *NVIDIA Corporation* as dated Oct. 5, 2019 in 128 pages.
Exhibit B-6—Stony Brook, U.S. Pat. No. 8,082,289, as listed in Defendant NVIDIA Corporation's Invalidity Contentions in Case No. 1:19-cv-2032-CFC, *Advanced Cluster Systems, Inc.,* v. *NVIDIA Corporation* as dated Oct. 5, 2019 in 120 pages.
Exhibit B-7—AppleSeed Pooch System, U.S. Pat. No. 8,082,289, as listed in Defendant NVIDIA Corporation's Invalidity Contentions in Case No. 1:19-cv-2032-CFC, *Advanced Cluster Systems, Inc.,* v. *NVIDIA Corporation* as dated Oct. 5, 2019 in 194 pages.
Exhibit B-9—PVMaple References, U.S. Pat. No. 8,082,289, as listed in Defendant NVIDIA Corporation's Invalidity Contentions in Case No. 1:19-cv-2032-CFC, *Advanced Cluster Systems, Inc.,* v. *NVIDIA Corporation* as dated Oct. 5, 2019 in 167 pages.
Exhibit B-10—Distributed Maple References, U.S. Pat. No. 8,082,289, as listed in Defendant NVIDIA Corporation's Invalidity Contentions in Case No. 1:19-cv-2032-CFC, *Advanced Cluster Systems, Inc.,* v. *NVIDIA Corporation* as dated Oct. 5, 2019 in 91 pages.
Exhibit B-11—Matlab *P References, U.S. Pat. No. 8,082,289, as listed in Defendant NVIDIA Corporation's Invalidity Contentions in Case No. 1:19-cv-2032-CFC, *Advanced Cluster Systems, Inc.,* v. *NVIDIA Corporation* as dated Oct. 5, 2019 in 296 pages.

(56) References Cited

OTHER PUBLICATIONS

Exhibit B-12—FFTW References, U.S. Pat. No. 8,082,289, as listed in Defendant NVIDIA Corporation's Invalidity Contentions in Case No. 1:19-cv-2032-CFC, *Advanced Cluster Systems, Inc.*, v. *NVIDIA Corporation* as dated Oct. 5, 2019 in 178 pages.
Exhibit B-13—Intel Paragon Maple References, U.S. Pat. No. 8,082,289, as listed in Defendant NVIDIA Corporation's Invalidity Contentions in Case No. 1:19-cv-2032-CFC, *Advanced Cluster Systems, Inc.*, v. *NVIDIA Corporation* as dated Oct. 5, 2019 in 128 pages.
Exhibit B-14—Stony Brook Reference, U.S. Pat. No. 8,082,289, as listed in Defendant NVIDIA Corporation's Invalidity Contentions in Case No. 1:19-cv-2032-CFC, *Advanced Cluster Systems, Inc.*, v. *NVIDIA Corporation* as dated Oct. 5, 2019 in 120 pages.
Exhibit B-15—AppleSeed Pooch References, U.S. Pat. No. 8,082,289, as listed in Defendant NVIDIA Corporation's Invalidity Contentions in Case No. 1:19-cv-2032-CFC, *Advanced Cluster Systems, Inc.*, v. *NVIDIA Corporation* as dated Oct. 5, 2019 in 189 pages.
Exhibit C-1—PVMaple System, U.S. Pat. No. 8,140,612, as listed in Defendant NVIDIA Corporation's Invalidity Contentions in Case No. 1:19-cv-2032-CFC, *Advanced Cluster Systems, Inc.*, v. *NVIDIA Corporation* as dated Oct. 5, 2019 in 83 pages.
Exhibit C-2—Distributed Maple System, U.S. Pat. No. 8,140,612, as listed in Defendant NVIDIA Corporation's Invalidity Contentions in Case No. 1:19-cv-2032-CFC, *Advanced Cluster Systems, Inc.*, v. *NVIDIA Corporation* as dated Oct. 5, 2019 in 54 pages.
Exhibit C-3—Matlab*P Syste,, U.S. Pat. No. 8,140,612, as listed in Defendant NVIDIA Corporation's Invalidity Contentions in Case No. 1:19-cv-2032-CFC, *Advanced Cluster Systems, Inc.*, v. *NVIDIA Corporation* as dated Oct. 5, 2019 in 122 pages.
Exhibit C-4—FFTW, U.S. Pat. No. 8,140,612, as listed in Defendant NVIDIA Corporation's Invalidity Contentions in Case No. 1:19-cv-2032-CFC, *Advanced Cluster Systems, Inc.*, v. *NVIDIA Corporation* as dated Oct. 5, 2019 in 102 pages.
Exhibit C-5—Intel Paragon Maple System, U.S. Pat. No. 8,140,612, as listed in Defendant NVIDIA Corporation's Invalidity Contentions in Case No. 1:19-cv-2032-CFC, *Advanced Cluster Systems, Inc.*, v. *NVIDIA Corporation* as dated Oct. 5, 2019 in 43 pages.
Exhibit C-6—Stony Brook, U.S. Pat. No. 8,140,612, as listed in Defendant NVIDIA Corporation's Invalidity Contentions in Case No. 1:19-cv-2032-CFC, *Advanced Cluster Systems, Inc.*, v. *NVIDIA Corporation* as dated Oct. 5, 2019 in 81 pages.
Exhibit C-7—AppleSeed Pooch System, U.S. Pat. No. 8,140,612, as listed in Defendant NVIDIA Corporation's Invalidity Contentions in Case No. 1:19-cv-2032-CFC, *Advanced Cluster Systems, Inc.*, v. *NVIDIA Corporation* as dated Oct. 5, 2019 in 64 pages.
Exhibit C-9—PVMaple References, U.S. Pat. No. 8,140,612, as listed in Defendant NVIDIA Corporation's Invalidity Contentions in Case No. 1:19-cv-2032-CFC, *Advanced Cluster Systems, Inc.*, v. *NVIDIA Corporation* as dated Oct. 5, 2019 in 83 pages.
Exhibit C-10—Distributed Maple References, U.S. Pat. No. 8,140,612, as listed in Defendant NVIDIA Corporation's Invalidity Contentions in Case No. 1:19-cv-2032-CFC, *Advanced Cluster Systems, Inc.*, v. *NVIDIA Corporation* as dated Oct. 5, 2019 in 54 pages.
Exhibit C-11—Matlab *P References, U.S. Pat. No. 8,140,612, as listed in Defendant NVIDIA Corporation's Invalidity Contentions in Case No. 1:19-cv-2032-CFC, *Advanced Cluster Systems, Inc.*, v. *NVIDIA Corporation* as dated Oct. 5, 2019 in 122 pages.
Exhibit C-12—FFTW References, U.S. Pat. No. 8,140,612, as listed in Defendant NVIDIA Corporation's Invalidity Contentions in Case No. 1:19-cv-2032-CFC, *Advanced Cluster Systems, Inc.*, v. *NVIDIA Corporation* as dated Oct. 5, 2019 in 102 pages.
Exhibit C-13—Intel Paragon Maple References, U.S. Pat. No. 8,140,612 as listed in Defendant NVIDIA Corporation's Invalidity Contentions in Case No. 1:19-cv-2032-CFC, *Advanced Cluster Systems, Inc.*, v. *NVIDIA Corporation* as dated Oct. 5, 2019 in 43 pages.
Exhibit C-14—Stony Brook Reference, U.S. Pat. No. 8,140,612 as listed in Defendant NVIDIA Corporation's Invalidity Contentions in Case No. 1:19-cv-2032-CFC, *Advanced Cluster Systems, Inc.*, v. *NVIDIA Corporation* as dated Oct. 5, 2019 in 81 pages.
Exhibit C-15—AppleSeed Pooch References, U.S. Pat. No. 8,140,612 as listed in Defendant NVIDIA Corporation's Invalidity Contentions in Case No. 1:19-cv-2032-CFC, *Advanced Cluster Systems, Inc.*, v. *NVIDIA Corporation* as dated Oct. 5, 2019 in 64 pages.
Exhibit D-1—PVMaple System, U.S. Pat. No. 8,076,877 as listed in Defendant NVIDIA Corporation's Invalidity Contentions in Case No. 1:19-cv-2032-CFC, *Advanced Cluster Systems, Inc.*, v. *NVIDIA Corporation* as dated Oct. 5, 2019 in 75 pages.
Exhibit D-2—Distributed Maple System, U.S. Pat. No. 8,676,877 as listed in Defendant NVIDIA Corporation's Invalidity Contentions in Case No. 1:19-cv-2032-CFC, *Advanced Cluster Systems, Inc.*, v. *NVIDIA Corporation* as dated Oct. 5, 2019 in 61 pages.
Exhibit D-13—Matlab*P System, U.S. Pat. No. 8,676,877 as listed in Defendant NVIDIA Corporation's Invalidity Contentions in Case No. 1:19-cv-2032-CFC, *Advanced Cluster Systems, Inc.*, v. *NVIDIA Corporation* as dated Oct. 5, 2019 in 129 pages.
Exhibit D-4—FFTW, U.S. Pat. No. 8,676,877 as listed in Defendant NVIDIA Corporation's Invalidity Contentions in Case No. 1:19-cv-2032-CFC, *Advanced Cluster Systems, Inc.*, v. *NVIDIA Corporation* as dated Oct. 5, 2019 in 155 pages.
Exhibit D-5—Intel Paragon Maple System, U.S. Pat. No. 8,676,877 as listed in Defendant NVIDIA Corporation's Invalidity Contentions in Case No. 1:19-cv-2032-CFC, *Advanced Cluster Systems, Inc.*, v. *NVIDIA Corporation* as dated Oct. 5, 2019 in 36 pages.
Exhibit D-6—Stony Brook, U.S. Pat. No. 8,676,877 as listed in Defendant NVIDIA Corporation's Invalidity Contentions in Case No. 1:19-cv-2032-CFC, *Advanced Cluster Systems, Inc.*, v. *NVIDIA Corporation* as dated Oct. 5, 2019 in 97 pages.
Exhibit D-7—AppleSeed Pooch System, U.S. Pat. No. 8,676,877 as listed in Defendant NVIDIA Corporation's Invalidity Contentions in Case No. 1:19-cv-2032-CFC, *Advanced Cluster Systems, Inc.*, v. *NVIDIA Corporation* as dated Oct. 5, 2019 in 73 pages.
Exhibit D-9—PVMaple References, U.S. Pat. No. 8,676,877 as listed in Defendant NVIDIA Corporation's Invalidity Contentions in Case No. 1:19-cv-2032-CFC, *Advanced Cluster Systems, Inc.*, v. *NVIDIA Corporation* as dated Oct. 5, 2019 in 75 pages.
Exhibit D-10—Distributed Maple References, U.S. Pat. No. 8,676,877 as listed in Defendant NVIDIA Corporation's Invalidity Contentions in Case No. 1:19-cv-2032-CFC, *Advanced Cluster Systems, Inc.*, v. *NVIDIA Corporation* as dated Oct. 5, 2019 in 63 pages.
Exhibit D-11—Matlab *P References, U.S. Pat. No. 8,676,877 as listed in Defendant NVIDIA Corporation's Invalidity Contentions in Case No. 1:19-cv-2032-CFC, *Advanced Cluster Systems, Inc.*, v. *NVIDIA Corporation* as dated Oct. 5, 2019 in 129 pages.
Exhibit D-12—FFTW References, U.S. Pat. No. 8,676,877 as listed in Defendant NVIDIA Corporation's Invalidity Contentions in Case No. 1:19-cv-2032-CFC, *Advanced Cluster Systems, Inc.*, v. *NVIDIA Corporation* as dated Oct. 5, 2019 in 155 pages.
Exhibit D-13—intel Paragon Maple References, U.S. Pat. No. 8,676,877 as listed in Defendant NVIDIA Corporation's Invalidity Contentions in Case No. 1:19-cv-2032-CFC, *Advanced Cluster Systems, Inc.*, v. *NVIDIA Corporation* as dated Oct. 5, 2019 in 36 pages.
Exhibit D-14—Stony Brook Reference, U.S. Pat. No. 8,676,877 as listed in Defendant NVIDIA Corporation's Invalidity Contentions in Case No. 1:19-cv-2032-CFC, *Advanced Cluster Systems, Inc.*, v. *NVIDIA Corporation* as dated Oct. 5, 2019 in 97 pages.
Exhibit D-15—AppleSeed pooch References, U.S. Pat. No. 8,676,877 as listed in Defendant NVIDIA Corporation's Invalidity Contentions in Case No. 1:19-cv-2032-CFC, *Advanced Cluster Systems, Inc.*, v. *NVIDIA Corporation* as dated Oct. 5, 2019 in 73 pages.
Defendant NVIDIA Corporation's Supplemental Invalidity Contentions in Case No. 1:19-cv-2032-CFG, *Advanced Cluster Systems, Inc.*, v. *NVIDIA Corporation* as dated Aug. 17, 2021 in 151 pages.
Exhibit A-1—PVMaple System, U.S. Pat. No. 10,333,768, as listed in Defendant NVIDIA Corporation's Supplemental Invalidity Contentions in Case No. 1:19-cv-2032-CFC, *Advanced Cluster Systems, Inc.*, v. *NVIDIA Corporation* as dated Aug. 17, 2021 in 270 pages.
Exhibit A-2—Distributed Maple System, U.S. Pat. No. 10,333,768, as listed in Defendant NVIDIA Corporation's Supplemental Inva-

(56) References Cited

OTHER PUBLICATIONS lidity Contentions in Case No. 1:19-cv-2032-CFC, *Advanced Cluster Systems, Inc.*, v. *NVIDIA Corporation* as dated Aug. 17, 2021 in 261 pages.
Exhibit A-3—Matlab*P System, U.S. Pat. No. 10,333,768, as listed in Defendant NVIDIA Corporation's Supplemental Invalidity Contentions in Case No. 1:19-cv-2032-CFC, *Advanced Cluster Systems, Inc.*, v. *NVIDIA Corporation* as dated Aug. 17, 2021 in 254 pages.
Exhibit A-4—FFTW, U.S. Pat. No. 10,333,768, as listed in Defendant NVIDIA Corporation's Supplemental Invalidity Contentions in Case No. 1:19-cv-2032-CFC, *Advanced Cluster Systems, Inc.*, v. *NVIDIA Corporation* as dated Aug. 17, 2021 in 467 pages.
Exhibit A-5—Intel Paragon Maple System, U.S. Pat. No. 10,333,768, as listed in Defendant NVIDIA Corporation's Supplemental Invalidity Contentions in Case No. 1:19-cv-2032-CFC, *Advanced Cluster Systems, Inc.*, v. *NVIDIA Corporation* as dated Aug. 17, 2021 in 137 pages.
Exhibit A-6—Stony Brook Bluster, U.S. Pat. No. 10,333,768, as listed in Defendant NVIDIA Corporation's Supplemental Invalidity Contentions in Case No. 1:19-cv-2032-CFC, *Advanced Cluster Systems, Inc.*, v. *NVIDIA Corporation* Corporation as dated Aug. 17, 2021 in 289 pages.
Exhibit A-7—AppleSeed Pooch System, U.S. Pat. No. 10,333,768, as listed in Defendant NVIDIA Corporation's Supplemental Invalidity Contentions in Case No. 1:19-cv-2032-CFC, *Advanced Cluster Systems, Inc.*, v. *NVIDIA Corporation* as dated Aug. 17, 2021 in 160 pages.
Exhibit A-9—PVMaple References, U.S. Pat. No. 10,333,768, as listed in Defendant NVIDIA Corporation's Supplemental Invalidity Contentions in Case No. 1:19-cv-2032-CFC, *Advanced Cluster Systems, Inc.*, v. *NVIDIA Corporation* as dated Aug. 17, 2021 in 270 pages.
Exhibit A-10—Distributed Maple References, U.S. Pat. No. 10,333,768, as listed in Defendant NVIDIA Corporation's Supplemental Invalidity Contentions in Case No. 1:19-cv-2032-CFC, *Advanced Cluster Systems, Inc.*, v. *NVIDIA Corporation* as dated Aug. 17, 2021 in 262 pages.
Exhibit A-11—Matlab *P References, U.S. Pat. No. 10,333,768, as listed in Defendant NVIDIA Corporation's Supplemental Invalidity Contentions in Case No. 1:19-cv-2032-CFC, *Advanced Cluster Systems, Inc.*, v. *NVIDIA Corporation* as dated Aug. 17, 2021 in 246 pages.
Exhibit A-12—FFTW References, U.S. Pat. No. 10,333,768, as listed in Defendant NVIDIA Corporation's Supplemental Invalidity Contentions in Case No. 1:19-cv-2032-CFC, *Advanced Cluster Systems, Inc.*, v. *NVIDIA Corporation* as dated Aug. 17, 2021 in 467 pages.
Exhibit A-13—Intel Paragon Maple References, U.S. Pat. No. 10,333,768, as listed in Defendant NVIDIA Corporation's Supplemental Invalidity Contentions in Case No. 1:19-cv-2032-CFC, *Advanced Cluster Systems, Inc.*, v. *NVIDIA Corporation* as dated Aug. 17, 2021 in 137 pages.
Exhibit A-14—Stony Brook Cluster References, U.S. Pat. No. 10,333,768, as listed in Defendant NVIDIA Corporation's Supplemental Invalidity Contentions in Case No. 1:19-cv-2032-CFC, *Advanced Cluster Systems, Inc.*, v. *NVIDIA Corporation* as dated Aug. 17, 2021 in 289 pages.
Exhibit A-15—AppleSeed Pooch References, U.S. Pat. No. 10,333,768, as listed in Defendant NVIDIA Corporation's Supplemental Invalidity Contentions in Case No. 1:19-cv-2032-CFC, *Advanced Cluster Systems, Inc.*, v. *NVIDIA Corporation* as dated Aug. 17, 2021 in 163 pages.
Exhibit A-17—MultiMatlab System, U.S. Pat. No. 10,333,768, as listed in Defendant NVIDIA Corporation's Supplemental Invalidity Contentions in Case No. 1:19-cv-2032-CFC, *Advanced Cluster Systems, Inc.*, v. *NVIDIA Corporation* as dated Aug. 17, 2021 in 249 pages.
Exhibit A-18—MultiMatlab References, U.S. Pat. No. 10,333,768, as listed in Defendant NVIDIA Corporation's Supplemental Invalidity Contentions in Case No. 1:19-cv-2032-CFC, *Advanced Cluster Systems, Inc.*, v. *NVIDIA Corporation* as dated Aug. 17, 2021 in 254 pages.
Exhibit A-19—U.S. Pat. No. 10,333,768 ("'768") v. Microsoft Windows Compute Cluster Server 2003 ("CCS"), as listed in Defendant NVIDIA Corporation's Supplemental Invalidity Contentions in Case No. 1:19-cv-2032-CFC, *Advanced Cluster Systems, Inc.*, v. *NVIDIA Corporation* as dated Aug. 17, 2021 in 41 pages.
Exhibit A-20—U.S. Pat. No. 10,333,768 ("'768") v. Supercomputing Engine for Mathematica ("SEM"), as listed in Defendant NVIDIA Corporation's Supplemental Invalidity Contentions in Case No. 1:19-cv-2032-CFC, *Advanced Cluster Systems, Inc.*, v. *NVIDIA Corporation* as dated Aug. 17, 2021 in 126 pages.
AppleSeed Development Page, Apr. 12, 2004 https://web.archive.org/web/20050317034217/http:/exodus.physics.ucla.edu/appleseed/dev/developer.html as archived Mar. 17, 2005, pp. 6.[NVIDIA-ACS-0165922].
Balay et al., "PETSc Users Manual", ANL-95/11 - Revision 2.3.2, Argonne National Laboratory, Sep. 1, 2006, pp. 184. [NVIDIA-ACS-0168513].
Barnell et al., "Migrating Modeling and Simulation Applications on to High Performance Computers", SPIE Enabling Technologies for Simulation Science X Conference, Apr. 18, 2006, pp. 8. [NVIDIA-ACS-0234890].
Bridges et al., "Users' Guide to mpich, a Portable Implementation of MPI", Sep. 18, 1995, pp. 35. [NVIDIA-ACS-0235035].
Buchberger et al., "Concert, A Software Architecture for Coordinating Education Sessions in Distributed Environments", RISC-Linz Technical Report 97-04, Feb. 17, 1997, pp. 60. [NVIDIA-ACS-0169480].
Buck et al., "Brook for GPUs", Presentation, Feb. 10, 2003, pp. 19. [NVIDIA-ACS-00166724].
Buck et al., "Brook for GPUs: Stream Computing on Graphics Hardware", 2004, pp. 777-786. [NVIDIA-ACS-00166734].
Buck et al., "Brook for GPUs: Stream Computing on Graphics Hardware", Presentation, SIGGRAPH2004, 2004, pp. 36. [NVIDIA-ACS-00166734].
Buck, Ian, "Brook: A Streaming Programming Language", Oct. 8, 2001, pp. 12. [NVIDIA-ACS-0166693].
Buck, Ian, "GPU Computing with NVIDIA CUDA", Siggraph 2007, pp. 29. [NVIDIA-ACS-0166799].
Buck, Ian, "From Brook to Cuda", Gpu Technology Conference, 2009, pp. 30. [NVIDIA-ACS-0166955].
Buck, Ian, "Stream Computing on Graphics Hardware", Dissertation, Stanford University, Sep. 2006, pp. 106. [NVIDIA-ACS-0166849].
Buck, Ian, "Tesla, GPU Computing, Past, Present, Future", Presentation, 2012, pp. 21. [NVIDIA-ACS-0166828].
Burns et al., "LAM: An Open Cluster Environment for MPI", Ohio Supercomputer Center, Colombus, OH, 2001, pp. 8. [NVIDIA-ACS-0168697].
"Chapter 4, Merrimac: The Streaming Supercomputer", 2003, pp. 155-209. [NVIDIA-ACS-0167001].
Chen, Julian Yu-Chung, "Fast Fourier Transform with BrookGPU", Apr. 25, 2006, pp. 16. [NVIDIA-ACS-0166985].
Cheng et al., "Fast Sorting on a Distributed-Memory Architecture", Dec. 2004, pp. 7. [NVIDIA-ACS-0234898].
Choy et al., "Parallel MATLAB:Doing it Right", Proceedings of the IEEE, vol. 93, No. 2, Feb. 2005, pp. 331-341. [NVIDIA-ACS-0166799].
Choy et al., "MATLAB*p. 2.0: A Unified Parallel Matlab", Mit DSpace, Computer Science Collection, Jan. 2003, pp. 6. [NVIDIA-ACS-0168705].
Choy et al., "Star-P. High {Productivity Parallel Computing", Jun. 9, 2004, pp. 2. [NVIDIA-ACS-0234905].
Choy et al., "Star-P. High {Productivity Parallel Computing", Presentation Agenda, Jun. 9, 2004, pp. 33. [NVIDIA-ACS-0168777].
Choy, Ron, "Parallel MATLAB: Doing it Right", Presentation, MIT, 2005, pp. 55. [NVIDIA-ACS-0168711].

(56) References Cited

OTHER PUBLICATIONS

Choy, Ron, "Source Code", Project Status, Matlab*p. 1.0 & Matlab*p. 2.0, as archived Dec. 13, 2002, in 1 page. https://web.archive.org/web/20021213224219fw_/http:/theory.lcs.mit.edu/~cly/download.html.

Dally et al., "A Streaming Supercomputer", Sep. 18, 2001, pp. 17. [NVIDIA-ACS-0167056].

Dauger, Dean, "Simulation and Study of Fresnel Diffraction for Arbitrary two-dimensional Apertures", Computers in Physics, vol. 10, No. 6, Nov/Dec. 1996, pp. 15. [NVIDIA-ACS-0165941].

Dauger, Dean E., "Semiclassical Modeling of Quantum-Mechanical Multiparticle Systems using Parallel Particle-In-Cell Methods", Dissertation, 2001, pp. 291. [NVIDIA-ACS-0166004].

Dauger et al., "Cluster de Computo 'Enchufar y Listo'", "'Plug-and-Play' Cluster Computing", 2006, pp. 9, http://daugerresearch.com/vault/clcarPnPCIuster.pdf [NVIDIA-ACS-0166502].

Dauger et al., "Semiclassical Modeling of Multiparticle Quantum Systems Using High-Performance Clustering and Visualization on the Macintosh", 2006, p. 1. [NVIDIA-ACS-0166510].

Dauger Research, "Supercomputing Engine for Mathematica", Advanced Cluster Systems, LLC and Dauger Research, 2006. pp. 20. [NVIDIA-ACS-0166511].

Dauger Research, "Supercomputing Engine for Mathematica", Machine Evaluation Workshop, UK, Dec. 2008, Advanced Cluster Systems, LLC and Dauger Research, pp. 39. [NVIDIA-ACS-0166576].

Decyk et al., "AppleSeed: A Parallel Macintosh Cluster for Numerically Intensive Computing", Abstract, 1999, p. 1. [ACS_NVIDIA_0165956].

Decyk et al., "5. AppleSeed: A Parallel Macintosh Cluster for Scientific Computing", Journal of Plasma Fusion Research, vol. 79, No. 8, May 2003, pp. 772-779. [NVIDIA-ACS-0166369].

Decyk et al., "AppleSeed: Personal Parallel Computing, Plug and Play Parallel Processing", 2002, as archived Jun. 12, 2005, pp. 2, https://web.archive.org/web/20050612083102/http://exodus.physics.ucla.edu:80/appleseed/appleseed.html [NVIDIA-ACS-0165931].

Decyk et al., "How to Build an AppleSeed: A Parallel Macintosh Cluster for Numerically Intensive Computing", 2000, pp. 18. [ACS NVIDIA 0165967].

Decyk et al., "Plasma Physics Calculations on a Parallel Macintosh Cluster", 1999, pp. 1-10. [NVIDIA-ACS-0165957].

Decyk et al., "Skeleton PIC Codes for Parallel Computers", Computer Physics Communications, 1995, vol. 87, pp. 87-94. [NVIDIA-ACS-0165933].

Decyk et al., "Two Dimensional Particle-in-Cell Code for Simulation of Plasma", Bulletin of the American Physical Society, Nov. 2002, vol. 47, No. 9, p. 52 (2 pages total). NVIDIA-ACS-0166306.

Edelman, Alan, "SIAM Conference on Parallel Processing for Scientific Computing", San Francisco, CA, Feb. 25-27, 2004, pp. 3. [NVIDIA-ACS-0234909].

Edelman et al., "The Future Fast Fourier Transform?", SIAM Journal on Scientific Computing, 1999, vol. 20, No. 3, pp. 1094-1114. [NVIDIA-ACS-0235070].

Erez et al., "MERRIMAC-Supercomputing with Streams", 2004, in 1 page. [NVIDIA-ACS-0167081].

Fagg et al., "PVMPI: An Integration of the PVM and MPI Systems", Apr. 12, 1996, pp. 14. [NVIDIA-ACS-0169540].

Geist et al., "PVM: Parallel Virtual Machine, A Users' Guide and Tutorial for Network Parallel Computing", The MIT Press, 1994, pp. 287. [NVIDIA-ACS-0169648].

Gilbert et al., "High-Performance Graph Algorithms from Parallel Sparse Matrices", Jun. 2006, pp. 4.

Grigoras et al., "Advanced Environments, Tools, and Applications for Cluster Computing", NATO Advanced Research Workshop, IWCC 2001, Mangalia, Romania, Sep. 2001, pp. 333. [NVIDIA-ACS-0169147].

Gropp et al., "A High-Performance, Portable Implementation of the MPI Message Passing Interface Standard", Parallel Computing, vol. 22, 1996, pp. 789-828. [NVIDIA-ACS-023509].

Gropp et al., "Installation Guide to mpich, a Portable Implementation of MPI", Argonne National Laboratory, Jul. 1996, pp. 42. [NVIDIA-ACS-0235131].

Gropp et al., "MPICH2 Installer's Guide", Version 0.4, Mathematics and Computer Science Division, Argonne National Laboratory, Sep. 9, 2004, pp. 21.

Gropp et al., "MPICH2 User's Guide", Version 0.4, Mathematics and Computer Science Division, Argonne National Laboratory, Sep. 9, 2004, pp. 19.

Interactive Supercomputing, "Background", https://web.archive.org/web/20060427034450/http://www.interactivesupercomputing.com/index.php7opt ion=com content&task=view&id=30&Itemid=73, as archived Apr. 27, 2006, pp. 2. [NVIDIA-ACS-0234916].

Interactive Supercomputing, "Delivering Parallel Computing Power to the Desktop", Presentation, Nov. 2004, pp. 15. [NVIDIA-ACS-0234990].

Interactive Supercomputing, "Delivering Parallel Computing Power to the Desktop", Presentation, 2003, pp. 17. [NVIDIA-ACS-0235005].

Interactive Supercomputing, "Home", https://web.archive.org/web/20060427034450/http://www.interactivesupercomputing.com, as archived Apr. 27, 2006, in 1 page. [NVIDIA-ACS-0234918].

Interactive Supercomputing, "Parallel Matlab Survey", https://web.archive.org/web/20061018110626/http://www.interactivesupercomputing.com/reference/ParallelMatlabsurvey.htm, as archived Oct. 18, 2006, in 8 pages. [NVIDIA-ACS-0234925].

Interactive Supercomputing, "Products", https://web.archive.org/web/20061018104836/http://www.interactivesupercomputing.com/product.php, as archived Oct. 18, 2006, in 3 pages. [NVIDIA-ACS-0234919].

Interactive Supercomputing, "Resources", https://web.archive.org/web/20061018105452/http://www.interactivesupercomputing.com/resources.php, as archived Oct. 18, 2006, in 3 pages. [NVIDIA-ACS-0234922].

Johnson, Steven G., "FFTs, Portability, & Performance", MIT, May 4, 2004, pp. 41. [NVIDIA-ACS-0234933].

Kapasi et al., "The Imagine Stream Processor", Appears in the Proceedings of the 2002 International Conference on Computer Design, Sep. 16-18, 2002, pp. 282-288. [NVIDIA-ACS-0167610].

Karonis et al., "MPICH-G2: A Grid-Enabled Implementation of the Message Passing Interface", Nov. 2002, pp. 22. [NVIDIA-ACS-0169949].

Labonte et al., "The Stream Virtual Machine", 2004, pp. 267-277. [NVIDIA-ACS-0167617].

Lecture Slides, https://web.archive.org/web/2005090320572/http://beowulf.lcs.mit.edu/18.337-2004/lectslides.html, pp. 2. [NVIDIA-ACS-0234888].

Lefohn et al., "GPGPU", Presentation, VIS 05, 2005, pp. 528. [NVIDIA-ACS-0167082].

Lindholm et al., "NVIDIA Tesla: A Unified Graphics and Computing Architecture", IEEE Computer Society, 2008, pp. 39-55. [NVIDIA-ACS-0167629].

Maple 7: Getting Started Guide, Waterloo Maple, Inc., 2001, pp. 38. [NVIDIA-ACS-0170271].

Maple 7: Learning Guide, Waterloo Maple, Inc., 2001, pp. 300. [NVIDIA-ACS-0169971].

Maplesoft, "Digital Signal Processing with Short Term Fourier Transforms", 2004, pp. 7. [NVIDIA-ACS-0170309].

MATLAB*P Instructions, https://web.archive.org/web/20050904175008fw_/http:/beowulf.lcs.mit.edu/18.337/matlabp.html, as archived Sep. 4, 2005 in 2 pages.

Menon et al., "MultiMATLAB: Integrating MATLAB with High-Performance Parallel Computing", 1997, pp. 18. [NVIDIA-ACS-0168877].

Mirman, Ilya, "Going Parallel the New Way", Interactive Supercomputing, Jun. 2006, pp. 4. [NVIDIA-ACS-0234976].

Moore, Charles, "The AppleSeed Project: Clustered Power Macs Outperform Cray Supercompter", LowEndMac.com, Apr. 19, 2000, pp. 3. [NVIDIA-ACS-0165985].

"MPI-2: Extensions to the Message-Passing Interface", https://web.archive.org/web/20050403213517/http://www.mpi-forum.org/docs/mpi-20-html/mpi2-report.html as archived Apr. 3, 2005 in 11 pages. [NVIDIA-ACS-0235217].

(56) References Cited

OTHER PUBLICATIONS

MPI Demo in 4 pages. [NVIDIA-ACS-0234980].
MPICH for Microsoft Windows Download Page, https://web.archive.org/web/20050309131254/http://www-unix.mcs.anl.gov/mpi/mpich/mpich-nt/ as archived Mar. 9, 2005 in 2 pages. [NVIDIA-ACS-0235213].
MPICH-A Portable Implementation of MPI, https://web.archive.org/web/20050318092617/http://www-unix.mcs.anl.gov/mpi/mpich/ as archived Mar. 18, 2005 in 3 pages. [NVIDIA-ACS-0235231].
MPICH2 Home Page, https://web.archive.org/web/20050401035643/http://www-unix.mcs.anl.gov/mpi/mpich2/index.htm#docs as archived Apr. 1, 2005 in 2 pages. [NVIDIA-ACS-0235228].
MPICH2 License, https://web.archive.org/web/20050312051250/http://www-unix.mcs.anl.gov/mpi/mpich2/license.htm as archived Mar. 12, 2005 in 1 page. [NVIDIA-ACS-0235230].
NVIDIA, "NVIDIA CUDA Compute Unified Device Architecture", Programming Guide, Version 1.0, Jun. 23, 2007, pp. 119. [NVIDIA-ACS-0167649].
Partial MPI Library based on Sockets in Macintosh OS X, using TCP/IP Protocol, https://web.archive.org/web/20051225215129/http:/exodus.physics.ucla.edu/appleseed/dev/MacMPI_S.c, as archived Dec. 25, 2005, pp. 1. [NVIDIA-ACS-0165930].
PCI Express®, Base Specification, Revision 1.1, Mar. 28, 2005, pp. 508. [NVIDIA-ACS-0167768].
Petcu, Dana, "Working with Multiple Maple Kernels Connected by Distributed Maple or PVMaple", 2001, pp. 11. [NVIDIA-ACS-0170367].
Petcu et al., "A User-Level Interface for Clustering Mathematical Software Kernels", IWCC 2001: Advanced Environments, Tools, and Applications for Cluster Computing, vol. 2326, pp. 172-178. [NVIDIA-ACS-0170316].
Petcu et al., "Design and Implementation of a Grid Extension for Maple", Scientific Programming, vol. 13, 2005, pp. 14. [NVIDIA-ACS-0169935].
Petcu et al., "Extending Maple to the Grid: Design and Implementation", Third International Symposium on Parallel and Distributed Computing/Third International Workshop on Algorithms, Models and Tools for Parallel Computing on Heterogeneous Networks, 2004, pp. 209-216. [NVIDIA-ACS-017323].
Petcu et al., "Pavis: A Parallel Virtual Environment for Solving Large Mathematical Problems", World Scientific, 2003, pp. 8. [NVIDIA-ACS-0170331].
Petcu et al., "PVMaple: A Distributed Approach to Cooperative Work of Maple Processes", Lecture Notes in Computer Science, Aug. 2000, vol. 1908, pp. 8. [NVIDIA-ACS-0170339].
Petcu, Dana, "Solving Initial Value Problems with Parallel Maple Processes", European Conference on Parallel Processing Aug. 28, 2001, pp. 926-934. [NVIDIA-ACS-0170347].
Petcu et al., "Survey of Symbolic Computations on the Grid", SETIT 2005, 3rd International Conference, Mar. 2005, pp. 11. [NVIDIA-ACS-0170356].
Quinn, Michael J., "Parallel Programming in C with MPI and OpenMP", McGraw Hill, 2003, pp. 516. [NVIDIA-ACS-0235234].
"Running Star-P on Beowulf", 2005, pp. 5. http://courses.csail.mit.edu/18.337/2005/QuickStartGuide.pdf [NVIDIA-ACS-0234985].
Sameh, Ahmed, "The Schlumberger High Performance Cluster at AUG", Proceedings of the 13th International Conference on Artificial Intelligence Applications, Cairo, Feb. 4-6, 2005, pp. 9. [NVIDIA-ACS-0170378].
Shah et al., "Sparse Matrices in Matlab*P Design and Implementation", HiPC 2004, LNCS 3296, pp. 144-155. [NVIDIA-ACS-0235022].
Source Code, "Distributed Maple 1.1.16" 2003, pp. 2176. [NVIDIA-ACS-0163528].
Source Code, "Distributed Mathematica" 2000, pp. 159. [NVIDIA-ACS-0173308].
Source Code, "fftw2.1.5" 2003, pp. 3325. [NVIDIA-ACS-0165511—NVIDIA-ACS-0165833].
Source Code, "General Source Code" 2003, pp. 173. [NVIDIA-ACS-0233750, NVIDIA-ACS-0234468, NVIDIA-ACS-0240000, NVIDIA-ACS-0240002, NVIDIA-ACS-2005, NVIDIA-ACS-0240008, NVIDIA-ACS-0240011, NVIDIA-ACS-0240019, NVIDIA-ACS-0240022, NVIDIA-ACS-240024, NVIDIA-ACS-00240030, NVIDIA-ACS-0240033, NVIDIA-ACS-0240042, NVIDIA-ACS-240044].
Source Code, "matlabpv2" 2003, pp. 4931. [NVIDIA-ACS-0233752—NVIDIA-ACS-0234467].
Source Code, "Public CUDA Brook Code" 2003, pp. 18573. [NVIDIA-ACS-0166655—NVIDIA-ACS-0166680].
"Star-P® User Guide", Interactive Supercomputing, Oct. 25, 2006, pp. 211. [NVIDIA-ACS-0168895].
Sunderam, et al., "The PVM Concurrent Computing System: Evolution, Experiences, and Trends. In: Parallel Computing", 1994, vol. 20, No. 4. pp. 16. [NVIDIA-ACS-0170387].
"The Message Passing Interface (MPI) Standard", https://web.archive.org/web/20050403085859/http://www-unix.mcs.anl.gov.mpl/ as archived Apr. 3, 2005 in 2 pages. [NVIDIA-ACS-0235215].
Trefethen et al., "MultiMATLAB: MATLAB on Multiple Processors", Jun. 1996, pp. 16. [NVIDIA-ACS-0169109].
Voges et al., "Computational Marketing Using an AppleSeed Cluster", Jan. 2001, in 11 pages. [NVIDIA-ACS-0166295].
Wired, "Slideshow: That's a Whole Lot of Power, Mac", Wired.com, Jan. 29, 2002, pp. 10. [NVIDIA-ACS-0166333].
Zain et al., "Orchestrating Production Computer Algebra Components into Portable Parallel Programs", 2008, pp. 15. [NVIDIA-ACS-0170434].
Decision Granting Institution of Inter Partes Review of U.S. Pat. No. 8,082,289, in Case IPR2020-01608, *NVIDIA Corporation* v. *Advanced Cluster Systems, Inc.*, as dated May 5, 2021 in 78 pages. [NVIDIA-ACS-0223292].
Decision Granting Institution of Inter Partes Review of U.S. Pat. No. 8,140,612, in Case IPR2021-00075, *NVIDIA Corporation* v. *Advanced Cluster Systems, Inc.*, as dated May 5, 2021 in 67 pages. [NVIDIA-ACS-0231637].
Decision Granting Institution of Inter Partes Review of U.S. Pat. No. 8,676,877, in Case IPR2021-00108, *NVIDIA Corporation* v. *Advanced Cluster Systems, Inc.*, as dated May 13, 2021 in 70 pages. [NVIDIA-ACS-0232790].
Decision Denying Institution of Inter Partes Review of U.S. Pat. No. 10,333,768, in Case IPR2021-00019, *NVIDIA Corporation* v. *Advanced Cluster Systems, Inc.*, as dated May 5, 2021 in 32 pages. [NVIDIA-ACS-0225177].
Decision Denying Institution of Inter Partes Review of U.S. Pat. No. 10,333,768, in Case IPR2021-00020, *NVIDIA Corporation* v. *Advanced Cluster Systems, Inc.*, as dated May 5, 2021 in 33 pages. [NVIDIA-ACS-0228571].
Joint Motion to Terminate Under 35 U.S.C. § 317(a) of U.S. Pat. No. 8,082,289, in Case IPR2020-01608, *NVIDIA Corporation* v. *Advanced Cluster Systems, Inc.*, as filed Jun. 17, 2021 in 6 pages. [NVIDIA-ACS-0223385].
Joint Motion to Terminate Under 35 U.S.C. § 317(a) of U.S. Pat. No. 8,140,612, in Case IPR2021-00075, *NVIDIA Corporation* v. *Advanced Cluster Systems, Inc.*, as filed Jun. 17, 2021 in 6 pages. [NVIDIA-ACS-0231729].
Joint Motion to Terminate Under 35 U.S.C. § 317(a) of U.S. Pat. No. 8,676,877, in Case IPR2021-00108, *NVIDIA Corporation* v. *Advanced Cluster Systems, Inc.*, as filed Jun. 17, 2021 in 6 pages. [NVIDIA-ACS-0232886].
Notice of Filing Date Accorded to Petition and Time for Filing Patent Owner Preliminary Response of U.S. Pat. No. 8,082,289, in Case IPR2020-01608, U.S. Pat. No. 8,082,289, *NVIDIA Corporation* v. *Advanced Cluster Systems, Inc.*, as mailed Nov. 10, 2020 in 5 pages. [NVIDIA-ACS-0222837].
Notice of Filing Date Accorded to Petition and Time for Filing Patent Owner Preliminary Response of U.S. Pat. No. 10,333,768, in Case IPR2021-00019, U.S. Pat. No. 10,333,768, *NVIDIA Corporation* v. *Advanced Cluster Systems, Inc.*, as mailed Nov. 10, 2020 in 5 pages. [NVIDIA-ACS-0224757].
Notice of Filing Date Accorded to Petition and Time for Filing Patent Owner Preliminary Response of U.S. Pat. No. 10,333,768, in Case IPR2021-00020, U.S. Pat. No. 10,333,768, *NVIDIA Corpo-*

(56) References Cited

OTHER PUBLICATIONS ration v. *Advanced Cluster Systems, Inc.*, as mailed Nov. 10, 2020 in 5 pages. [NVIDIA-ACS-0228113].
Notice of Filing Date Accorded to Petition and Time for Filing Patent Owner Preliminary Response of U.S. Pat. No. 8,140,612, in Case IPR2021-00075, U.S. Pat. No. 8,140,612, *NVIDIA Corporation v. Advanced Cluster Systems, Inc.*, as mailed Nov. 10, 2020 in 5 pages. [NVIDIA-ACS-0231196].
Notice of Filing Date Accorded to Petition and Time for Filing Patent Owner Preliminary Response of U.S. Pat. No. 8,676,877, in Case IPR2021-00108, U.S. Pat. No. 8,676,877, *NVIDIA Corporation v. Advanced Cluster Systems, Inc.*, as mailed Nov. 17, 2020 in 6 pages. [NVIDIA-ACS-0232321].
Notice of Refund of U.S. Pat. No. 8,082,289, Case IPR2020-01608, *NVIDIA Corporation v. Advanced Cluster Systems, Inc.*, as mailed Jun. 30, 2021 in 2 pages.[NVIDIA-ACS-0223400].
Notice of Refund of U.S. Pat. No. 8,140,612, Case IPR2021-00075, *NVIDIA Corporation v. Advanced Cluster Systems, Inc.*, as mailed Jul. 12, 2021 in 2 pages. [NVIDIA-ACS-0231745].
Notice of Refund of U.S. Pat. No. 8,676,877, Case IPR2021-00108, *NVIDIA Corporation v. Advanced Cluster Systems, Inc.*, as mailed Jul. 12, 2021 in 2 pages. [NVIDIA-ACS-0232906].
Notice of Refund of U.S. Pat. No. 10,333,768, Case IPR2021-00019, *NVIDIA Corporation v. Advanced Cluster Systems, Inc.*, as mailed May 18, 2021 in 2 pages. [NVIDIA-ACS-0225212].
Notice of Refund of U.S. Pat. No. 10,333,768, Case IPR2021-00020, *NVIDIA Corporation v. Advanced Cluster Systems, Inc.*, as mailed May 17, 2021 in 2 pages. [NVIDIA-ACS-0228607].
Order Conduct of the Proceeding, IPR2020-01608 (Patent 8,082,289), IPR2021-00019 (U.S. Pat. No. 10,333,768), IPR2021 -00020 (U.S. Pat. No. 10,333,768), IPR2021 -00075 (U.S. Pat. No. 8,140,612), IPR2021 -00108 (U.S. Pat. No. 8,676,877)1, *NVIDIA Corporation v. Advanced Cluster Systems, Inc.*, Paper 8 as dated Mar. 10, 2021 in 4 pages. [NVIDIA-ACS-0223288].
Order Conduct of the Proceeding, IPR2020-01608 (Patent 8,082,289), IPR2021-00019 (U.S. Pat. No. 10,333,768), IPR2021-00020 (U.S. Pat. No. 10,333,768), IPR2021 -00075 (U.S. Pat. No. 8,140,612), IPR2021 -00108 (U.S. Pat. No. 8,676,877)1, *NVIDIA Corporation v. Advanced Cluster Systems, Inc.*, Paper 6 as dated Mar. 10, 2021 in 4 pages. [NVIDIA-ACS-0231608].
Petition for Inter Partes Review of U.S. Pat. No. 8,082,289, in Case IPR2020-01608, U.S. Pat. No. 8,082,289, *NVIDIA Corporation v. Advanced Cluster Systems, Inc.*, as dated Sep. 18, 2020 in 97 pages. [NVIDIA-ACS-0222731].
Petition for Inter Partes Review of U.S. Pat. No. 8,140,612, in Case IPR2021-00075, U.S. Pat. No. 8,140,612, *NVIDIA Corporation v. Advanced Cluster Systems, Inc.*, as dated Oct. 16, 2020 in 87 pages. [NVIDIA-ACS-0231103].
Petition for Inter Partes Review of U.S. Pat. No. 8,676,877, in Case IPR2021-00108, Patent No. 8,676,877, *NVIDIA Corporation v. Advanced Cluster Systems, Inc.*, as dated Oct. 23, 2020 in 93 pages. [NVIDIA-ACS-023222].
Patent Owner Mandatory Notices in Case No. IPR2020-01608, U.S. Pat. No. 8,082,289, *NVIDIA Corporation v. Advanced Cluster Systems, Inc.*, as filed Oct. 9, 2020 in 4 pages. [NVIDIA-ACS-023222830].
Patent Owner Mandatory Notices in Case No. IPR2021-00019, U.S. Pat. No. 10,333,768, *NVIDIA Corporation v. Advanced Cluster Systems, Inc.*, as filed Oct. 27, 2020 in 4 pages. [NVIDIA-ACS-0224753].
Patent Owner Mandatory Notices in Case No. IPR2021-00020, U.S. Pat. No. 10,333,768, *NVIDIA Corporation v. Advanced Cluster Systems, Inc.*, as filed Oct. 27, 2020 in 4 pages. [NVIDIA-ACS-0228109].
Patent Owner Mandatory Notices in Case No. IPR2021-00075, U.S. Pat. No. 8,140,612, *NVIDIA Corporation v. Advanced Cluster Systems, Inc.*, as filed Nov. 6, 2020 in 4 pages. [NVIDIA-ACS-0231192].

Patent Owner Mandatory Notices in Case No. IPR2021-00108, U.S. Pat. No. 8,676,877, *NVIDIA Corporation v. Advanced Cluster Systems, Inc.*, as filed Nov. 12, 2020 in 4 pages. [NVIDIA-ACS-0232317].
Patent Owner Preliminary Response in Case No. IPR2020-01608, U.S. Pat. No. 8,082,289, *NVIDIA Corporation v. Advanced Cluster Systems, Inc.*, as filed Feb. 10, 2021 in 66 pages. [NVIDIA-ACS-0222842].
Patent Owner Preliminary Response in Case No. IPR2021-00019, U.S. Pat. No. 10,333,768, *NVIDIA Corporation v. Advanced Cluster Systems, Inc.*, as filed Feb. 10, 2021 in 66 pages. [NVIDIA-ACS-0224762].
Patent Owner Preliminary Response in Case No. IPR2021-00020, U.S. Pat. No. 10,333,768, *NVIDIA Corporation v. Advanced Cluster Systems, Inc.*, as filed Feb. 10, 2021 in 66 pages. [NVIDIA-ACS-0228118].
Patent Owner Preliminary Response in Case No. IPR2021-00075, U.S. Pat. No. 8,140,612, *NVIDIA Corporation v. Advanced Cluster Systems, Inc.*, as filed Feb. 10, 2021 in 66 pages. [NVIDIA-ACS-0231201].
Patent Owner Preliminary Response in Case No. IPR2021-00108, U.S. Pat. No. 8,676,877, *NVIDIA Corporation v. Advanced Cluster Systems, Inc.*, as filed Feb. 17, 2021 in 66 pages. [NVIDIA-ACS-0232327].
Patent Owner Updated Mandatory Notices in Case No. IPR2020-01608, U.S. Pat. No. 8,082,289, *NVIDIA Corporation v. Advanced Cluster Systems, Inc.*, as filed Oct. 29, 2020 in 3 pages. [NVIDIA-ACS-0222834].
Patent Owner's Consolidated Sur-Reply in Support of its Preliminary Responses, Per Mar. 10, 2021 Order in Cases IPR2020-01608 (U.S. Pat. No. 8,082,289), IPR2021-00019 (U.S. Pat. No. 10,333,768), IPR2021-00020 (U.S. Pat. No. 10,333,768), IPR2021-00075 (U.S. Pat. No. 8,140,612), IPR2021-00108 (U.S. Pat. No. 8,676,877), *NVIDIA Corporation v. Advanced Cluster Systems, Inc.*, as filed Mar. 26, 2021 in 13 pages. [NVIDIA-ACS-0231624].
Patent Owner's Updated Exhibit List in Case No. IPR2020-01608, U.S. Pat. No. 8,082,289, *NVIDIA Corporation v. Advanced Cluster Systems, Inc.*, as filed Jun. 17, 2021 in 5 pages. [NVIDIA-ACS-023391].
Patent Owner's Updated Exhibit List in Case No. IPR2021-00075, U.S. Pat. No. 8,140,612, *NVIDIA Corporation v. Advanced Cluster Systems, Inc.*, as filed Jun. 17, 2021 in 5 pages. [NVIDIA-ACS-0231735].
Patent Owner's Updated Exhibit List in Case No. IPR2021 -00108, U.S. Pat. No. 8,676,877, *NVIDIA Corporation v. Advanced Cluster Systems, Inc.*, as filed Jun. 17, 2021 in 5 pages. [NVIDIA-ACS-0232892].
Petitioner's Objections to Evidence in Case No. IPR2020-01608, U.S. Pat. No. 8,082,289, *NVIDIA Corporation v. Advanced Cluster Systems, Inc.*, as filed May 19, 2021 in 4 pages. [NVIDIA-ACS-0223378].
Petitioner's Objections to Evidence in Case No. IPR2021-00075, U.S. Pat. No. 8,140,612, *NVIDIA Corporation v. Advanced Cluster Systems, Inc.*, as filed May 19, 2021 in 4 pages. [NVIDIA-ACS-0231722].
Petitioner's Objections to Evidence in Case No. IPR2021-00108, U.S. Pat. No. 8,676,877, *NVIDIA Corporation v. Advanced Cluster Systems, Inc.*, as filed May 19, 2021 in 4 pages. [NVIDIA-ACS-0232871].
Patent Owner's Objections to Admissibility of Evidence Served with Petition for Inter Partes Review in Case No. IPR2020-01608, U.S. Pat. No. 8,082,287, *NVIDIA Corporation v. Advanced Cluster Systems, Inc.*, as filed May 19, 2021 in 8 pages. [NVIDIA-ACS-0223370].
Patent Owner's Objections to Admissibility of Evidence Served with Petition for Inter Partes Review in Case No. IPR2021-00075, U.S. Pat. No. 8,140,612, *NVIDIA Corporation v. Advanced Cluster Systems, Inc.*, as filed May 19, 2021 in 7 pages. [NVIDIA-ACS-0231715].
Patent Owner's Objections to Admissibility of Evidence Served with Petition for Inter Partes Review in Case No. IPR2021-00108,

(56) References Cited

OTHER PUBLICATIONS

U.S. Pat. No. 8,676,877, *NVIDIA Corporation* v. *Advanced Cluster Systems, Inc.*, as filed May 27, 2021 in 8 pages. [NVIDIA-ACS-0232875].

Petitioner's Power of Attorney in Case No. IPR2021-00075, U.S. Pat. No. 8,140,612, *NVIDIA Corporation* v. *Advanced Cluster Systems, Inc.*, as filed Oct. 16, 2020 in 2 pages. [NVIDIA-ACS-0231190].

Petitioner's Power of Attorney in Case No. IPR2021-00108, U.S. Pat. No. 8,676,877, *NVIDIA Corporation* v. *Advanced Cluster Systems, Inc.*, as filed Oct. 23, 2020 in 2 pages. [NVIDIA-ACS-0232315].

Petitioner's Reply to Patent Owner's Preliminary Response in IPR2020-01608 (U.S. Pat. No. 8,082,289), IPR2021-00019 (U.S. Pat. No. 10,333,768), IPR2021-00020 (U.S. Pat. No. 10,333,768), IPR2021-00075 (U.S. Pat. No. 8,140,612), IPR2021-00108 (U.S. Pat. No. 8,676,877), *NVIDIA Corporation* v. *Advanced Cluster Systems, Inc.*, as dated Mar. 16, 2021 in 12 pages. [NVIDIA-ACS-0231612].

Petitioner's Request for Refund of Fees of U.S. Pat. No. 10,333,768, Case IPR2021-00019, *Nvidia Corporation* v. *Advanced Cluster Systems, Inc.*, as dated May 13, 2021 in 3 pages. [NVIDIA-ACS-0225209].

Petitioner's Request for Refund of Fees of U.S. Pat. No. 10,333,768, Case IPR2021-00020, *Nvidia Corporation* v. *Advanced Cluster Systems, Inc.*, as dated May 13, 2021 in 3 pages. [NVIDIA-ACS-0228604].

Petitioner's Request for Refund of Post-Institution Fees of U.S. Pat. No. 8,082,289, Case IPR2020-01608, *Nvidia Corporation* v. *Advanced Cluster Systems, Inc.*, as dated Jun. 30, 2021 in 4 pages. [NVIDIA-ACS-0223402].

Petitioner's Request for Refund of Post-Institution Fees of U.S. Pat. No. 8,140,612, Case IPR2021-00075, *Nvidia Corporation* v. *Advanced Cluster Systems, Inc.*, as dated Jun. 30, 2021 in 5 pages. [NVIDIA-ACS-0231740].

Petitioner's Request for Refund of Post-Institution Fees of U.S. Pat. No. 8,676,877, Case IPR2021-00108, *NVIDIA Corporation* v. *Advanced Cluster Systems, Inc.*, as dated Jun. 30, 2021 in 5 pages. [NVIDIA-ACS-0232897].

Scheduling Order of U.S. Pat. No. 8,082,289, Case IPR2020-01608 and U.S. Pat. No. 8,140,612, Case IPR2021-00075, *NVIDIA Corporation* v. *Advanced Cluster Systems, Inc.*, as dated May 5, 2021 in 11 pages. [NVIDIA-ACS-0231704].

Scheduling Order of U.S. Pat. No. 8,676,877, Case IPR2021-00108, *NVIDIA Corporation* v. *Advanced Cluster Systems, Inc.*, as dated May 13, 2021 in 11 pages. [NVIDIA-ACS-0232860].

Stipulated Partial Dismissal with Prejudice in Case 1:19-cv-02032-CFC-CJB, *Advanced Cluster Systems, Inc* v. *NVIDIA Corporation*, as filed Jun. 14, 2021 in 3 pages. [NVIDIA-ACS-0232860].

Termination Due to Settlement After Institution of Trial of U.S. Pat. No. 8,082,289, Case IPR2020-01608, *Nvidia Corporation* v. *Advanced Cluster Systems, Inc.*, as dated Jun. 22, 2021 in 4 pages. [NVIDIA-ACS-022382].

Termination Due to Settlement After Institution of Trial of U.S. Pat. No. 8,676,877, Case IPR2021-00108, *Nvidia Corporation* v. *Advanced Cluster Systems, Inc.*, as dated Jun. 30, 2021 in 4 pages. [NVIDIA-ACS-0223396].

Ex. 2004—Nexus Claim Chart—SEM—289 Patent, pp. 20. [NVIDIA-ACS-0222970].

Ex. 2005—Nexus Claim Chart—SET—289 Patent, pp. 28. [NVIDIA-ACS-0222990].

Ex. 2006—Dauger Declaration, Feb. 10, 2021, pp. 29. [NVIDIA-ACS-0223018].

Exhibit 1002—File History of U.S. Pat. No. 8,082,289 B2, pp. 190. [NVIDIA-ACS-0220502].

\* cited by examiner

CLUSTER COMPUTING

INCORPORATION BY REFERENCE TO PRIORITY APPLICATIONS

All applications for which a foreign or domestic priority claim is identified in the Application Data Sheet as filed with the present application are incorporated by reference under 37 CFR 1.57 and made a part of this specification.

BACKGROUND

Field

The present disclosure relates to the field of cluster computing generally and to systems and methods for adding cluster computing functionality to a computer program, in particular.

Description of Related Art

Computer clusters include a group of two or more computers, microprocessors, and/or processor cores ("nodes") that intercommunicate so that the nodes can accomplish a task as though they were a single computer. Many computer application programs are not currently designed to benefit from advantages that computer clusters can offer, even though they may be running on a group of nodes that could act as a cluster. Some computer programs can run on only a single node because, for example, they are coded to perform tasks serially or because they are designed to recognize or send instructions to only a single node.

Some application programs include an interpreter that executes instructions provided to the program by a user, a script, or another source. Such an interpreter is sometimes called a "kernel" because, for example, the interpreter can manage at least some hardware resources of a computer system and/or can manage communications between those resources and software (for example, the provided instructions, which can include a high-level programming language). Some software programs include a kernel that is designed to communicate with a single node. An example of a software package that includes a kernel that is designed to communicate with a single node is Mathematica® from Wolfram Research, Inc. ("Mathematica"). Mathematics software packages from other vendors and other types of software can also include such a kernel.

A product known as gridMathematica, also from Wolfram Research, Inc., gives Mathematica the capability to perform a form of grid computing known as "distributed computing." Grid computers include a plurality of nodes that generally do not communicate with one another as peers. Distributed computing can be optimized for workloads that consist of many independent jobs or packets of work, which do not need to share data between the jobs during the computational process. Grid computers include at least one node known as a master node that manages a plurality of slave nodes or computational nodes. In gridMathematica, each of a plurality of kernels runs on a single node. One kernel is designated the master kernel, which handles all input, output, and scheduling of the other kernels (the computational kernels or slave kernels). Computational kernels receive commands and data only from the node running the master kernel. Each computational kernel performs its work independently of the other computational kernels and intermediate results of one job do not affect other jobs in progress on other nodes.

SUMMARY

Embodiments described herein have several features, no single one of which is solely responsible for their desirable attributes. Without limiting the scope of the invention as expressed by the claims, some of the advantageous features will now be discussed briefly.

Some embodiments described herein provide techniques for conveniently adding cluster computing functionality to a computer application. In one embodiment, a user of a software package may be able to achieve higher performance and/or higher availability from the software package by enabling the software to benefit from a plurality of nodes in a cluster. One embodiment allows a user to create applications, using a high-level language such as Mathematica, that are able to run on a computer cluster having supercomputer-like performance. One embodiment provides access to such high-performance computing through a Mathematica Front End, a command line interface, one or more high-level commands, or a programming language such as C or FORTRAN.

One embodiment adapts a software module designed to run on a single node, such as, for example, the Mathematica kernel, to support cluster computing, even when the software module is not designed to provide such support. One embodiment provides parallelization for an application program, even if no access to the program's source code is available. One embodiment adds and supports Message Passing Interface ("MPI") calls directly from within a user interface, such as, for example, the Mathematica programming environment. In one embodiment, MPI calls are added to or made available from an interactive programming environment, such as the Mathematica Front End.

One embodiment provides a computer cluster including a first processor, a second processor, and a third processor. The cluster includes at least one computer-readable medium in communication at least one of the first processor, the second processor, or the third processor. A first kernel resides in the at least one computer-readable medium and is configured to translate commands into code for execution on the first processor. A first cluster node module resides in the at least one computer-readable medium. The first cluster node module is configured to send commands to the first kernel and receives commands from a user interface. A second kernel resides in the at least one computer-readable medium. The second kernel is configured to translate commands into code for execution on the second processor. A second cluster node module resides in the at least one computer-readable medium. The second cluster node module is configured to send commands to the second kernel and communicates with the first cluster node module. A third kernel resides in the at least one computer-readable medium. The third kernel is configured to translate commands into code for execution on the third processor. A third cluster node module resides in the at least one computer-readable medium. The third cluster node module is configured to send commands to the third kernel and configured to communicate with the first cluster node module and the second cluster node module. The first cluster node module comprises a data structure in which messages originating from the second and third cluster node modules are stored.

Another embodiment provides a computer cluster that includes a plurality of nodes and a software package including a user interface and a single-node kernel for interpreting program code instructions. A cluster node module is configured to communicate with the single-node kernel and other cluster node modules. The cluster node module accepts instructions from the user interface and interprets at least some of the instructions such that several cluster node modules in communication with one another act as a cluster. The cluster node module appears as a single-node kernel to the user interface. In one embodiment, the single-node kernel includes a Mathematical kernel. In some embodiments, the user interface can include at least one of a Mathematica front end or a command line. In some embodiments, the cluster node module includes a toolkit including library calls that implement at least a portion of MPI calls. In some embodiments, the cluster node module includes a toolkit including high-level cluster computing commands. In one embodiment, the cluster system can include a plurality of Macintosh® computers ("Macs"), Windows®-based personal computers ("PCs"), and/or Unix/Linux-based workstations.

A further embodiment provides a computer cluster including a plurality of nodes. Each node is configured to access a computer-readable medium comprising program code for a user interface and program code for a single-node kernel module configured to interpret user instructions. The cluster includes a plurality of cluster node modules. Each cluster node module is configured to communicate with a single-node kernel and with one or more other cluster node modules, to accept instructions from the user interface, and to interpret at least some of the user instructions such that the plurality of cluster node modules communicate with one another in order to act as a cluster. A communications network connects the nodes. One of the plurality of cluster node modules returns a result to the user interface.

Another embodiment provides a method of evaluating a command on a computer cluster. A command from at least one of a user interface or a script is communicated to one or more cluster node modules within the computer cluster. Each of the one or more cluster node modules communicates a message based on the command to a respective kernel module associated with the cluster node module. Each of the one or more cluster node modules receives a result from the respective kernel module associated with the cluster node module. At least one of the one or more cluster node modules responds to messages from other cluster node modules.

Another embodiment provides a computing system for executing Mathematica code on multiple nodes. The computing system includes a first node module in communication with a first Mathematica kernel executing on a first node, a second node module in communication with a second Mathematica kernel executing on a second node, and a third node module in communication with a third Mathematica kernel executing on a third node. The first node module, the second node module, and the third node module are configured to communicate with one another using a peer-to-peer architecture. In some embodiments, each of the first node module, the second node module, and third node module includes a data structure for maintaining messages originating from other node modules and a data structure for maintaining data specifying a location to which an message is expected to be received and an identifier for a node from which the message is expected to be sent.

BRIEF DESCRIPTION OF THE DRAWINGS

A general architecture that implements the various features are described with reference to the drawings. The drawings and the associated descriptions are provided to illustrate embodiments and not to limit the scope of the disclosure. Throughout the drawings, reference numbers are re-used to indicate correspondence between referenced elements.

DETAILED DESCRIPTION OF PREFERRED EMBODIMENTS

For purposes of illustration, some embodiments are described herein in the context of cluster computing with Mathematica software. The present disclosure is not limited to a single software program; the systems and methods can be used with other application software such as, for example, Maple®, MATLAB®, MathCAD®, Apple Shake®, Apple® Compressor, IDL®, other applications employing an interpreter or a kernel, Microsoft Excel®, Adobe After Effects®, Adobe Premiere®, Adobe Photoshop®, Apple Final Cut Pro®, and Apple iMovie®. Some figures and/or descriptions, however, relate to embodiments of computer clusters running Mathematica. The system can include a variety of uses, including but not limited to students, educators, scientists, engineers, mathematicians, researchers, and technicians. It is also recognized that in other embodiments, the systems and methods can be implemented as a single module and/or implemented in conjunction with a variety of other modules. Moreover, the specific implementations described herein are set forth in order to illustrate, and not to limit, the disclosure.

I. OVERVIEW

The cluster computing system described herein generally includes one or more computer systems connected to one another via a communications network or networks. The communications network can include one or more of a local area network ("LAN"), a wide area network ("WAN"), an intranet, the Internet, etc. In one embodiment, a computer system comprises one or more processors such as, for example, a microprocessor that can include one or more processing cores ("nodes"). The term "node" refers to a processing unit or subunit that is capable of single-threaded execution of code. The processors can be connected to one or more memory devices such as, for example, random access memory ("RAM"), and/or one or more optional storage devices such as, for example, a hard disk. Communications among the processors and such other devices may occur, for example, via one or more local buses of a computer system or via a LAN, a WAN, a storage area network ("SAN"), and/or any other communications network capable of carrying signals among computer system components. In one embodiment, one or more software modules such as kernels, run on nodes within the interconnected computer systems. In one embodiment, the kernels are designed to run on only a single node. In one embodiment, cluster node modules communicate with the kernels and with each other in order to implement cluster computing functionality.

Figure 1:
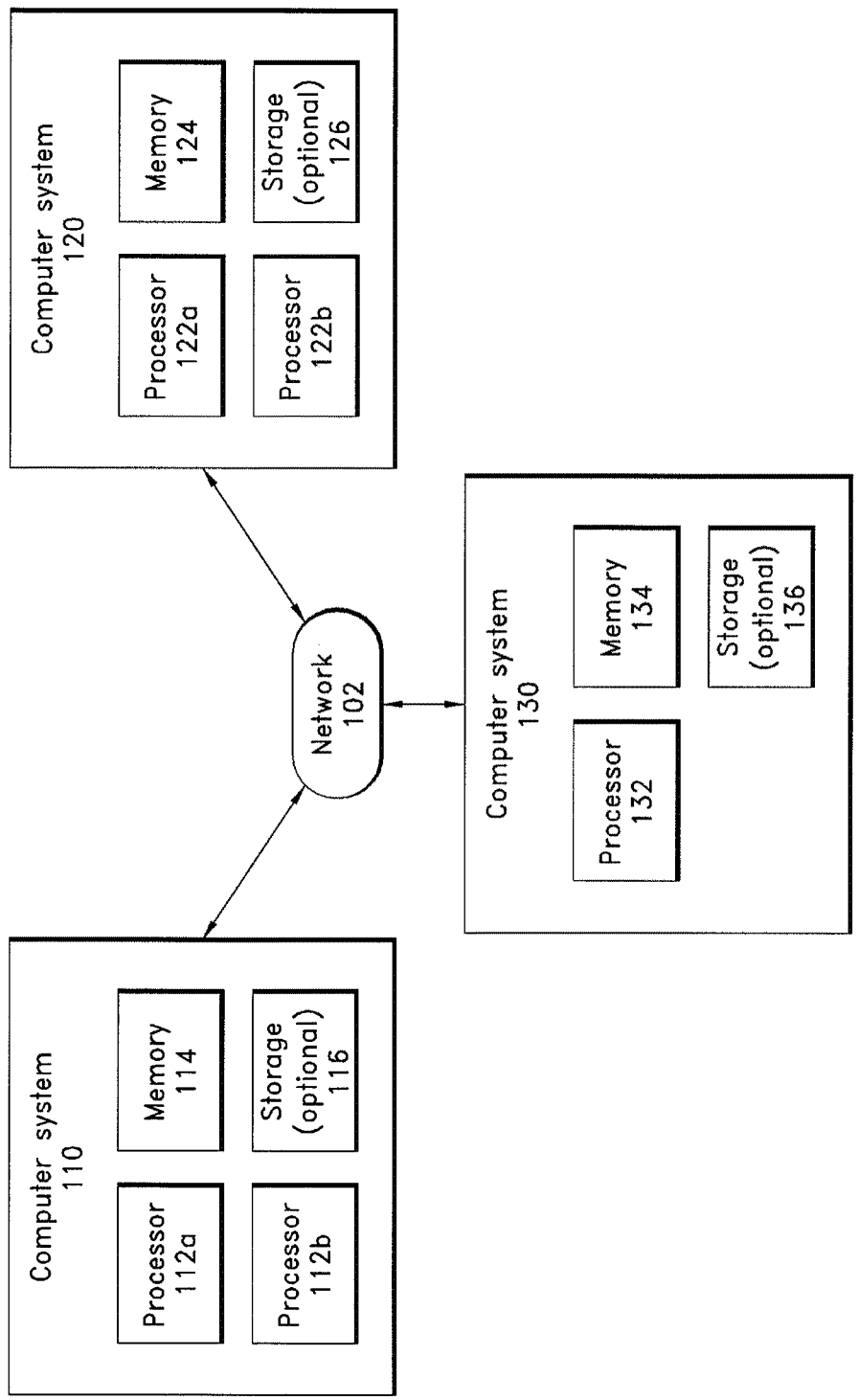
FIG. 1 is a block diagram of one embodiment of a computer cluster.

FIG. 1 is a block diagram of one embodiment of a computer cluster 100 wherein computer systems 110, 120, 130 communicate with one another via a communications network 102. Network 102 includes one or more of a LAN, a WAN, a wireless network, an intranet, or the Internet. In one embodiment of the computer cluster, computer system 110 includes processors 112a, 112b, memory 114, and optional storage 116. Other computer systems 120, 130 can include similar devices, which generally communicate with one another within a computer system over a local communications architecture such as a local bus (not shown). A computer system can include one or more processors, and each processor can contain one or more processor cores that are capable of single-threaded execution. Processor cores are generally independent microprocessors, but more than one can be included in a single chip package. Software code designed for single-threaded execution can generally run on one processor core at a time. For example, single-threaded software code typically does not benefit from multiple processor cores in a computer system.

Figure 2:
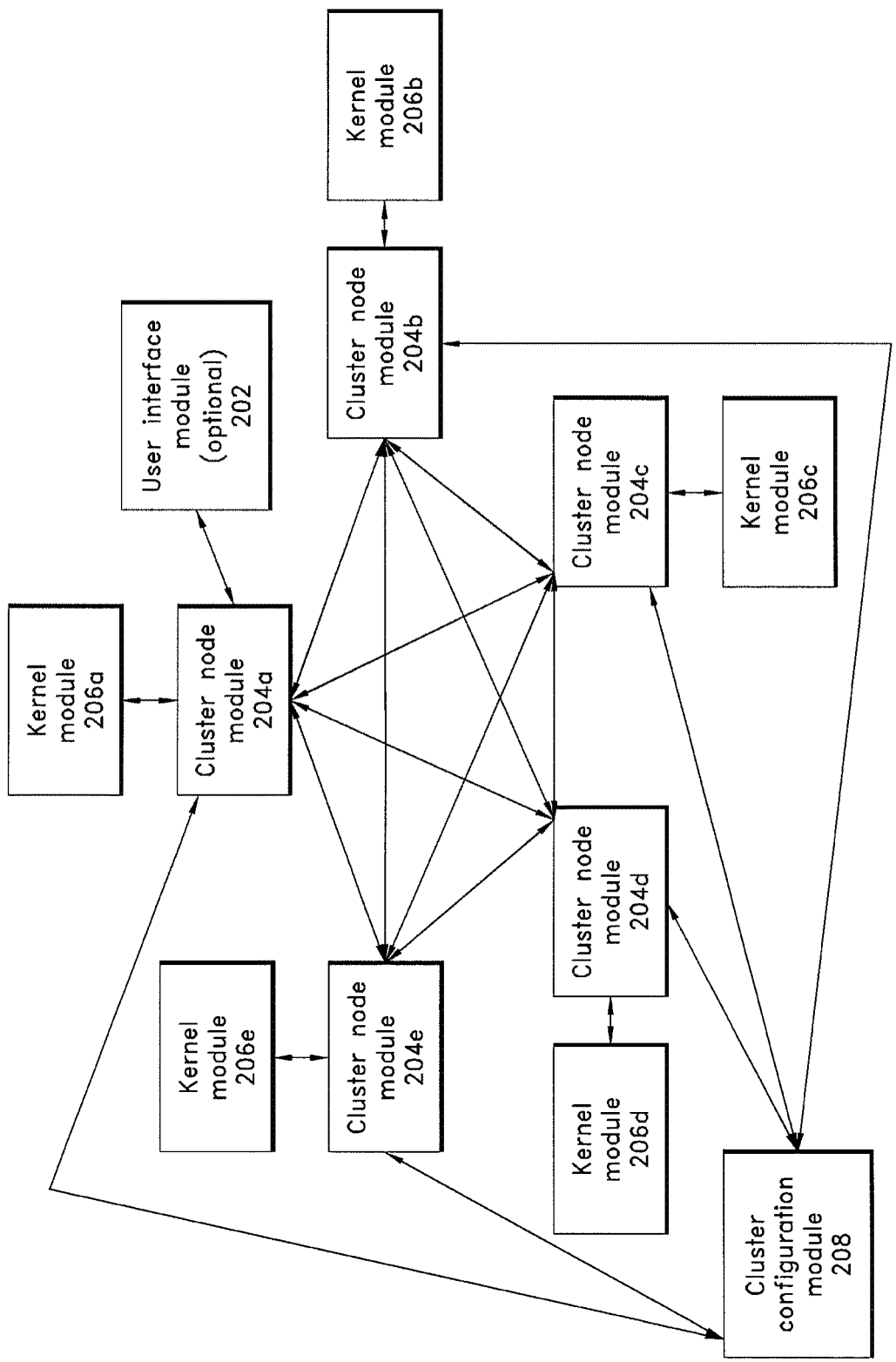
FIG. 2 is a block diagram showing relationships between software modules running on one embodiment of a computer cluster.

FIG. 2 is a block diagram showing relationships among software modules running on one embodiment of a computer cluster 100. In the embodiment shown in FIG. 2, the kernel modules 206a-e are designed for single-threaded execution. For example, if each of the processors 112a, 112b, 122a, 122b, 132 shown in FIG. 1 includes only one processor core, two kernel modules (for example, kernel modules 206a, 206b) loaded into the memory 114 of computer system 110 could exploit at least some of the processing bandwidth of the two processors 112a, 112b. Similarly, two kernel modules 206c, 206d loaded into the memory 124 of computer system 120 could exploit at least some of the processing bandwidth of the two processors 122a, 122b. Likewise, the bandwidth of processor 132 of computer system 130 could be utilized by a single instance of a cluster node module 204e loaded into the computer system's memory 134.

In the embodiment shown in FIG. 2, each of the kernel modules 206a-e is in communication with a single cluster node module 204a-e, respectively. For example, the kernel module 206a is in communication with the cluster node module 204a, the kernel module 206b is in communication with the cluster node module 206b, and so forth. In one embodiment, one instance of a cluster node module 204a-e is loaded into a computer system's memory 114, 124, 134 for every instance of a kernel module 206a-e running on the system. As shown in FIG. 2, each of the cluster node modules 204a-e is in communication with each of the other cluster node modules 204a-e. For example, one cluster node module 204a is in communication with all of the other cluster node modules 204b-e. A cluster node module 204a may communicate with another cluster node module 204b via a local bus (not shown) when, for example, both cluster node modules 204a-b execute on processors 112a, 112b within the same computer system 110. A cluster node module 204a may also communicate with another cluster node module 204c over a communications network 102 when, for example, the cluster node modules 204a, c execute on processors 112a, 122a within different computer systems 110, 120.

As shown in FIG. 2, an optional user interface module 202 such as, for example, a Mathematica front end and/or a command line interface, can connect to a cluster node module 204a. The user interface module can run on the same computer system 110 and/or the same microprocessor 112a on which the cluster node module 204a runs. The cluster node modules 204a-e provide MPI calls and/or advanced cluster functions that implement cluster computing capability for the single-threaded kernel modules. The cluster node modules 204a-e are configured to look and behave like a kernel module 206a from the perspective of the user interface module 202. Similarly, the cluster node modules 204a-e are configured to look and behave like a user interface module 202 from the perspective of a kernel module 206a. The first cluster node module 204a is in communication with one or more other cluster node modules 204b, 204c, and so forth, each of which provides a set of MPI calls and/or advanced cluster commands. In one embodiment, MPI may be used to send messages between nodes in a computer cluster.

Communications can occur between any two or more cluster node modules (for example, between a cluster node module 204a and another cluster node module 204c) and not just between "adjacent" kernels. Each of the cluster node modules 204a-e is in communication with respective kernel modules 206a-e. Thus, the cluster node module 204a communicates with the kernel module 206a. MPI calls and advanced cluster commands are used to parallelize program code received from an optional user interface module 208 and distribute tasks among the kernel modules 206a-e. The cluster node modules 204a-e provide communications among kernel modules 206a-e while the tasks are executing. Results of evaluations performed by kernel modules 206a-e are communicated back to the first cluster node module 204a via the cluster node modules 204a-e, which communicates them to the user interface module 208.

Intercommunication among kernel modules 206a-e during thread execution, which is made possible by cluster node modules 204a-e, provides advantages for addressing various types of mathematic and scientific problems, for example. Intercommunication provided by cluster computing permits exchange of information between nodes during the course of a parallel computation. Embodiments of the present disclosure provide such intercommunication for software programs such as Mathematica, while grid computing solutions can implement communication between only one master node and many slave nodes. Grid computing does not provide for communication between slave nodes during thread execution.

For purposes of providing an overview of some embodiments, certain aspects, advantages, benefits, and novel features of the invention are described herein. It is to be understood that not necessarily all such advantages or benefits can be achieved in accordance with any particular embodiment of the invention. Thus, for example, those skilled in the art will recognize that the invention can be embodied or carried out in a manner that achieves one advantage or group of advantages as taught herein without necessarily achieving other advantages or benefits as can be taught or suggested herein.

II. COMPUTER CLUSTER 100

As shown in FIG. 1, one embodiment of a cluster system 100 includes computer systems 110, 120, 130 in communication with one another via a communications network 102. A first computer system 110 can include one or more processors 112a-b, a memory device 114, and an optional storage device 116. Similarly, a second computer system 120 can include one or more processors 122a-b, a memory device 124, and an optional storage device 126. Likewise, a third computer system 130 can include one or more processors 132, a memory device 134, and an optional storage device 136. Each of the computer systems 110, 120, 130 includes a network interface (not shown) for connecting to a communications network 102, which can include one or more of a LAN, a WAN, an intranet, a wireless network, and/or the Internet.

A. Computer System 110

In one embodiment, a first computer system 110 communicates with other computer systems 120, 130 via a network 102 as part of a computer cluster 100. In one embodiment, the computer system 110 is a personal computer, a workstation, a server, or a blade including one or more processors 112a-b, a memory device 114, an optional storage device 116, as well as a network interface module (not shown) for communications with the network 102.

1. Processors 112a-b

In one embodiment, the computer system 110 includes one or more processors 112a-b. The processors 112a-b can be one or more general purpose single-core or multi-core microprocessors such as, for example, a Pentium® processor, a Pentium® II processor, a Pentium® Pro processor, a Pentium® III processor, Pentium® 4 processor, a Core Duo® processor, a Core 2 Duo® processor, a Xeon® processor, an Itanium® processor, a Pentium® M processor, an x86 processor, an Athlon® processor, an 8051 processor, a MIPS® processor, a PowerPC® processor, an ALPHA® processor, etc. In addition, one or more of the processors 112a-b can be a special purpose microprocessor such as a digital signal processor. The total number of processing cores (for example, processing units capable of single-threaded execution) within all processors 112a-b in the computer system 110 corresponds to the number of nodes available in the computer system 110. For example, if the processors 112a-b were each Core 2 Duo® processors having two processing cores, computer system 110 would have four nodes in all. Each node can run one or more instances of a program module, such as a single-threaded kernel module.

2. Network Interface Module

The computer system 110 can also include a network interface module (not shown) that facilitates communication between the computer system 110 and other computer systems 120, 130 via the communications network 102.

The network interface module can use a variety of network protocols. In one embodiment, the network interface module includes TCP/IP. However, it is to be appreciated that other types of network communication protocols such as, for example, Point-to-Point Protocol ("PPP"), Server Message Block ("SMB"), Serial Line Internet Protocol ("SLIP"), tunneling PPP, AppleTalk, etc., may also be used.

3. Memory 114 and Storage 116

The computer system 110 can include memory 114. Memory 114 can include, for example, processor cache memory (such as processor core-specific or cache memory shared by multiple processor cores), dynamic random-access memory ("DRAM"), static random-access memory ("SRAM"), or any other type of memory device capable of storing computer data, instructions, or program code. The computer system 110 can also include optional storage 116. Storage 116 can include, for example, one or more hard disk drives, floppy disks, flash memory, magnetic storage media, CD-ROMs, DVDs, optical storage media, or any other type of storage device capable of storing computer data, instructions, and program code.

4. Computer System 110 Information

The computer system 110 may be used in connection with various operating systems such as: Microsoft® Windows® 3.X, Windows 95®, Windows 98®, Windows NT®, Windows 2000®, Windows XP®, Windows CE®, Palm Pilot OS, OS/2, Apple® MacOS®, MacOS X®, MacOS X Server®, Disk Operating System (DOS), UNIX, Linux®, VxWorks, or IBM® OS/2®, Sun OS, Solaris OS, IRIX OS operating systems, etc.

In one embodiment, the computer system 110 is a personal computer, a laptop computer, a Blackberry® device, a portable computing device, a server, a computer workstation, a local area network of individual computers, an interactive kiosk, a personal digital assistant, an interactive wireless communications device, a handheld computer, an embedded computing device, or the like.

As can be appreciated by one of ordinary skill in the art, the computer system 110 may include various sub-routines, procedures, definitional statements, and macros. Each of the foregoing modules are typically separately compiled and linked into a single executable program. However, it is to be appreciated by one of ordinary skill in the art that the processes that are performed by selected ones of the modules may be arbitrarily redistributed to one of the other modules, combined together in a single module, made available in a shareable dynamic link library, or partitioned in any other logical way.

B. Computer System 120

In one embodiment, a second computer system 120 communicates with other computer systems 110, 130 via a network 102 as part of a computer cluster 100. In one embodiment, the computer system 120 is a personal computer, a workstation, a server, or a blade including one or more processors 122a-b, a memory device 124, an optional storage device 126, as well as a network interface module (not shown) for communications with the network 102.

1. Processors 112a-b

In one embodiment, the computer system 120 includes one or more processors 122a-b. The processors 122a-b can be one or more general purpose single-core or multi-core microprocessors such as a Pentium® processor, a Pentium® II processor, a Pentium® Pro processor, a Pentium® III processor, Pentium® 4 processor, a Core Duo® processor, a Core 2 Duo® processor, a Xeon® processor, an Itanium® processor, a Pentium® M processor, an x86 processor, an Athlon® processor, an 8051 processor, a MIPS® processor, a PowerPC® processor, an ALPHA® processor, etc. In addition, the processors 122a-b can be any special purpose microprocessors such as a digital signal processor. The total number of processing cores (for example, processing units capable of single-threaded execution) within all processors 122a-b in the computer system 120 corresponds to the number of nodes available in the computer system 120. For example, if the processors 122a-b were each Core 2 Duo® processors having two processing cores, computer system 120 would have four nodes in all. Each node can run one or more instances of a program module, such as a single-threaded kernel module.

2. Network Interface Module

The computer system 120 can also include a network interface module (not shown) that facilitates communication between the computer system 120 and other computer systems 110, 130 via the communications network 102.

The network interface module can use a variety of network protocols. In one embodiment, the network interface module includes TCP/IP. However, it is to be appreciated that other types of network communication protocols such as, for example, Point-to-Point Protocol ("PPP"), Server Message Block ("SMB"), Serial Line Internet Protocol ("SLIP"), tunneling PPP, AppleTalk, etc., may also be used.

3. Memory 124 and Storage 126

The computer system 120 can include memory 124. Memory 124 can include, for example, processor cache memory (such as processor core-specific or cache memory shared by multiple processor cores), dynamic random-access memory ("DRAM"), static random-access memory ("SRAM"), or any other type of memory device capable of storing computer data, instructions, or program code. The computer system 120 can also include optional storage 126. Storage 126 can include, for example, one or more hard disk drives, floppy disks, flash memory, magnetic storage media, CD-ROMs, DVDs, optical storage media, or any other type of storage device capable of storing computer data, instructions, and program code.

4. Computer System 120 Information

The computer system 120 may be used in connection with various operating systems such as: Microsoft® Windows® 3.X, Windows 95®, Windows 98®, Windows NT®, Windows 2000®, Windows XP®, Windows CE®, Palm Pilot OS, OS/2, Apple® MacOS®, MacOS X®, MacOS X Server®, Disk Operating System (DOS), UNIX, Linux®, VxWorks, or IBM® OS/2®, Sun OS, Solaris OS, IRIX OS operating systems, etc.

In one embodiment, the computer system 120 is a personal computer, a laptop computer, a Blackberry® device, a portable computing device, a server, a computer workstation, a local area network of individual computers, an interactive kiosk, a personal digital assistant, an interactive wireless communications device, a handheld computer, an embedded computing device, or the like.

As can be appreciated by one of ordinary skill in the art, the computer system 120 may include various sub-routines, procedures, definitional statements, and macros. Each of the foregoing modules are typically separately compiled and linked into a single executable program. However, it is to be appreciated by one of ordinary skill in the art that the processes that are performed by selected ones of the modules may be arbitrarily redistributed to one of the other modules, combined together in a single module, made available in a shareable dynamic link library, or partitioned in any other logical way.

C. Computer System 130

In one embodiment, a third computer system 130 communicates with other computer systems 110, 120 via a network 102 as part of a computer cluster 100. In one embodiment, the computer system 130 is a personal computer, a workstation, a server, or a blade including one or more processors 132, a memory device 134, an optional storage device 136, as well as a network interface module (not shown) for communications with the network 102.

1. Processors 112a-b

In one embodiment, the computer system 130 includes a processor 132. The processor 132 can be a general purpose single-core or multi-core microprocessors such as a Pentium® processor, a Pentium® II processor, a Pentium® Pro processor, a Pentium® III processor, Pentium® 4 processor, a Core Duo® processor, a Core 2 Duo® processor, a Xeon® processor, an Itanium® processor, a Pentium® M processor, an x86 processor, an Athlon® processor, an 8051 processor, a MIPS® processor, a PowerPC® processor, or an ALPHA® processor. In addition, the processor 132 can be any special purpose microprocessor such as a digital signal processor. The total number of processing cores (for example, processing units capable of single-threaded execution) within processor 132 in the computer system 130 corresponds to the number of nodes available in the computer system 130. For example, if the processor 132 was a Core 2 Duo® processor having two processing cores, the computer system 130 would have two nodes. Each node can run one or more instances of a program module, such as a single-threaded kernel module.

2. Network Interface Module

The computer system 130 can also include a network interface module (not shown) that facilitates communication between the computer system 130 and other computer systems 110, 120 via the communications network 102.

The network interface module can use a variety of network protocols. In one embodiment, the network interface module includes TCP/IP. However, it is to be appreciated that other types of network communication protocols such as, for example, Point-to-Point Protocol ("PPP"), Server Message Block ("SMB"), Serial Line Internet Protocol ("SLIP"), tunneling PPP, AppleTalk, etc., may also be used.

3. Memory 134 and Storage 136

The computer system 130 can include memory 134. Memory 134 can include, for example, processor cache memory (such as processor core-specific or cache memory shared by multiple processor cores), dynamic random-access memory ("DRAM"), static random-access memory ("SRAM"), or any other type of memory device capable of storing computer data, instructions, or program code. The computer system 130 can also include optional storage 136. Storage 136 can include, for example, one or more hard disk drives, floppy disks, flash memory, magnetic storage media, CD-ROMs, DVDs, optical storage media, or any other type of storage device capable of storing computer data, instructions, and program code.

4. Computer System 130 Information

The computer system 130 may be used in connection with various operating systems such as: Microsoft® Windows® 3.X, Windows 95®, Windows 98®, Windows NT®, Windows 2000®, Windows XP®, Windows CE®, Palm Pilot OS, OS/2, Apple® MacOS®, MacOS X®, MacOS X Server®, Disk Operating System (DOS), UNIX, Linux®, VxWorks, or IBM® OS/2®, Sun OS, Solaris OS, IRIX OS operating systems, etc.

In one embodiment, the computer system 130 is a personal computer, a laptop computer, a Blackberry® device, a portable computing device, a server, a computer workstation, a local area network of individual computers, an interactive kiosk, a personal digital assistant, an interactive wireless communications device, a handheld computer, an embedded computing device, or the like.

As can be appreciated by one of ordinary skill in the art, the computer system 130 may include various sub-routines, procedures, definitional statements, and macros. Each of the foregoing modules are typically separately compiled and linked into a single executable program. However, it is to be appreciated by one of ordinary skill in the art that the processes that are performed by selected ones of the modules may be arbitrarily redistributed to one of the other modules, combined together in a single module, made available in a shareable dynamic link library, or partitioned in any other logical way.

E. Communications Network 102

In one embodiment, computer systems 110, 120, 130 are in communication with one another via a communications network 102.

The communications network 102 may include one or more of any type of electronically connected group of computers including, for instance, the following networks: a virtual private network, a public Internet, a private Internet, a secure Internet, a private network, a public network, a value-added network, a wired network, a wireless network, an intranet, etc. In addition, the connectivity to the network can be, for example, a modem, Ethernet (IEEE 802.3), Gigabit Ethernet, 10-Gigabit Ethernet, Token Ring (IEEE 802.5), Fiber Distributed Datalink Interface (FDDI), Frame Relay, InfiniBand, Myrinet, Asynchronous Transfer Mode (ATM), or another interface. The communications network 102 may connect to the computer systems 110, 120, 130, for example, by use of a modem or by use of a network interface card that resides in each of the systems.

In addition, the same or different communications networks 102 may be used to facilitate communication between the first computer system 110 and the second computer system 120, between the first computer system 110 and the third computer system 130, and between the second computer system 120 and the third computer system 130.

III. SOFTWARE MODULES

As shown in FIGS. 1 and 2, one embodiment of a cluster system 100 includes a user interface module 202 that is able to access a plurality of kernel modules 206a-e by communicating with a first cluster node module 204a. User interface module can be stored in a memory 114, 124, 134 while running, for example, and/or can be stored in a storage device 116, 126, 136. The first cluster node module 204a is in communication with each of the other cluster node modules 204b-e. The kernel modules 206a-e can reside in the memory of one or more computer systems on which they run. For example, the memory 114 of the first computer system 110 can store instances of kernel modules 206a-b, the memory 124 of the second computer system 120 can store instances of kernel modules 206c-d, and the memory 134 of the third computer system 130 can store an instance of kernel module 206e. The kernel modules 206a-e, which include single-threaded program code, are each associated with one of the processors 112a, 112b, 122a, 122b, 132. A cluster configuration module stored on one or more of the computer systems 110, 120, 130 or on a remote computer system, for example, can establish communication with the cluster node modules 204a-e. In one embodiment, communication between the cluster configuration module 208 and the cluster node modules 204a-e initializes the cluster node modules 204a-e to provide cluster computing support for the computer cluster 100.

A. Cluster Node Module 204

In one embodiment, the cluster node modules 204a-e provide a way for many kernel modules 206a-e such as, for example, Mathematica kernels, running on a computer cluster 100 to communicate with one another. A cluster node module 204 can include at least a portion of an application programming interface ("API") known as the Message-Passing Interface ("MPI"), which is used in several supercomputer and cluster installations. A network of connections (for example, the arrows shown in FIG. 2) between the cluster node modules 204a-e can be implemented using a communications network 102, such as, for example, TCP/IP over Ethernet, but the connections could also occur over any other type of network or local computer bus.

A cluster node module 204 can use an application-specific toolkit or interface such as, for example, Mathematica's MathLink, Add-Ons, or packets, to interact with an application. Normally used to connect a Mathematica kernel to a user interface known as the Mathematica Front End or other Mathematica kernels, MathLink is a bidirectional protocol to sends "packets" containing messages, commands, or data between any of these entities. MathLink does not allow direct cluster computing-like simultaneous communication between Mathematica kernels during execution of a command or thread. MathLink is also not designed to perform multiple simultaneous network connections. In some embodiments, a cluster node module 204 can use an application-specific toolkit such as, for example, MathLink, for connections between entities on the same computer.

When speaking about procedures or actions on a cluster or other parallel computer, not all actions happen in sequential order, nor are they required to. For example, a parallel code, as opposed to a single-processor code of the classic "Turing machine" model, has multiple copies of the parallel code running across the cluster, typically one for each processor (or "processing element" or "core"). Such parallel code is written in such a way that different instances of the same code can communicate, collaborate, and coordinate work with each other. Multiple instances of these codes can run at the same time in parallel.

If the count of the code instances is an integer N, each instance of code execution can be labeled 0 through N−1. For example, a computer cluster can include N connected computers, each containing a processor. The first has cluster node module 0 connected with kernel module 0 running on processor 0. The next is cluster node module 1 and kernel module 1, on processor 1, and so forth for each of the N connected computers. Some steps of their procedure are collaborative, and some steps are independent. Even though these entities are not necessarily in lock-step, they do follow a pattern of initialization, main loop behavior (for example, cluster node module operation), and shut down.

In contrast, a parallel computing toolkit (PCT) that is provided as part of the gridMathematica software package does not provide a means for instances of the same code running on different nodes to communicate, collaborate, or coordinate work among the instances. The PCT provides commands that connect Mathematica kernels in a master-slave relationship rather than a peer-to-peer relationship as enabled by some embodiments disclosed herein. A computer cluster having peer-to-peer node architecture performs computations that can be more efficient, easier to design, and/or more reliable than similar computations performed on grid computers having master-slave node architecture. Moreover, the nature of some computations may not allow a programmer to harness multi-node processing power on systems that employ master-slave node architecture.

Figure 3:
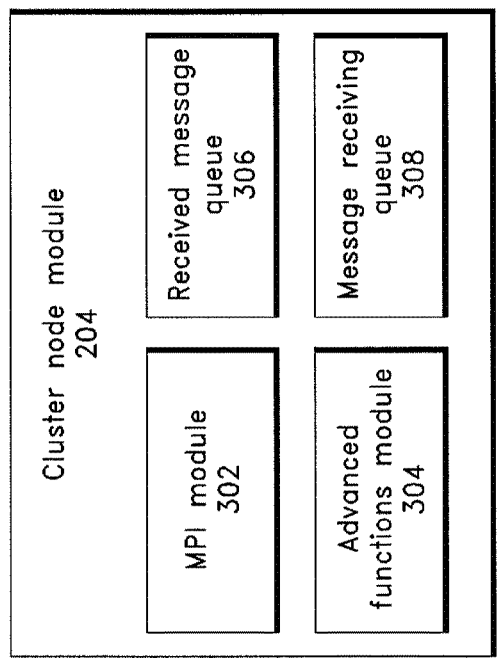
FIG. 3 is a block diagram of one embodiment of a cluster node module.

FIG. 3 shows one embodiment of a cluster node module 204 implementing MPI calls and advanced MPI functions. In the embodiment shown in FIG. 3, cluster node module 204 includes MPI module 302, advanced functions module 304, received message queue 306, and message receiving queue 308.

1. MPI Module 302

In one embodiment, the cluster node module 204 includes an MPI module 302. The MPI module 302 can include program code for one or more of at least five kinds of MPI instructions or calls. Selected constants, instructions, and/or calls that can be implemented by the MPI module 302 are as follows:

MPI Constants

Node identifiers are used to send messages to nodes or receive messages from them. In MPI, this is accomplished by assigning each node a unique integer ($IdProc) starting with 0. This data, with a knowledge of the total count ($NProc), makes it possible to programmatically divide any measurable entity.

TABLE A

| Constant | Description |
| --- | --- |
| $IdProc | The identification number of the current processor |
| $NProc | The number of processors in the current cluster |
| $mpiCommWorld | The communicator world of the entire cluster (see MPI Communicator routines, below) |
| mpiCommWorld | The default communicator world for the high-level routines. |

Basic MPI Calls

In one embodiment, the MPI module 302 can include basic MPI calls such as, for example, relatively low-level routines that map MPI calls that are commonly used in other languages (such as C and Fortran), so that such calls can be available directly from the Mathematica user interface 204. In some embodiments, basic MPI calls include calls that send data, equations, formulas, and/or other expressions.

Simply sending expressions from one node to another is possible with these most basic MPI calls. One node can call to send an expression while the other calls a corresponding routine to receive the sent expression. Because it is possible that the receiver has not yet called mpiRecv even if the message has left the sending node, completion of mpiSend is not a confirmation that it has been received.

TABLE B

| Call | Description |
| --- | --- |
| mpiSend[expr, target, comm, tag] | Sends an expression expr to a node with the ID target in the communicator would comm, waiting until that expression has left this kernel |
| mpiRecv [expr, target, comm, tag] | Receives an expression into expr from a node with the ID target in the communicator world comm, waiting until the expression has arrived |
| mpiSendRecv[sendexpr, dest, recvexpr, source, comm] | Simultaneously sends the expression sendexpr to the node with the ID target and receives an expression into recvexpr from the node with the ID source in the communicator world comm, waiting until both operations have returned. |

Asynchronous MPI Calls

Asynchronous calls make it possible for the kernel to do work while communications are proceeding simultaneously. It is also possible that another node may not be able to send or receive data yet, allowing one kernel to continue working while waiting.

TABLE C

| Call | Description |
| --- | --- |
| mpiISend[expr, target, comm, tag, req] | Sends an expression expr to a processor with the ID target in the communicator world comm, returning immediately. It can be balanced with calls to mpiTest[req] until mpiTest[req] returns True. |
| mpiIRecv[expr, target, comm, tag, req] | Receives an expression expr from a proessor with the ID target in the communicator world comm, returning immediately. It can be balanced with calls to mpiTest[req] until mpiTest[req] returns True. The expr is not safe to access until mpiTest[req] returns True. |
| mpiTest[req] | Completes asynchronous behavior of mpiISend and mpiIRecv |

TABLE C-continued

| Call | Description |
| --- | --- |
| mpiWait[req] | Calls mpiTest until it returns True. |
| mpiWaitall[reqlist] | Calls mpiWait all on every element of reqlist |
| mpiWaitany[reqlist] | Calls mpiTest on each element of realist until one of them returns True |

The mpiISend[ ] command can be called from within a kernel module 206 (for example, a Mathematica kernel). It creates a packet containing the Mathematica expression to be sent as payload and where the expression should be sent. The packet itself is destined only for its local cluster node module. Once received by its local cluster node module, this packet is decoded and its payload is forwarded on to the cluster node module specified in the packet.

The mpiIRecv[ ] command can also be called from within a kernel module 206. It creates a packet specifying where it expects to receive an expression and from which processor this expression is expected. Once received by its local cluster node module, this packet is decoded and its contents are stored in a message receiving queue (MRQ) 308 (FIG. 3).

The mpiTest[ ] command can be called from within a kernel module 206. It creates a packet specifying which message to test for completion, then waits for a reply expression to evaluate. Once received by the kernel module's associated cluster node module 204, this packet is decoded and its message specifier is used to search for any matching expressions listed as completed in its received message queue (RMQ) 306. If such completed expressions are found, it is sent to its local kernel module as part of the reply in mpiTest[ ]. The kernel module receives this reply expression and evaluates it, which updates the kernel module's variables as needed.

Other MPI calls are built on the fundamental calls mpiISend, mpiIRecv, and mpiTest. For example, mpiBcast, a broadcast, creates instructions to send information from the broadcast processor to all the others, while the other processors perform a Recv. Similarly, high-level calls of the toolkit can be built on top of the collection of MPI calls.

Collective MPI Calls

In one embodiment, the MPI module 302 can include program code for implementing collective MPI calls (for example, calls that provide basic multi-node data movement across nodes). Collective MPI calls can include broadcasts, gathers, transpose, and other vector and matrix operations, for example. Collective calls can also provide commonly used mechanisms to send expressions between groups of nodes.

TABLE D

| Call | Description |
| --- | --- |
| mpiBcast[expr, root, comm] | Performs a broadcast of expr from the root processor to all the others in the communicator world comm. An expression is expected to be supplied by the root processor, while all the others expect expr to be overwritten by the incoming expression. |
| mpiGather[sendexpr, recvexpr, root, comm] | All processors (including root) in the communicator comm send their expression in sendexpr to the root processor, which produces a list of these expressions, in the order according to comm, in recvexpr. On the processors that are not root, recvexpr is ignored. |

TABLE D-continued

| Call | Description |
| --- | --- |
| mpiAllgather[sendexpr, recvexpr, comm] | All processors in the communicator comm send their expression in sendexpr, which are organized into a list of these expressions, in the order according to comm, in recvexpr on all processors in comm. |
| mpiScatter[sendexpr, recvexpr, root, comm] | Processor root partitions the list in sendexpr into equal parts (if possible) and places each piece in recvexpr on all the processors (including root) in the communicator world comm, according the order and size of comm. |
| mpiAlltoall[sendexpr, recvexpr, comm] | Each processor sends equal parts of the list in sendexpr to all other processors in the communicator world comm, which each collects from all other processors are organizes into the order according to comm. |

In one embodiment, the MPI module 302 includes program code for implementing parallel sums and other reduction operations on data stored across many nodes. MPI module 302 can also include program code for implementing simple parallel input/output calls (for example, calls that allow cluster system 200 to load and store objects that are located on a plurality of nodes).

TABLE E

| Call | Description |
| --- | --- |
| mpiReduce[sendexpr, recvexpr, operation, root, comm] | Performs a collective reduction operation between expressions on all processors in the communicator world comm for every element in the list in sendexpr returning the resulting list in recvexpr on the processor with the ID root. |
| mpiAllreduce[sendexpr, recvexpr, operation, comm] | Performs a collective reduction operation between expressions on all processors in the communicator world comm for every element in the list in sendexpr returning the resulting list in recvexpr on every processor. |
| mpiReduceScatter [sendexpr, recvexpr, operation, comm] | Performs a collective reduction operation between expressions on all processors in the communicator world comm for every element in the list in sendexpr, partitioning the resulting list into pieces for each processor's recvexpr. |

These additional collective calls perform operations that reduce the data in parallel. The operation argument can be one of the constants below.

TABLE F

| Constant | Description |
| --- | --- |
| mpiSum | Specifies that all the elements on different processors be added together in a reduction call |
| mpiMax | Specifies that the maximum of all the elements on different processors be chosen in a reduction call |
| mpiMin | Specifies that the minimum of all the elements on different processors be chosen in a reduction call |

MPI Communicator Calls

In one embodiment, the MPI module 302 includes program code for implementing communicator world calls (for example, calls that would allow subsets of nodes to operate as if they were a sub-cluster). Communicators organize groups of nodes into user-defined subsets. The communicator values returned by mpiCommSplit[ ] can be used in other MPI calls instead of mpiCommWorld.

TABLE G

| Call | Description |
| --- | --- |
| mpiCommSize[comm] | Returns the number of processors within the communicator comm |
| mpiCommRank[comm] | Returns the rank of this processor in the communicator comm |
| mpiCommDup[comm] | Returns a duplicate communicator of the communicator comm |
| mpiCommSplit[comm, color, key] | Creates a new communicator into several disjoint subsets each identified by color. The sort order within each subset is first by key, second according to the ordering in the previous communicator. Processors not meant to participate in any new communicator indicates this by passing the constant mpiUndefined. The corresponding communicator is returned to each calling processor. |
| mpiCommMap[comm] mpiCommMap[comm, target] | Returns the mapping of the communicator comm to the processor indexed according to $mpiCommWorld. Adding a second argument returns just the ID of the processor with the ID target in the communicator comm. |
| mpiCommFree[comm] | Frees the communicator comm |

Other MPI Support Calls

Other calls that provide common functions include:

TABLE H

| Call | Description |
| --- | --- |
| mpiWtime[ ] | Provides wall-dock time since some fixed time in the past. There is no guarantee that this time will read the same on all processors. |
| mpWtick[ ] | Returns the time resolution of mpiWtime[ ] |
| MaxByElement[in] | For every nth element of each list of the list in, chooses the maximum according to Max[ ], and returns the result as one list. Used in the mpiMax reduction operation. |
| MinByElement[in] | For every nth element of each list of the list in, chooses the minimum according to Min[ ], and returns the result as one list. Used in the mpiMin reduction operation. |

2. Advanced Functions Module 304

In one embodiment, the cluster node module 204 includes an advanced functions module 304. The advanced functions module 304 can include program code that provides a toolkit of functions inconvenient or impractical to do with MPI instructions and calls implemented by the MPI module 302. The advanced functions module 304 can rely at least partially on calls and instructions implemented by the MPI module 302 in the implementation of advanced functions. In one embodiment, the advanced functions module 304 includes a custom set of directives or functions. In an alternative embodiment, the advanced functions module 304 intercepts normal Mathematica language and converts it to one or more functions optimized for cluster execution. Such an embodiment can be easier for users familiar with Mathematica functions to use but can also complicate a program debugging process. Some functions implemented by the advanced functions module 304 can simplify operations difficult or complex to set up using parallel computing. Several examples of such functions that can be implemented by the advanced functions module 304 are shown below.

Built on the MPI calls, the calls that are described below provide commonly used communication patterns or parallel versions of Mathematica features. Unless otherwise specified, these are executed in the communicator mpiCommWorld, whose default is $mpiCommWorld, but can be changed to a valid communicator at run time.

Common Divide-and-Conquer Parallel Evaluation

In one embodiment, the advanced functions module 304 includes functions providing for basic parallelization such as, for example, routines that would perform the same operations on many data elements or inputs, stored on many nodes. These functions can be compared to parallelized for-loops and the like. The following calls address simple parallelization of common tasks. In the call descriptions, "expr" refers to an expression, and "loopspec" refers to a set of rules that determine how the expression is evaluated. In some embodiments, the advanced functions module 304 supports at least three forms of loopspec, including {var, count}, where the call iterates the variable var from 1 to the integer count; {var, start, stop}, where the call iterates the variable var every integer from start to stop; and {var, start, stop, increment}, where the call iterates the variable var from start adding increment for each iteration until var exceeds stop, allowing var to be a non-integer.

TABLE I

| Call | Description |
| --- | --- |
| ParallelDo[expr, loopspec] | Like Do[ ] except that it evaluates expr across the cluster, rather than on just one processor. The rules for how expr is evaluated is specified in loopspec, like in Do[ ]. |
| ParallelFunctionToList[f, count] ParallelFunctionToList[f, count, root] | Evaluates the function f[i] from 1 to count, but across the cluster, and returns these results in a list. The third argument has it gather this list into the processor whose ID is root. |
| ParallelTable[expr, loopspec] ParallelTable[expr, loopspec, root] | Like Table[ ] except that it evaluates expr across the cluster, rather than on just one processor, returning the locally evaluated portion. The third argument has it gather this table in to the processor whose ID is root. |
| ParallelFunction[f, inputs, root] | Like f[inputs] except that it evaluates f on a subset of inputs scattered across the cluster from processor root and gathered back to root. |
| ParallelNintegrate[expr, loopspec] | Like Nintegrate[ ] except that it evaluates a numerical integration |

TABLE I-continued

| Call | Description |
| --- | --- |
| ParallelNintegrate[expr, loopspec, digits] | of expr over domains partitioned into the number of processors in the cluster, then returns the sum. The third argument has each numerical integration execute with at least that many digits of precision. |

Guard-Cell Management

In one embodiment, the advanced functions module 304 includes functions providing for guard-cell operations such as, for example, routines that perform nearest-neighbor communications to maintain edges of local arrays in any number of dimensions (optimized for 1-, 2-, and/or 3-D). Typically the space of a problem is divided into partitions. Often, however, neighboring edges of each partition can interact, so a "guard cell" is inserted on both edges as a substitute for the neighboring data. Thus the space a processor sees is two elements wider than the actual space for which the processor is responsible. EdgeCell helps maintain these guard cells.

TABLE J

| Call | Description |
| --- | --- |
| EdgeCell[list] | Copies the second element of list to the last element of the left processor and the second-to-last element of list to the first element of the right processor while simultaneously receiving the same from its neighbors. |

Matrix and Vector Manipulation

The advanced functions module 304 can also include functions providing for linear algebra operations such as, for example, parallelized versions of basic linear algebra on structures partitioned on many nodes. Such linear algebra operations can reorganize data as needed to perform matrix and vector multiplication or other operations such as determinants, trace, and the like. Matrices are partitioned and stored in processors across the cluster. These calls manipulate these matrices in common ways.

TABLE K

| Call | Description |
| --- | --- |
| ParallelTranspose[matrix] | Like Transpose[ ] except that it transposes matrix that is in fact represented across the cluster, rather than on just one processor. It returns the portion of the transposed matrix meant for that processor. |
| ParallelProduct[matrix, vector] | Evaluates the product of matrix and vector, as it would on one processor, except that matrix is represented across the cluster. |
| ParallelDimensions[matrix] | Like Dimensions[ ] except that matrix is represented across the cluster, rather than on just one processor. It returns a list of each dimension. |
| ParallelTr[matrix] | Like Tr[ ] except that the matrix is represented across the cluster, rather than on just one processor. It returns the trace of this matrix. |
| ParallelIdentity[rank] | Like Identity[ ], it generates a new identity matrix, except that the matrix is represented across the cluster, rather than on just one processor. It returns the portion of the new matrix for this processor. |
| ParallelOuter[f, vector1, vector2] | Like Outer[f, vector1, vector2] except that the answer becomes a matrix represented across the cluster, rather than on just one processor. It returns the portion of the new matrix for this processor. |
| ParallelInverse[matrix] | Like Inverse[ ] except that the matrix is represented across the cluster, rather than on just one processor. It returns the inverse of the matrix. |

Element Management

In one embodiment, the advanced functions module 304 includes element management operations. For example, a large bin of elements or particles cut up in space across the nodes may need to migrate from node to node based on rules or criteria (such as their spatial coordinate). Such operations would migrate the data from one node to another. Besides the divide-and-conquer approach, a list of elements can also be partitioned in arbitrary ways. This is useful if elements need to be organized or sorted onto multiple processors. For example, particles of a system may drift out of the space of one processor into another, so their data would need to be redistributed periodically.

TABLE L

| Call | Description |
| --- | --- |
| ElementManage[list, switch] | Selects which elements of list will be sent to which processors according to the function switch[ ] is evaluated on each element of list. If switch is a function, switch[ ] should return the ID of the processor that element should be sent. If switch is an integer, the call assumes that each elements is itself a list, whose first element is a number ranging from 0 to the passed argument. This call returns a list of the elements, from any processor, that is switch selected for this processor. |
| ElementManage[list] | Each element of list can be a list of two elements, the first being the ID of the processor where the element should be sent, while the second is arbitrary data to send. This call returns those list elements, from any and all processors, whose first element is this processors ID in a list. This call is used internally by the two-argument version of ElementManage[ ]. |

Fourier Transform

In one embodiment, the advanced functions module 304 includes program code for implementing large-scale parallel fast Fourier transforms ("FFTs"). For example, such functions can perform FFTs in one, two, and/or three dimensions on large amounts of data that are not stored on one node and that are instead stored on many nodes. Fourier transforms of very large arrays can be difficult to manage, not the least of which is the memory requirements. Parallelizing the Fourier transform makes it possible to make use of all the memory available on the entire cluster, making it possible to manipulate problem sizes that no one processor could possibly do alone.

TABLE M

| Call | Description |
| --- | --- |
| ParallelFourier[list] | Like Fourier[ ] except that list is a two- or three-dimensional list represented across the cluster, like for matrices, above. It returns the portion of the Fourier-transformed array meant for that processor. |

Parallel Disk I/O

In one embodiment, the advanced functions module 304 includes parallel disk input and output calls. For example, data may need to be read in and out of the cluster in such a way that the data is distributed across the cluster evenly. The calls in the following table enable the saving data from one or more processors to storage and the retrieval data from storage.

TABLE N

| Call | Description |
| --- | --- |
| ParallelPut[expr, filename]<br>ParallelPut[expr, filename root]<br>ParallelPut[expr, filename, root, comm] | Puts expr into the file with the name filename in order on processor 0. The third argument specifies that the file be written on the processor whose ID is root. The fourth uses the communicator world comm. |
| ParallelGet[filename]<br>ParallelGet[filename, root]<br>ParallelGet[filename, root, comm] | Reads and returns data from the file with the name filename on processor 0 partitioned into each processor on the cluster. The second argument specifies that the file is to be read on the processor whose ID is root. The third uses the communicator world comm. |
| ParallelBinaryPut[expr, type, filename]<br>ParallelBinaryPut[expr, filename, root]<br>ParallelBinaryPut[expr, filename, root, comm] | Puts expr into the file with the binary format type with the name filename in order on processor 0. The fourth argument specifies that the file be written on the processor whose ID is root. The fifth uses the communicator world comm. |
| ParallelBinaryGet[type, filename]<br>ParallelBinaryGet[type, filename, root]<br>ParallelBinaryGet[type, filename, root, comm] | Reads and returns data in the binary format type from the file with the name filename on processor 0 partitioned into each processor on the cluster. The third argument specifies that the file is to be read on the processor whose ID is root. The fourth uses the communicator world comm. |
| ParallelGetPerProcessor [expr, filename]<br>ParallelGetPerProcessor [filename, root]<br>ParallelGetPerProcessor [filename, root, comm] | Puts expr into the file with the name filename in order on processor 0, one line per processor. The third argument specifies that the file be written on the processor whose ID is root. The fourth uses the communicator world comm. |
| ParallelGetPerProcessor [filename]<br>ParallelGetPerProcessor [filename, root] | Reads and returns data from the file with the name filename on processor 0, one line for each processor. The second argument specifies that the file is to be read on the processor whose ID is root. The third uses the communicator world comm. |

TABLE N-continued

| Call | Description |
|---|---|
| ParallelGetPerProcessr [filename, root, comm] | |

Automatic Load Balancing

Some function calls can take an inconsistent amount of processing time to complete. For example, in Mathematica, the call f[20] could in general take much longer to evaluate than f[19]. Moreover, if one or more processors within the cluster are of different speeds (for example, if some operate at a core frequency of 2.6 GHz while other operate at less than one 1 GHz), one processor may finish a task sooner than another processor.

In some embodiments, the advanced functions module 304 includes a call that can improve the operation of the computer cluster 100 in such situations. In some embodiments, the root processor assigns a small subset of the possible calls for a function to each processor on the cluster 100. Whichever processor returns its results first is assigned a second small subset of the possible calls. The root processor will continue to assign small subsets of the possible calls as results are received until an evaluation is complete. The order in which the processors finish can vary every time an expression is evaluated, but the root processor will continue assigning additional work to processors as they become available.

In one illustrative example, there are 4 processors and f[1] to f[100] to evaluate. One could implement this by assigning f[1], f[2], f[3], f [4] to each of processors 0 (the root can assign to oneself) through 3. If the f[2] result came back first, then processor 1 would be assigned f[5]. If the f[4] result is returned next, f[6] would be assigned to processor 3. The assignments continue until all results are calculated. The results are organized for output back to the user.

In alternative embodiments, the subsets of possible calls can be assigned in any order, rather than sequentially, or in batches (for example, f[1], f[5], f[9] assigned to processor 1, etc.). Also, the subsets could be organized by delegation. For example, one processor node may not necessarily be in direct control of the other processors. Instead, a large subset could be assigned to a processor, which would in turn assign subsets of its work to other processors. The result would create a hierarchy of assignments like a vast army.

TABLE O

| Call | Description |
|---|---|
| LoadBalanceFunctionToList[f, count] LoadBalanceFunctionToList[f, count, root] | Evaluates the function f[i] from 1 to count, but across the cluster using load-balancing techniques, and returns these results in a list. The third argument has it gather this list into the processor whose ID is root. |

3. Received Message Queue 306

In one embodiment, the cluster node module 204 includes a received message queue 306. The received message queue 306 includes a data structure for storing messages received from other cluster node modules. Related data pertaining to the messages received, such as whether an expression has been completed, may also be stored in the received message queue 306. The received message queue 306 may include a queue and/or another type of data structure such as, for example, a stack, a linked list, an array, a tree, etc.

4. Message Receiving Queue 308

In one embodiment, the cluster node module 204 includes a message receiving queue 308. The message receiving queue 308 includes a data structure for storing information about the location to which an expression is expected to be sent and the processor from which the expression is expected. The message receiving queue 308 may include a queue and/or another type of data structure such as, for example, a stack, a linked list, an array, a tree, etc.

B. Cluster Configuration Module 208

Cluster configuration module 208 includes program code for initializing a plurality of cluster node modules to add cluster computing support to computer systems 110, 120, 130. U.S. Pat. No. 7,136,924, issued to Dauger (the "'924 patent"), the entirety of which is hereby incorporated by reference and made a part of this specification, discloses a method and system for parallel operation and control of computer clusters. One method generally includes obtaining one or more personal computers having an operating system with discoverable network services. In some embodiments, the method includes obtaining one or more processors or processor cores on which a kernel module can run. As described in the '924 patent, a cluster node control and interface (CNCI) group of software applications is copied to each node. When the CNCI applications are running on a node, the cluster configuration module 208 can permit a cluster node module 204, in combination with a kernel module 206, to use the node's processing resources to perform a parallel computation task as part of a computer cluster. The cluster configuration module 208 allows extensive automation of the cluster creation process in connection with the present disclosure.

C. User Interface Module 202

In some embodiments, computer cluster 100 includes a user interface module 202, such as, for example a Mathematica Front End or a command line interface, that includes program code for a kernel module 206 to provide graphical output, accept graphical input, and provide other methods of user communication that a graphical user interface or a command-line interface provides. To support a user interface module 202, the behavior of a cluster node module 204a is altered in some embodiments. Rather than sending output to and accepting input from the user directly, the user interface module 202 activates the cluster node module 204a to which it is connected and specifies parameters to form a connection, such as a MathLink connection, between the cluster node module 204a and the user interface module 202. The user interface module's activation of the cluster node module 204a can initiate the execution of instructions to activate the remaining cluster node modules 204b-e on the cluster and to complete the sequence to start all kernel modules 206a-e on the cluster. Packets from the user interface module 202, normally intended for a kernel module 206a, are accepted by the cluster node module 204a as a user command. Output from the kernel module 206a associated with the cluster node module 204a can be forwarded back to the user interface module 202 for display to a user. Any of the cluster node modules 204a-e can be configured to communicate with a user interface module 202.

D. Kernel Module 206

A kernel module 206 typically includes program code for interpreting high-level code, commands, and/or instructions supplied by a user or a script into low-level code, such as, for example, machine language or assembly language. In one embodiment, each cluster node module 204a-e is connected to all other cluster node modules, while each kernel module 206a-e is allocated and connected only to one cluster node module 204. In one embodiment, there is one cluster node module-kernel module pair per processor. For example, in an embodiment of a computer cluster 100 including single-processor computer systems, each cluster node module-kernel module pair could reside on a single-processor computer. If a computer contains multiple processors or processing cores, it may contain multiple cluster node module-kernel module pairs, but the pairs can still communicate over the cluster node module's network connections.

IV. CLUSTER COMPUTING METHODS

In one embodiment, the computer cluster 100 includes a cluster initialization process, a method of cluster node module operation, and a cluster shut down process.

A. Cluster Initialization Process

Figure 4:
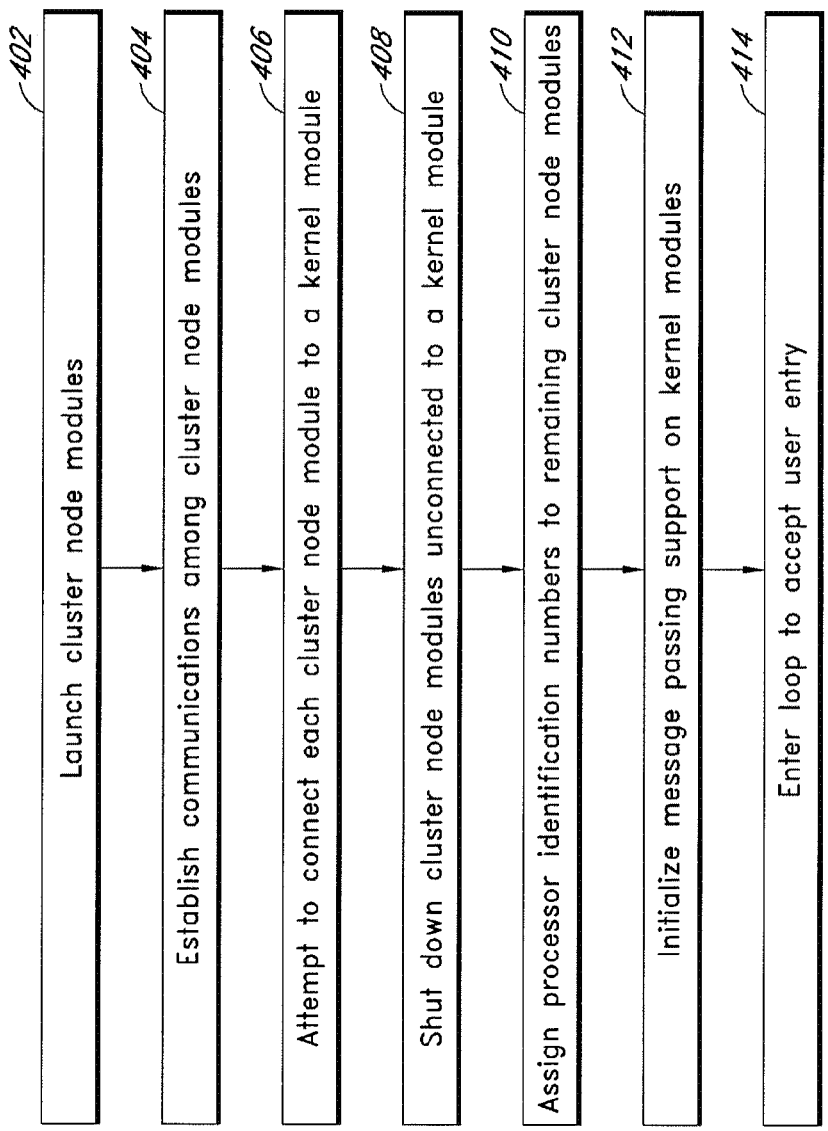
FIG. 4 is a flow chart showing one embodiment of a cluster initialization process.

In one embodiment, a cluster configuration module 202 initializes one or more cluster node modules 204 in order to provide cluster computing support to one or more kernel modules 206, as shown in FIG. 4.

At 402, cluster node modules are launched on the computer cluster 100. In one embodiment, the cluster node module 204a running on a first processor 112a (for example, where the user is located) accesses the other processors 112b, 122a-b, 132 on the computer cluster 100 via the cluster configuration module 208 to launch cluster node modules 204b-e onto the entire cluster. In an alternative embodiment, the cluster configuration module 208 searches for processors 112a-b, 122a-b, 132 connected to one another via communications network 102 and launches cluster node modules 204a-e on each of the processors 112a-b, 122a-b, 132.

The cluster node modules 204a-e establish communication with one another at 404. In one embodiment, each of the cluster node modules 204a-e establish direct connections using the MPI_Init command with other cluster node modules 204a-e launched on the computer cluster 100 by the cluster configuration module 208.

At 406, each cluster node module 204 attempts to connect to a kernel module 206. In one embodiment, each instance of the cluster node modules 204a-e locates, launches, and connects with a local kernel module via MathLink connections and/or similar connection tools, for example, built into the kernel module 206.

At 408, the cluster node modules 204 that are unconnected to a kernel module 206 are shut down. In one embodiment, each cluster node module 204 determines whether the local kernel module cannot be found or connected to. In one embodiment, each cluster node module 204 reports the failure to connect to a kernel module 206 to the other cluster node modules on computer cluster 100 and quits.

Processor identification numbers are assigned to the remaining cluster node modules 204 at 410. In one embodiment, each remaining cluster node module 204 calculates the total number of active processors (N) and determines identification numbers describing the remaining subset of active cluster node modules 204a-e and kernel modules 206a-e. This new set of cluster node module-kernel module pairs may be numbered 0 through N−1, for example.

Message passing support is initialized on the kernel modules 206a-e at 412. In one embodiment, each cluster node module 204 supplies initialization code (for example, Mathematica initialization code) to the local kernel module 206 to support message passing.

Finally, at 414, the cluster node modules 204a-e enter a loop to accept user entry. In one embodiment, a main loop (for example, a cluster operation loop) begins execution after the cluster node module 204a on the first processor 112a returns to user control while each of the other cluster node modules 204 waits for messages from all other cluster node modules 204a-e connected to the network 102.

The initialization process creates a structure enabling a way for the kernel modules 206a-e to send messages to one another. In some embodiments, any kernel module can send data to and receive data from any other kernel module within the cluster when initialization is complete. The cluster node module creates an illusion that a kernel module is communicating directly with the other kernel modules. The initialization process can create a relationship among kernel modules on a computer cluster 100 such as the one shown by way of example in FIG. 2.

B. Cluster Node Module Operation

Figure 5:
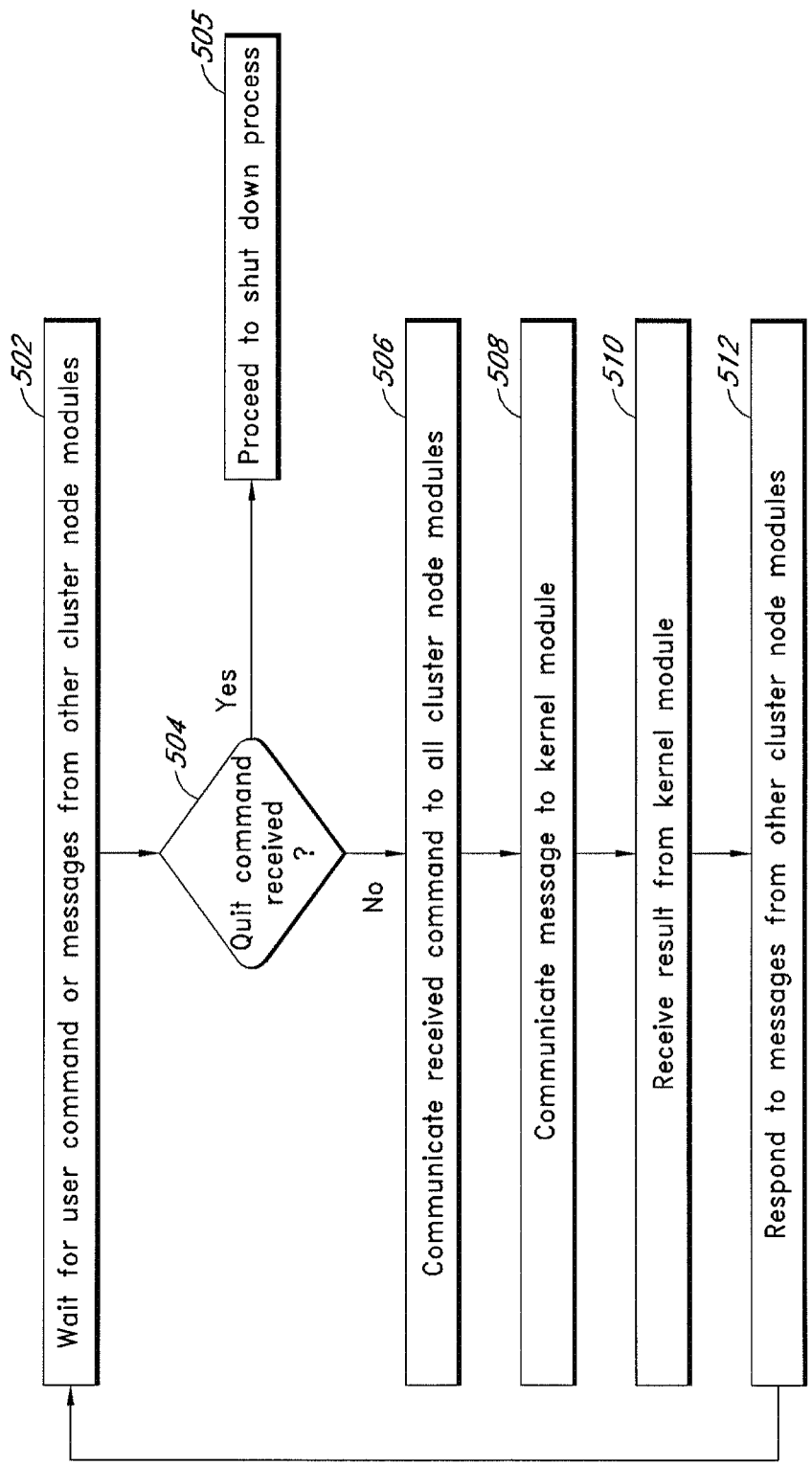
FIG. 5 is a flow chart showing one embodiment of the operation of a cluster node module.

In one embodiment, a cluster node module 204 implements cluster computing support for a kernel module 206 during a main loop, as shown in FIG. 5.

At 502, cluster node modules 204 wait for user commands or messages from other cluster node modules. In one embodiment, the cluster node module 204a connected to the user interface module 202 waits for a user command, while the other cluster node modules 204b-e continue checking for messages.

Once a command or message is received, the method proceeds to 504. At 504, the cluster node module 204a determines whether the message received is a quit command. If a quit command is received, the cluster node module 204a exits the loop and proceeds to a cluster node module shut down process at 505. If the message received is not a quit command, the process continues to 506.

At 506, received commands are communicated to all cluster node modules 204a-e on the computer cluster 100. In one embodiment, when a user enters a command in the user interface module 202, the cluster node module 204a connected to the user interface module 202 submits the user command to all other cluster node modules 204b-e in the computer cluster 100. The user commands can be simple (for example, "1+1"), but can also be entire subroutines and sequences of code (such as, for example, Mathematica code), including calls to MPI from within the user interface module 202 (for example, the Mathematica Front End) to perform message passing between kernel modules 206a-e (for example, Mathematica kernels). These include the fundamental MPI calls, which are implemented using specially identified messages between a cluster node module 204 and its local kernel module 206.

The message (or user command) is communicated to the kernel modules 206a-e at 508. In one embodiment, the cluster node module 204a connected to the user interface module 202 submits the user command to the kernel module 206a to which it is connected. Each of the other cluster node modules 204b-e, after receiving the message, submits the command to the respective kernel module 206b-e to which it is connected.

At 510, a cluster node module 204 receives a result from a kernel module 206. In one embodiment, once the kernel module 206 completes its evaluation, it returns the kernel module's output to the cluster node module 204 to which it is connected. Depending on the nature of the result from the kernel module, the cluster node module 204 can report the result to a local computer system or pass the result as a message to another cluster node module 204. For example, the cluster node module 204a running on the first processor 112a reports the output on its local computer system 110. For example, on the first processor 112a, cluster node module 204a only directly reports the output of kernel module 206a.

Messages from other cluster node modules 204 are responded to at 512. In one embodiment, each cluster node module (for example, the cluster node module 204a) checks for and responds to messages from other cluster node modules 204b-e and from the kernel module 206a repeatedly until those are exhausted. In one embodiment, output messages from the kernel module 206 are forwarded to output on the local computer system. Messages from other cluster node modules 204 are forwarded to a received message queue 306 ("RMQ"). Data from each entry in the message receiving queue 308 ("MRQ") is matched with entries in the RMQ 306 (see, for example, description of the mpiIRecv[ ] call, above). If found, data from the MRQ 308 are combined into those in the RMQ 306 and marked as "completed" (see, for example, description of the mpiTest[ ] call, above). This process provides the peer-to-peer behavior of the cluster node modules 204a-e. Via this mechanism, code running within multiple, simultaneously running kernel modules (for example, Mathematica kernels) can interact on a pair-wise or collective basis, performing calculations, processing, or other work on a scale larger and/or faster than one kernel could have done alone. In this manner, user-entered instructions and data specifying what work will be done via user commands can be executed more quickly and/or reliably. Once responding to messages has completed, the process returns to 502.

In some embodiments, a computer system includes software, such as an operating system, that divides memory and/or other system resources into a user space, a kernel space, an application space (for example, a portion of the user space allocated to an application program), and/or an operating system space (for example, a portion of the user space allocated to an operating system). In some embodiments, some or all of the cluster node modules 204a-e are implemented in the application space of a computer system. In further embodiments, at least some of the cluster node modules 204a-e are implemented in the operating system space of a computer system. For example, some cluster node modules in a computer cluster may operate in the application space while others operate in the operating system space.

In some embodiments, some or all of the functionality of the cluster node modules 204a-e is incorporated into or integrated with the operating system. The operating system can add cluster computing functionality to application programs, for example, by implementing at least some of the methods, modules, data structures, commands, functions, and processes discussed herein. Other suitable variations of the techniques described herein can be employed, as would be recognized by one skilled in the art.

In some embodiments, the operating system or components of the operating system can identify and launch the front end 202 and the kernels 206. The operating system or its components can connect the front end 202 and kernels 206 to one another in the same manner as a cluster node module 204 would or by a variation of one of the techniques described previously. The operating system can also be responsible for maintaining the communications network 102 that connects the modules to one another. In some embodiments, the operating system implements at least some MPI-style calls, such as, for example, collective MPI-style calls. In some embodiments, the operating system includes an application programming interface (API) library of cluster subroutine calls that is exposed to application programs. Applications programs can use the API library to assist with launching and operating the computer cluster.

C. Cluster Shut Down Process

In one embodiment, a computer cluster 100 includes a procedure to shut down the system. If the operation process (or main loop) on the cluster node module 204a connected to the user interface module 202 detects a "Quit" or "Exit" command or otherwise receives a message from the user indicating a shut down, the sequence to shut down the cluster node modules 204a-e and the kernel modules 206a-e is activated. In one embodiment, the cluster node module 204a connected to the user interface module 202 sends a quit message to all other cluster node modules 204b-e. Each cluster node module 204 forwards the quit command to its local kernel module 206. Once its Mathematica kernel has quit, each cluster node module 204 proceeds to tear down its communication network with other cluster node modules (for example, see description of the MPI Finalize command, above). At the conclusion of the process, each cluster node module 204 exits execution.

V. EXAMPLE OPERATION

For purposes of illustration, sample scenarios are discussed in which the computer cluster system is used in operation. In these sample scenarios, examples of Mathematica code are given, and descriptions of how the code would be executed by a cluster system are provided.

Basic MPI

Fundamental data available to each node includes the node's identification number and total processor count.

In[1]:={$IdProc, $NProc}
Out[1]:={0, 2}

The first element should be unique for each processor, while the second is generally the same for all. Processor 0 can see what other values are using a collective (see below) communications call such as mpiGather[ ].

In[2]:=mpiGather[{$IdProc, $NProc},list,0]; list
Out[2]:={{0, 2}, {1, 2}}

Peer-to-Peer MPI

The mpiSend and mpiRecv commands make possible basic message passing, but one needs to define which processor to target. The following defines a new variable, targetProc, so that each pair of processors will point to each other.

In[3]:=targetProc=If[1==Mod[$IdProc, 2],$IdProc-1, $IdProc+1]
Out[3]:=1

In this example, the even processors target its "right" processor, while the odd ones point its "left." For example, if the processors were lined up in a row and numbered in order, every even-numbered processor would pair with the processor following it in the line, and every odd-numbered processor would pair with the processor preceding it. Then a message can be sent:

In[4]:=If [1==Mod[$IdProc, 2],mpiSend[N[Pi,22],targetProc, mpiCommWorld,d], mpiRecv[a,targetProc,mpiCommWorld,d]]

The If [ ] statement causes the processors to evaluate different code: the odd processor sends 22 digits of Pi, while the even receives that message. Note that these MPI calls return nothing. The received message is in the variable a:

In[5]:=a
Out[5]:=3.1415926535897932384626
In[6]:=Clear[a]

The variable a on the odd processors would have no definition. Moreover, if $NProc is 8, processor 3 sent Pi to processor 2, processor 5 sent Pi to processor 4, and so on. These messages were not sent through processor 0, but they communicated on their own.

The mpiISend and mpiIRecv commands have a letter "I" to indicate asynchronous behavior, making it possible to do other work while messages are being sent and received, or if the other processor is busy. So, the above example could be done asynchronously:

In[7]:=If[1==Mod[$IdProc, 2],mpiISend[N[Pi,22],targetProc,
mpiCommWorld,d,e],
mpiIRecv[a,targetProc,mpiCommWorld,d,e]]

The variable e has important data identifying the message, and mpiTest[e] can return True before the expressions are to be accessed. At this point, many other evaluations can be performed. Then, one can check using mpiTest when the data is needed:

In[29]:=mpiTest[e]
Out[29]:=True
In[30]:=a
Out[30]:=3.1415926535897932384626
In[31]:=Clear[a,e]

The mpiWait[e] command could have also have been used, which does not return until mpiTest[e] returns True. The power of using these peer-to-peer calls is that it becomes possible to construct any message-passing pattern for any problem.

Collective MPI

In some cases, such explicit control is not required and a commonly used communication pattern is sufficient. Suppose processor 0 has an expression in b that all processors are meant to have. A broadcast MPI call would do:

In[8]:=mpiBcast[b, 0, mpiCommWorld]

The second argument specifies which processor is the "root" of this broadcast; all others have their b overwritten. To collect values from all processors, use mpiGatherD:

In[9]:=mpiGather[b, c, 0, mpiCommWorld]

The variable c of processor 0 is written with a list of all the b of all the processors in mpiCommWorld. The temporal opposite is mpiScatter:

In[10]:=Clear[b]; a={2, 4, 5, 6}; mpiScatter[a, b, 0, mpiCommWorld]; b
Out[10]:={2, 4}

The mpiScatter command cuts up the variable a into even pieces (when possible) and scatters them to the processors. This is the result if $NProc=2, but if $NProc=4, b would only have {2}.

MPI provides reduction operations to perform simple computations mixed with messaging. Consider the following:

In[11]:=a={{2+$IdProc, 45[ ]},3,{1+$IdProc,$NProc[ ][ ]; mpiReduce [a,d,mpiSum, 0,mpiCommWorld]
In[12]:=d
Out[12]:={{5, 90}, 6, {3, 4}}

The mpiSum constant indicates that variable a of every processor will be summed. In this case, $NProc is 2, so those elements that were not identical result in odd sums, while those that were the same are even.

Most of these calls have default values if not all are specified. For example each of the following calls will have the equivalent effect as the above mpiGather[ ] call:

mpiGather[b, c, 0]
mpiGather[b, c]
c=mpiGather[b] High-Level Calls

High-level calls can include convenient parallel versions of commonly used application program calls (for example, Mathematica calls). For example, ParallelTable[ ] is like Table[ ], except that the evaluations are automatically performed in a distributed manner:

In[13]:=ParallelTable[i,{i,100},0]
Out[13]:={1,2,3,4, 5, . . . , 99, 100}

The third argument specifies that the answers are collated back to processor 0. This is a useful, simple way to parallelize many calls to a complex function. One could define a complicated function and evaluate it over a large range of inputs:

In[14]:=g[x]:=Gamma[2+0.5*(x−1)];
ParallelTable[g[i],{i,100},0]
Out[14]:={1, 1.32934, 2., 3.32335, 6., 11.6317, 24., 52.3428, 120., 287.885, 720}

ParallelFunctionToListH also provides a simplified way to perform this form of parallelism.

Operations with Non-Trivial Communication
Matrix Operations

In some embodiments, one or more functions can help solve matrix calculations in parallel:

In[15]:=a=Table[i+3*$IdProc+2 j, {i, 2}, {j,4}]
Out[15]:={{3, 5, 7, 9}, {4, 6, 8, 10}}
In[16]:=t=ParallelTranspose[a]
Out[16]:={{3, 4, 6, 7}, {5, 6, 8, 9}}

Fourier Transforms

A Fourier transform of a large array can be solved faster in parallel, or made possible on a cluster because it can all be held in memory. A two-dimensional Fourier transform of the above example follows:

In[17]:=f=ParallelFourier[a]
Out[17]:={{32.+0. I, −4.−4. I, −4., −4.+4. I}, {−3.−3. I, 0.+0. I, 0., 0.+0.I}}

Edge Cell Management

Many problems require interactions between partitions, but only on the edge elements. Maintaining these edges can be performed using EdgeCell[ ].

In[18]:=a={2, 4, 5, 6, 7}+8*$IdProc
Out[18]:={2, 4, 5, 6, 7}
In[19]:=EdgeCell[a]; a
Out[19]:={14, 4, 5, 6, 12}

Element Management

In particle-based problems, items can drift through space, sometimes outside the partition of a particular processor. This can be solved with ElementManage[:

In[20]:=list={{0,4},{1,3},{1,4},{0,5}}; fcn[x_]:=x[[1]]
In[21]:=ElementManage[list, fcn]
Out[21]:={{0, 4}, {0, 5}, {0, 4}, {0, 5}}
In[21]:=ElementManage[list, 2]
Out[21]:={{0, 4}, {0, 5}, {0, 4}, {0, 5}}

The second argument of ElementManage describes how to test elements of a list. The fcn identifier returns which processor is the "home" of that element. Passing an integer assumes that each element is itself a list, whose first element is a number ranging from 0 to the passed argument.

While the examples above involve Mathematica software and specific embodiments of MPI calls and cluster commands, it is recognized that these embodiments are used only to illustrate features of various embodiments of the systems and methods.

VI. ADDITIONAL EMBODIMENTS

Although cluster computing techniques, modules, calls, and functions are disclosed with reference to certain embodiments, the disclosure is not intended to be limited thereby. Rather, a skilled artisan will recognize from the disclosure herein a wide number of alternatives for the exact selection of cluster calls, functions, and management systems. For example, single-node kernels can be managed using a variety of management tools and/or can be managed manually by a user, as described herein. As another example, a cluster node module can contain additional calls and procedures, including calls and procedures unrelated to cluster computing, that are not disclosed herein.

Other embodiments will be apparent to those of ordinary skill in the art from the disclosure herein. Moreover, the described embodiments have been presented by way of example only, and are not intended to limit the scope of the disclosure. Indeed, the novel methods and systems described herein can be embodied in a variety of other forms without departing from the spirit thereof. Accordingly, other combinations, omissions, substitutions and modifications will be apparent to the skilled artisan in view of the disclosure herein. Thus, the present disclosure is not intended to be limited by the disclosed embodiments, but is to be defined by reference to the appended claims. The accompanying claims and their equivalents are intended to cover forms or modifications as would fall within the scope and spirit of the inventions.

What is claimed is:

1. A computer cluster comprising:
   a plurality of nodes, wherein each of the plurality of nodes comprises a hardware processor, wherein one or more of the nodes are configured to receive a command to start a cluster initialization process for the computer cluster, and wherein each of the nodes is configured to access a non-transitory computer-readable medium comprising program code for a single-node kernel that, when executed, is capable of causing the hardware processor to evaluate mathematical expressions; and
   a communications network interface for the nodes to communicate results of mathematical expression evaluation with each other using a peer-to-peer architecture;
   wherein the plurality of nodes comprises:
      a first node comprising a first hardware processor configured to access a first memory comprising program code for a user interface and program code for a first single-node kernel, the first single-node kernel configured to interpret user instructions and distribute calls to at least one of a plurality of other nodes for execution; and
      a second node comprising a second hardware processor with a plurality of processing cores, wherein the second node is configured to receive calls from the first node, execute at least a first mathematical expression evaluation, and communicate a result of the first mathematical expression evaluation to a third node;
      wherein the third node comprises a third hardware processor with a plurality of processing cores, wherein the third node is configured to receive the result of the first mathematical expression evaluation from the second node, execute at least a second mathematical expression evaluation using the received result, and communicate the result of the second mathematical expression evaluation to the first node;
   wherein the first node is configured to return the result of the second mathematical expression evaluation to the user interface;
   wherein one or more of the nodes are configured to:
      accept user instructions;
      after accepting user instructions, communicate at least some of the user instructions using the communications network interface for the nodes to communicate with each other; and
      after communicating at least some of the user instructions using the communications network interface, communicate at least some of the user instructions to one or more single-node kernels.

2. The computer cluster of claim 1, wherein the communications network interface comprises at least one of: a local bus, a local area network (LAN), a wide area network (WAN), a storage area network (SAN), a TCP/IP interface over Ethernet, or a wireless network interface.

3. The computer cluster of claim 1, wherein each of the nodes comprises one or more cluster node modules.

4. The computer cluster of claim 1, wherein each single-node kernel is stored in a non-transitory computer-readable medium and configured to accept and execute a request.

5. The computer cluster of claim 4, wherein each of the nodes comprises one or more cluster node modules, wherein each of the cluster node modules comprises instructions stored in a non-transitory computer-readable medium, and wherein the instructions, when executed by the hardware processor, cause the cluster node module to communicate with the single-node kernel and with one or more other cluster node modules.

6. The computer cluster of claim 5, wherein the one or more cluster node modules act as a cluster.

7. The computer cluster of claim 5, wherein the one or more cluster node modules communicate with one another to act as a cluster.

8. The computer cluster of claim 1, wherein the computer cluster includes the user interface.

9. The computer cluster of claim 5, wherein each cluster node module accepts instructions from the user interface and interprets one or more of the instructions.

10. The computer cluster of claim 1, wherein the cluster initialization process comprises establishing communication among two or more of the nodes.

11. The computer cluster of claim 1, wherein the cluster initialization process comprises configuring access by one or more of the nodes to a computer-readable medium comprising program code for the single-node kernel.

12. The computer cluster of claim 11, wherein the cluster initialization process comprises establishing message-passing support among the nodes in the cluster.

13. The computer cluster of claim 11, wherein the cluster initialization process comprises launching cluster node modules by the cluster.

14. The computer cluster of claim 13, wherein the cluster initialization process comprises assigning a processor identification number to each of the cluster node modules.

15. The computer cluster of claim 1, wherein the cluster initialization process comprises:
   launching cluster node modules by the cluster; and
   after launching the cluster node modules, configuring access by one or more of the nodes to a non-transitory computer-readable medium comprising program code for the single-node kernel.

16. The computer cluster of claim 1, wherein the cluster initialization process comprises:
launching cluster node modules by the cluster;
after launching the cluster node modules, establishing communication among two or more of the nodes; and
after establishing communication among two or more of the nodes, assigning a processor identification number to each of the cluster node modules.

17. The computer cluster of claim 1, wherein one or more of the nodes are configured to communicate at least some of the user instructions.

18. The computer cluster of claim 17, wherein one or more of the nodes are configured to communicate at least some of the user instructions to one or more single-node kernels.

19. The computer cluster of claim 1, wherein one or more of the nodes are configured to accept user instructions via one or more of the nodes.

20. The computer cluster of claim 19, wherein one or more of the nodes are configured to communicate at least some of the user instructions using the communications network interface for the nodes to communicate with each other.

21. The computer cluster of claim 1, wherein one or more of the nodes are configured to transmit at least some of the user instructions that originate from a user interface.

22. The computer cluster of claim 1, wherein one or more of the nodes are configured to parallelize at least some of the user instructions before communicating at least some of the user instructions to one or more single-node kernels.

23. The computer cluster of claim 1, wherein one or more of the nodes are configured to:
accept user instructions;
after accepting user instructions, communicate at least some of the user instructions using the communications network interface for the nodes to communicate with each other; and
after communicating at least some of the user instructions using the communications network interface, communicate at least some of the user instructions to one or more single-node kernels.

24. The computer cluster of claim 1, wherein the plurality of nodes are configured to communicate with one another to interpret and translate commands for execution by a plurality of single-node kernels.

25. A computer cluster comprising:
a plurality of nodes, wherein one or more of the nodes are configured to receive:
a command to start a cluster initialization process for the computer cluster, wherein the cluster initialization process comprises establishing communication among two or more of the nodes; and
an instruction from a user interface or a script; and
a communications network interface for the nodes to communicate results of mathematical expression evaluation with each other using asynchronous calls;
wherein each of the nodes is configured to access a non-transitory computer-readable medium comprising program code for a single-node kernel that, when executed, is capable of causing a hardware processor to evaluate mathematical expressions
wherein the plurality of nodes comprises:
a first node comprising a first hardware processor configured to access a first memory comprising program code for a user interface and program code for a first single-node kernel, the first single-node kernel configured to interpret user instructions and distribute calls to at least one of a plurality of other nodes for execution; and
a second node comprising a second hardware processor with a plurality of processing cores, wherein the second node is configured to receive calls from the first node, execute at least a first mathematical expression evaluation, and communicate a result of mathematical expression evaluation to a third node;
wherein the third node comprises a third hardware processor with a plurality of processing cores, wherein the third node is configured to receive the result of mathematical expression evaluation from the second node, execute at least a second mathematical expression evaluation using the received result, and communicate the result of the second mathematical expression evaluation to the first node;
wherein the first node is configured to return the result of the second mathematical expression evaluation to the user interface or the script;
wherein one or more of the nodes are configured to:
accept user instructions;
after accepting user instructions, communicate at least some of the user instructions using the communications network interface for the nodes to communicate with each other; and
after communicating at least some of the user instruction using the communications network interface, communicate at least some of the user instructions to one or more since-node kernels.

26. The computer cluster of claim 25, wherein the asynchronous calls comprise a first command to create a first packet containing:
an expression to be sent as payload; and
a target node where the expression should be sent;
wherein the first command is configured to be called from within a single-node kernel;
wherein the single-node kernel is configured to send the first packet to a local cluster node module; and
wherein the local cluster node module is configured to forward the expression to the target node.

27. The computer cluster of claim 25, wherein the communications network interface comprises at least one of: a local bus, a local area network (LAN), a wide area network (WAN), a storage area network (SAN), a TCP/IP interface over Ethernet, or a wireless network interface.

28. A computer cluster comprising:
a plurality of nodes, wherein one or more of the nodes are configured to receive:
a command to start a cluster initialization process for the computer cluster, wherein the cluster initialization process comprises establishing communication among two or more of the nodes; and
an instruction from a user interface or a script;
and
a communications network interface for the nodes to communicate results of mathematical expression evaluation with each other, wherein the communications network interface comprises at least one of: a local bus, a local area network (LAN), a wide area network (WAN), a storage area network (SAN), a TCP/IP interface over Ethernet, or a wireless network interface;
wherein each of the nodes is configured to access a non-transitory computer-readable medium comprising program code for a single-node kernel that, when executed, is capable of causing a hardware processor to evaluate mathematical expressions wherein the plurality of nodes comprises:
  a first node comprising a first hardware processor configured to access a first memory comprising program code for a user interface and program code for a first single-node kernel, the first single-node kernel configured to interpret user instructions and distribute calls to at least one of a plurality of other nodes for execution; and
  a second node comprising a second hardware processor with a plurality of processing cores, wherein the second node is configured to receive calls from the first node, execute at least a first mathematical expression evaluation, and communicate a result of mathematical expression evaluation to a third node;
  wherein the third node comprises a third hardware processor with a plurality of processing cores, wherein the third node is configured to receive the result of mathematical expression evaluation from the second node, execute at least a second mathematical expression evaluation using the received result, and communicate the result of the second mathematical expression evaluation to the first node; and
wherein the first node is configured to return the result of the second mathematical expression evaluation to the user interface or the script;
wherein one or more of the nodes are configured to:
  accept user instructions;
  after accepting user instructions, communicate at least some of the user instructions using the communications network interface for the nodes to communicate with each other; and
  after communicating at least some of the user instructions using the communications network interface, communicate at least some of the user instructions to one or more single-node kernels.

29. The computer cluster of claim 28, wherein each of the single-node kernels are configured to call a send command involving creating a packet containing:
  an expression to be sent as payload; and
  where the expression should be sent;
  wherein, upon reception of the send command by a local cluster node module associated with the single-node kernel, the local cluster node module is configured to decode the packet and forward a payload to the cluster node module specified in the packet;
  wherein each of the single-node kernels is configured to call a receipt command involving creating a packet specifying which message to test for completion and to then wait for a reply expression to evaluate;
  wherein, upon reception of the receipt command by the local cluster node module associated with the single-node kernel, the local cluster node module is configured to decode the packet and use a message specifier to search for any matching expressions listed as completed in a received message queue;
  wherein, upon determining that such a completed expression is found, the local cluster node module is configured to send the completed expression to a local single-node kernel associated with the cluster node module in response to the receipt command, and
  wherein each of the single-node kernels is configured to receive the completed expression and to update variables used by the single-node kernel during evaluation of expressions.

30. A computer cluster node for evaluating expressions in parallel with other computer cluster nodes, the computer cluster node comprising:
  a hardware processor configured to access one or more non-transitory memory devices comprising program code for a single-node kernel that, when executed, causes the hardware processor to interpret user instructions, to evaluate mathematical expressions, and to produce results of mathematical expression evaluation, wherein the hardware processor comprises multiple processor cores;
  a user connection interface configured to receive a command to start a cluster initialization process for a computer cluster;
  a communications network interface to communicate results of evaluation with other computer cluster nodes using a peer-to-peer architecture, wherein the communications network interface comprises at least one of: a local bus, a local area network (LAN), a wide area network (WAN), a storage area network (SAN), a TCP/IP interface over Ethernet, or a wireless network interface; and
  program code that, when executed, is capable of causing the hardware processor to:
    receive calls from a second node comprising a second hardware processor configures to access a second memory comprising program code for a user interface and program code for a second single-node kernel, the second single-node kernel configured to interpret user instructions and distribute calls to at least one of a plurality of other nodes for execution;
    execute, using the hardware processor, at least a first mathematical expression evaluation; and
    communicate a result of the first mathematical expression evaluation to a third node comprising a third hardware processor with a plurality of processing cores, wherein the third node is configured to receive the result of mathematical expression evaluation from the computer cluster node, execute at least a second mathematical expression evaluation using the result of the first mathematical expression evaluation, and communicate a result of the second mathematical expression evaluation to the first node;
  wherein the user connection interface is configured to return at least one result of mathematical expression evaluation to a user interface or a script; and
  wherein the computer cluster node is configured to:
    accept user instructions;
    after accepting user instructions, communicate at least some of the user instructions using the communications network interface for the nodes to communicate with each other; and
    after communicating at least some of the user instructions using the communications network interface, communicate at least some of the user instructions to the single-node kernel.

* * * * *